(12) United States Patent
Kim et al.

(10) Patent No.: US 11,903,023 B2
(45) Date of Patent: *Feb. 13, 2024

(54) METHOD FOR TRANSMITTING AND RECEIVING SIGNAL IN WIRELESS COMMUNICATION SYSTEM AND APPARATUS FOR SUPPORTING SAME

(71) Applicant: LG Electronics Inc., Seoul (KR)

(72) Inventors: Seonwook Kim, Seoul (KR); Sukhyon Yoon, Seoul (KR); Joonkui Ahn, Seoul (KR); Inkwon Seo, Seoul (KR); Suckchel Yang, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 72 days.

This patent is subject to a terminal disclaimer.

(21) Appl. No.: 17/422,136

(22) PCT Filed: Jan. 10, 2020

(86) PCT No.: PCT/KR2020/000519
§ 371 (c)(1),
(2) Date: Jul. 9, 2021

(87) PCT Pub. No.: WO2020/145747
PCT Pub. Date: Jul. 16, 2020

(65) Prior Publication Data
US 2022/0132563 A1 Apr. 28, 2022

(30) Foreign Application Priority Data

Jan. 11, 2019 (KR) .................. 10-2019-0004025
Feb. 15, 2019 (KR) .................. 10-2019-0018240
(Continued)

(51) Int. Cl.
*H04W 74/08* (2009.01)

(52) U.S. Cl.
CPC .................. *H04W 74/08* (2013.01)

(58) Field of Classification Search
CPC . H04W 16/14; H04W 72/23; H04W 52/0225; H04W 72/20; H04W 72/1273;
(Continued)

(56) References Cited

U.S. PATENT DOCUMENTS 9,173,214 B2 10/2015 Li et al.
2013/0215853 A1 8/2013 Li et al.
(Continued)

FOREIGN PATENT DOCUMENTS

CN 103404046 11/2013
CN 107667565 2/2018
KR 101890045 8/2018

OTHER PUBLICATIONS

Extended European Search Report in European Appln. No. 20738408.2, dated Jan. 4, 2022, 13 pages.
ZTE & Sanechips, "Search space design and related issues," R1-1805263, Presented at 3GPP TSG RAN WG1 Meeting #92Bis, Sanya, China, Apr. 16-20, 2018, 18 pages.
(Continued)

*Primary Examiner* — Quoc Thai N Vu
(74) *Attorney, Agent, or Firm* — Fish & Richardson P.C.

(57) ABSTRACT

Disclosed in various embodiments of the present disclosure are a method for transmitting and receiving a signal in a wireless communication system and an apparatus for supporting same.

10 Claims, 40 Drawing Sheets

(30) Foreign Application Priority Data

Mar. 28, 2019 (KR) .................. 10-2019-0035529
May 3, 2019 (KR) .................. 10-2019-0051928

(58) Field of Classification Search
CPC .......... H04W 74/006; H04W 74/0816; H04W 74/08; H04W 74/0808; H04L 5/0096; H04L 5/0094; H04L 5/0053; Y02D 30/70

See application file for complete search history.

(56) References Cited

U.S. PATENT DOCUMENTS

| | | | |
|---|---|---|---|
| 2014/0133427 A1 | 5/2014 | Kim et al. | |
| 2017/0111888 A1* | 4/2017 | Dinan | H04W 72/044 |
| 2017/0332410 A1 | 11/2017 | Babaei et al. | |
| 2019/0342777 A1* | 11/2019 | Tiirola | H04L 5/0048 |
| 2021/0385831 A1* | 12/2021 | Nogami | H04W 72/23 |

OTHER PUBLICATIONS

Ericsson, "Clarification on PDCCH monitoring when DRX is not configured," R2-1818438, Presented at 3GPP TSG-RAN2 Meeting #104, Spokane, USA, Nov. 12-16, 2018, 2 pages.

International Search Report and Written Opinion in International Appln. No. PCT/KR2020/000519, dated May 6, 2020, 15 pages (with English translation).

Oppo, "On search space of cross-carrier scheduling," R1-1812834, Presented at 3GPP TSG RAN WG1 Meeting #95, Spokane, USA, Nov. 12-16, 2018, 8 pages.

Vivo, "Discussion on the search space configuration of cross-carrier scheduling," R1-1812277, Presented at 3GPP TSG RAN WG1 Meeting #95, Spokane, USA, Nov. 12-16, 2018, 5 pages.

Huawei, HiSilicon, "Remaining issues for physical downlink control channel," R1-1812181, 3GPP TSG RAN WG1 Meeting #95, Spokane, USA, dated Nov. 12-16, 2018, 15 pages.

* cited by examiner

FIG. 13
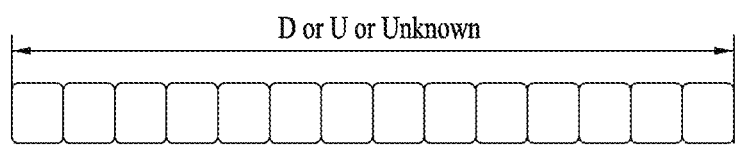
(a)
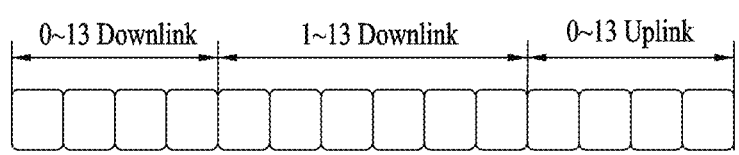
(b)
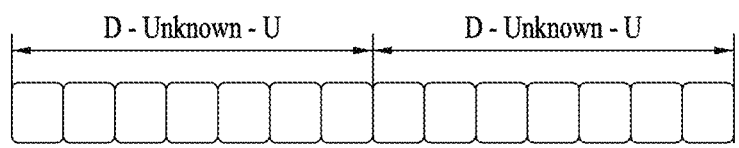
(c)

FIG. 14
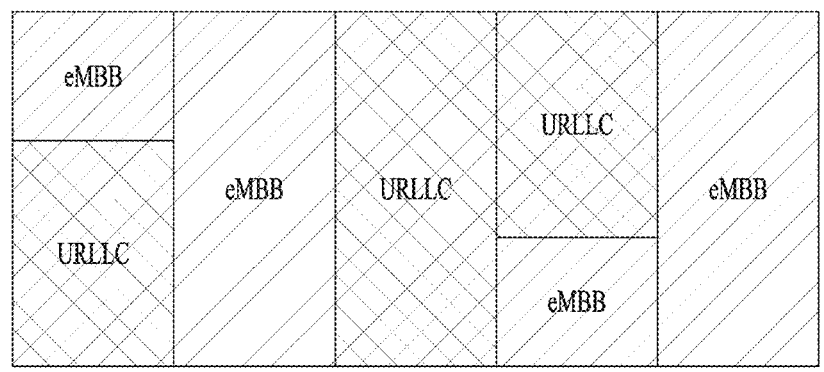
(a) Scheduler-based resource sharing
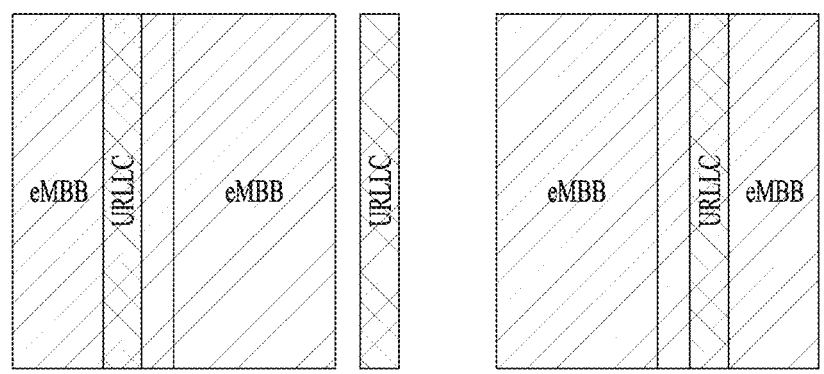
(b) Preemption-based resource sharing

FIG. 19
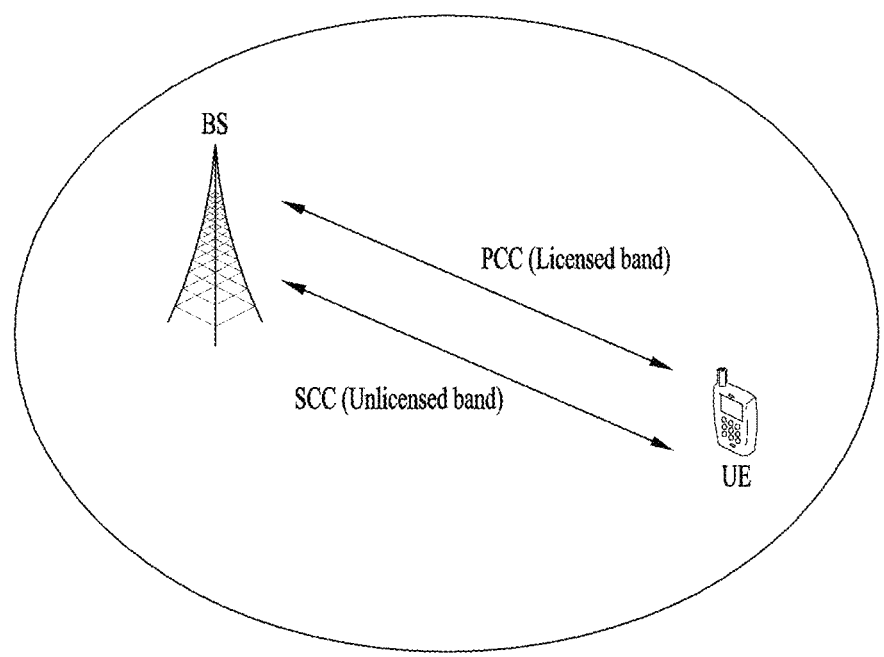
(a) Carrier aggregation between L-band and U-band
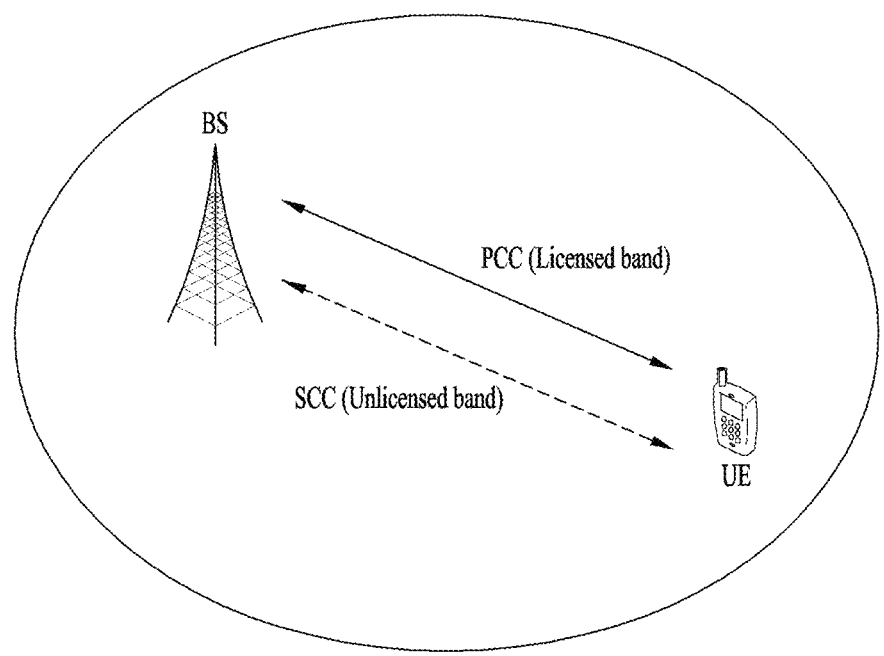
(b) Standalone U-band(s)

FIG. 30
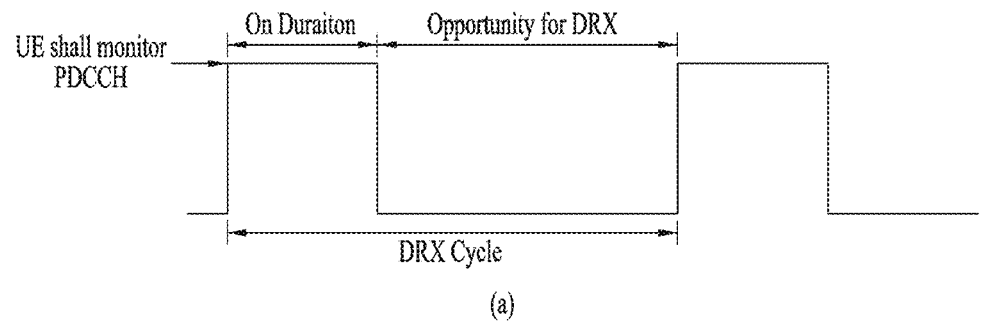
(a)
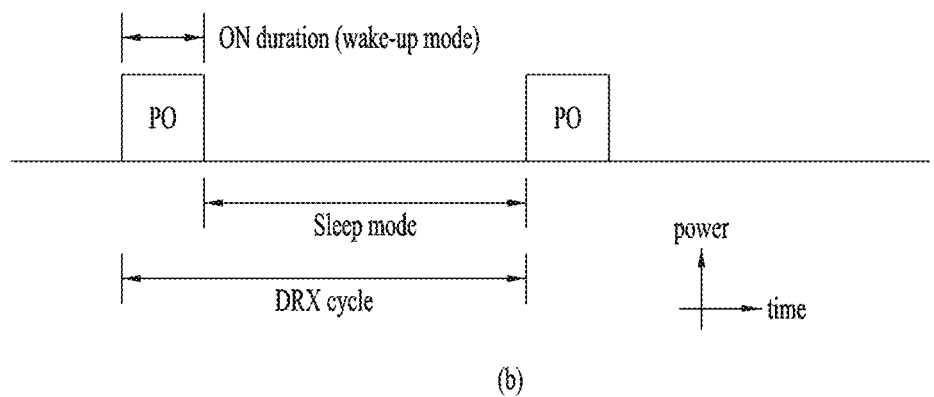
(b)

METHOD FOR TRANSMITTING AND RECEIVING SIGNAL IN WIRELESS COMMUNICATION SYSTEM AND APPARATUS FOR SUPPORTING SAME

CROSS-REFERENCE TO RELATED APPLICATIONS

This application is a National Stage application under 35 U.S.C. § 371 of International Application No. PCT/KR2020/000519, filed on Jan. 10, 2020, which claims the benefit of Korean Application Nos. 10-2019-0051928, filed on May 3, 2019, 10-2019-0035529, filed on Mar. 28, 2019, 10-2019-0018240, filed on Feb. 15, 2019, and 10-2019-0004025, filed on Jan. 11, 2019. The disclosures of the prior applications are incorporated by reference in their entirety.

TECHNICAL FIELD

Embodiments of the present disclosure relate to a wireless communication system, and more particularly, to a method and apparatus for transmitting and receiving a signal in a wireless communication system.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

SUMMARY

Various embodiments of the present disclosure may provide a method and apparatus for transmitting and receiving a signal in a wireless communication system.

For example, various embodiments of the present disclosure may provide a method and apparatus for transmitting and receiving an initial signal including information related to transmission of a transmission burst in a wireless communication system.

For example, various embodiments of the present disclosure may provide a method and apparatus for transmitting and receiving a physical downlink control channel (PDCCH) based on search space set switching in a wireless communication system.

For example, various embodiments of the present disclosure may provide a method and apparatus for performing cross-carrier scheduling (CCS) in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Various embodiments of the present disclosure may provide a method and apparatus for transmitting and receiving a signal in a wireless communication system.

According to various embodiments of the present disclosure, a method performed by a device in a wireless communication system may be provided.

According to an exemplary embodiment, the method may include obtaining information regarding groups of at least one search space set related to physical downlink control channel (PDCCH) monitoring, the groups including a first group and a second group, and performing the PDCCH monitoring based on the information regarding the groups.

According to an exemplary embodiment, the PDCCH monitoring is performed according to a search space set related to one of the groups and based on at least one of predetermined conditions being satisfied, (i) the PDCCH monitoring may be started according to a search space set related to another group different from the one group among the groups, and (ii) the PDCCH monitoring may be ended according to the search space set related to the one group.

According to an exemplary embodiment, the PDCCH monitoring is performed according to a search space set related to the second group and based on information related to a channel occupancy time (COT) being indicated by downlink control information (DCI), (i) the PDCCH monitoring may be started according to a search space set related to the first group after the COT and (ii) the PDCCH monitoring may be ended according to the search space set related to the second group after the COT.

According to an exemplary embodiment, the at least one search space set may be configured in an unlicensed band.

According to an exemplary embodiment, the DCI may further indicate information related to occupied frequency resources in the unlicensed band.

According to an exemplary embodiment, the size of the frequency resources may be an N multiple of the size of a frequency unit in which a channel access procedure (CAP) for the unlicensed band is performed, and N may be a natural number.

According to an exemplary embodiment, the search space set related to the first group may be located outside the COT in a time domain, and the search space set related to the second group may be located inside the COT in the time domain.

According to an exemplary embodiment, the search space set related to the first group may be configured periodically based on a first periodicity in the time domain.

According to an exemplary embodiment, the search space set related to the second group may be configured periodically based on a second periodicity different from the first periodicity in the time domain.

According to an exemplary embodiment, the information regarding the groups may be obtained based on higher-layer signaling.

According to an exemplary embodiment, based on discontinuous reception (DRX) being configured for the device, the PDCCH monitoring may be performed in an on duration of the DRX.

According to various embodiments of the present disclosure, a device configured to operate in a wireless communication system may be provided.

According to an exemplary embodiment, the device may include at least one memory and at least one processor coupled with the at least one memory.

According to an exemplary embodiment, the at least one processor may be configured to obtain information regarding groups of at least one search space set related to physical downlink control channel (PDCCH) monitoring, the groups including a first group and a second group, and perform the PDCCH monitoring based on the information regarding the groups.

According to an exemplary embodiment, the PDCCH monitoring is performed according to a search space set related to the second group and based on information related to a channel occupancy time (COT) being indicated by downlink control information (DCI), (i) the PDCCH monitoring may be started according to a search space set related to the first group after the COT and (ii) the PDCCH monitoring may be ended according to the search space set related to the second group after the COT.

According to an exemplary embodiment, the device may be configured to communicate with at least one of a mobile terminal, a network, or an autonomous driving vehicle other than a vehicle including the device.

According to various embodiments of the present disclosure, a method performed by a device in a wireless communication system may be provided.

According to an exemplary embodiment, the method may include transmitting information regarding groups of at least one search space set related to PDCCH monitoring, the groups including a first group and a second group, and transmitting a PDCCH related to the information regarding the groups.

According to various embodiments of the present disclosure, a device configured to operate in a wireless communication system may be provided.

According to an exemplary embodiment, the device may include at least one memory and at least one processor coupled with the at least one memory.

According to an exemplary embodiment, the at least one processor may be configured to transmit information regarding groups of at least one search space set related to PDCCH monitoring, the groups including a first group and a second group, and transmit a PDCCH related to the information regarding the groups.

According to various embodiments of the present disclosure, a device configured to operate in a wireless communication system may be provided.

According to an exemplary embodiment, the device may include at least one processor, and at least one memory storing at least one instruction which causes the at least one processor to perform a method, According to an exemplary embodiment, the method may include obtaining information regarding groups of at least one search space set related to PDCCH monitoring, the groups including a first group and a second group, and performing the PDCCH monitoring based on the information regarding the groups.

According to various embodiments of the present disclosure, a processor-readable medium storing at least one instruction which causes at least one processor to perform a method may be provided.

According to an exemplary embodiment, the method may include obtaining information regarding groups of at least one search space set related to physical downlink control channel PDCCH monitoring, the groups including a first group and a second group, and performing the PDCCH monitoring based on the information regarding the groups.

Various embodiments of the present disclosure as described above are only some of preferred embodiments of the present disclosure, and those skilled in the art may derive and understand many embodiments in which technical features of the various embodiments of the present disclosure are reflected based on the following detailed description.

According to various embodiments of the present disclosure, the following effects may be achieved.

According to various embodiments of the present disclosure, a method and apparatus for transmitting and receiving a signal in a wireless communication system may be provided.

Further, according to various embodiments of the present disclosure, a user equipment (UE) may be aware of the presence of an opportunistic base station (BS) transmission after success of a channel access procedure (CAP), based on an initial signal and accordingly receive a physical downlink control channel (PDCCH) and/or a physical downlink shared channel (PDSCH) and/or measure channel state information (CSI).

Further, according to various embodiments of the present disclosure, power consumption of a UE for PDCCH monitoring within a channel occupancy time (COT) of a BS may be reduced.

Further, according to various embodiments of the present disclosure, the probability of succeeding in downlink control information (DCI) transmission and reception may be increased.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 13 is a diagram illustrating exemplary slot formats according to various embodiments of the present disclosure;

FIG. 14 is a diagram illustrating exemplary resource sharing for enhanced mobile broadband (eMBB) transmission and ultra-reliable and low latency communications (URLLC) transmission according to various embodiments of the present disclosure;

FIG. 19 is a diagram illustrating an exemplary wireless communication system supporting an unlicensed band to which various embodiments of the present disclosure are applicable;

FIG. 30 is a diagram illustrating an exemplary discontinuous reception (DRX) operation according to various embodiments of the present disclosure;

DETAILED DESCRIPTION

Figure 1:
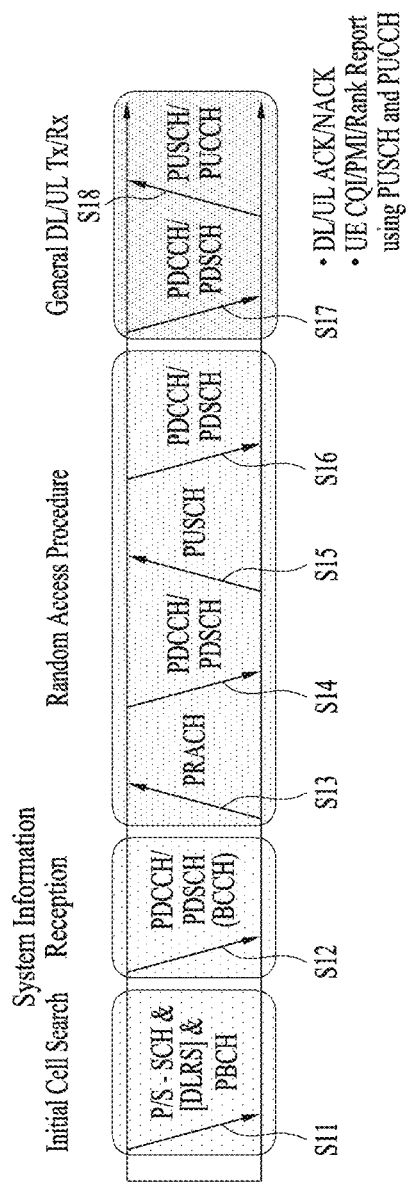
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the various embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The various embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the various embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the various embodiments of the present disclosure, in the various embodiments of the present disclosure may be explained by the above standard specifications. All terms used in the various embodiments of the present disclosure may be explained by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
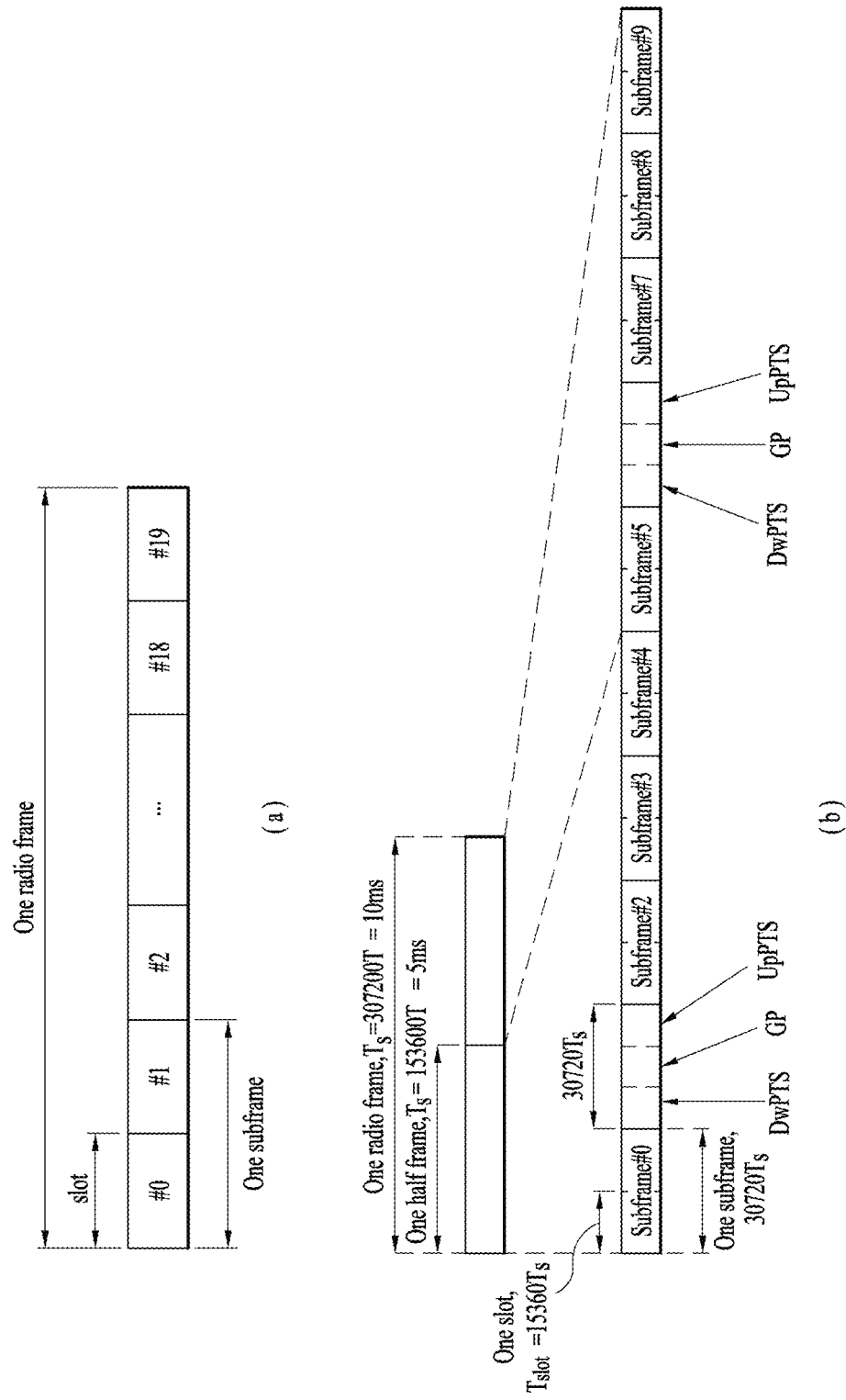
FIG. 2 is a diagram illustrating a radio frame structure in a long term evolution (LTE) system to which various embodiments of the present disclosure are applicable.
Figure 3:
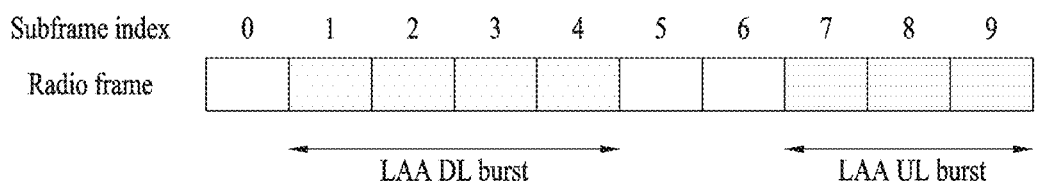
FIG. 3 is a diagram illustrating a radio frame structure in an LTE system to which various embodiments of the present disclosure are applicable.

FIGS. 2 and 3 illustrate radio frame structures in an LTE system to which various embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2(a) illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| | Subslot number | | | | | |
|---|---|---|---|---|---|---|
| | 0 | 1 | 2 | 3 | 4 | 5 |
| | | | Slot number | | | |
| | 2i | | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2(b) illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

TABLE 3

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | (2 + X) · 2192 · $T_s$ | (2 + X) · 2560 · $T_s$ |
| 5 | 6592 · $T_s$ | (2 + X) · 2192 · $T_s$ | (2 + X) · 2560 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |
| 10 | 13168 · $T_s$ | 13152 · $T_s$ | 12800 · $T_s$ | — | — | — |

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

Figure 4:
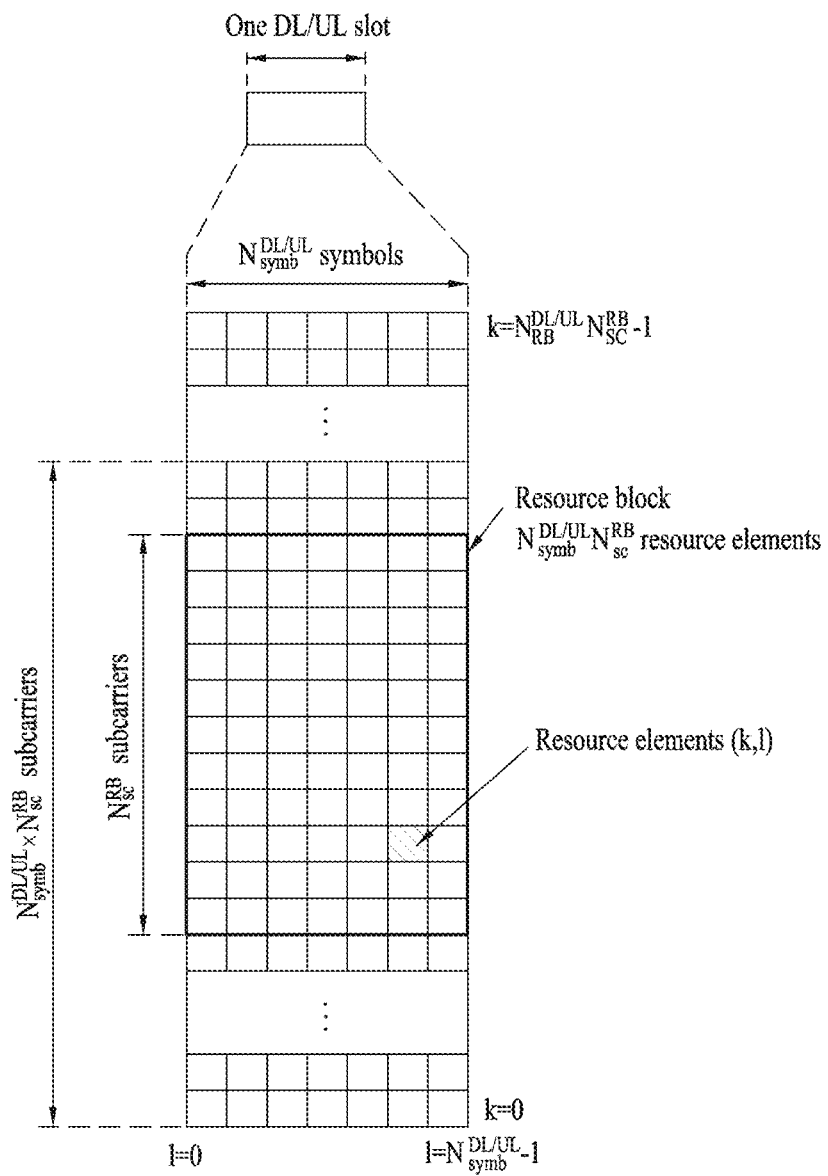
FIG. 4 is a diagram illustrating a slot structure in an LTE system to which various embodiments of the present disclosure are applicable.

FIG. 4 is a diagram illustrating a slot structure in an LTE system to which various embodiments of the present disclosure are applicable.

Referring to FIG. 4, a slot includes a plurality of orthogonal frequency division multiplexing (OFDM) symbols in the time domain by a plurality of resource blocks (RBs) in the frequency domain. A symbol may refer to a symbol duration. A slot structure may be described by a resource grid including $N^{DL/UL}_{RB}N^{RB}_{sc}$ subcarriers and $N^{DL/UL}_{symb}$ symbols. $N^{DL}_{RB}$ represents the number of RBs in a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to an SCS and a CP length (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot. k is a frequency-domain index ranging from 0 to $N^{DL/UL}_{RB}xN^{RB}_{sc}-1$ and 1 is a time-domain index ranging from 0 to $N^{DL/UL}_{symb}-1$.

Figure 5:
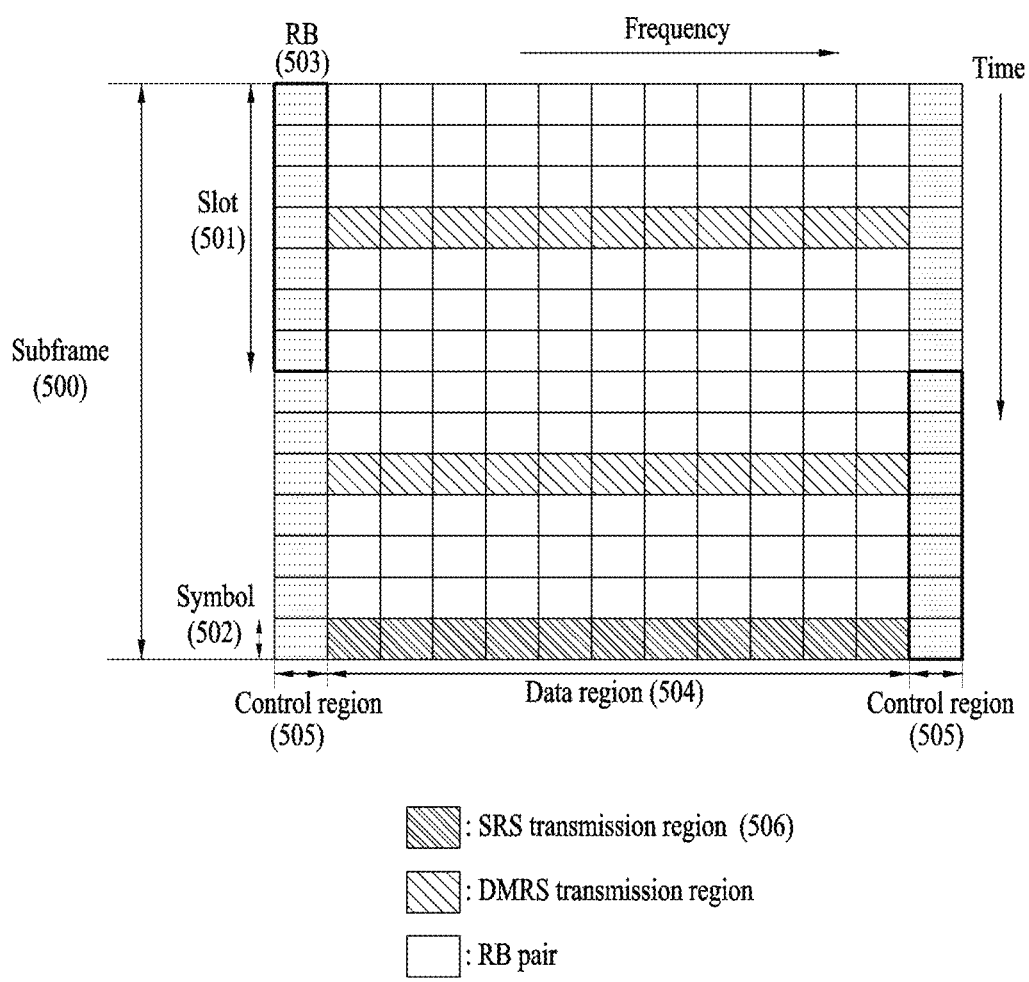
FIG. 5 is a diagram illustrating an uplink (UL) subframe structure in an LTE system to which various embodiments of the present disclosure are applicable.

FIG. 5 is a diagram illustrating a UL subframe structure in an LTE system to which various embodiments of the present disclosure are applicable.

Referring to FIG. 5, one subframe 500 includes two 0.5-ms slots 501. Each slot includes a plurality of symbols 502, each corresponding to one SC-FDMA symbol. An RB 503 is a resource allocation unit corresponding to 12 subcarriers in the frequency domain by one slot in the time domain.

A UL subframe is divided largely into a control region 504 and a data region 505. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 6:
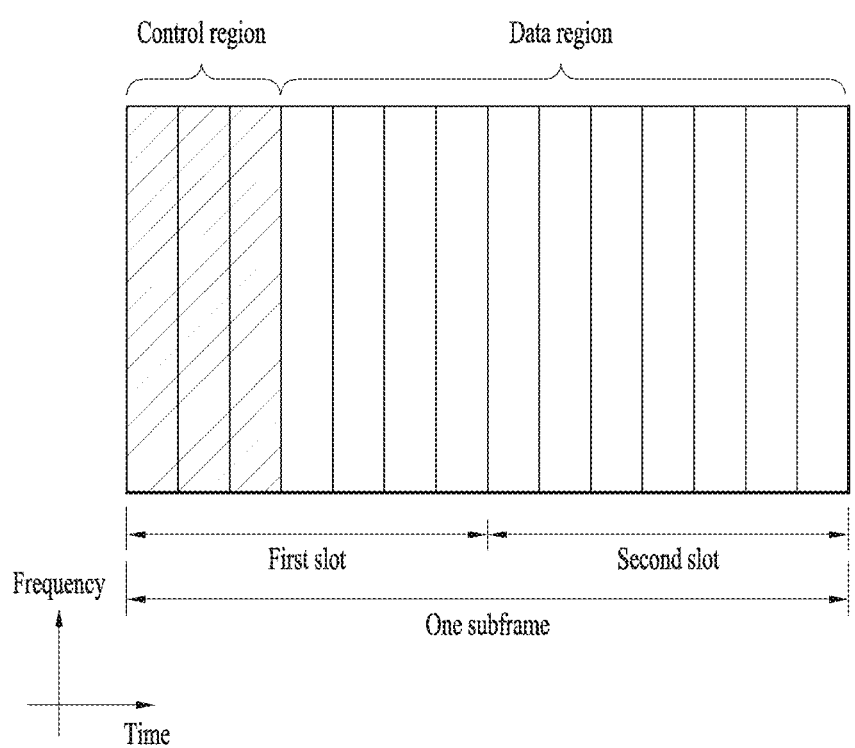
FIG. 6 is a diagram illustrating a downlink (DL) subframe structure in an LTE system to which various embodiments of the present disclosure are applicable.

FIG. 6 is a diagram illustrating a DL subframe structure in an LTE system to which various embodiments of the present disclosure are applicable.

Referring to FIG. 6, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, conveying information about the number of OFDM symbols (i.e., the size of a control region) used for transmission of control channels in the subframe. The PHICH is a response channel for a UL transmission, conveying a hybrid automatic repeat request (HARQ) acknowledgement (ACK)/negative acknowledgement (NACK) signal. Control information delivered on the PDCCH is called downlink control information (DCI). The DCI includes UL resource allocation information, DL resource control information, or a UL transmit (Tx) power control command for any UE group.

Figure 7:
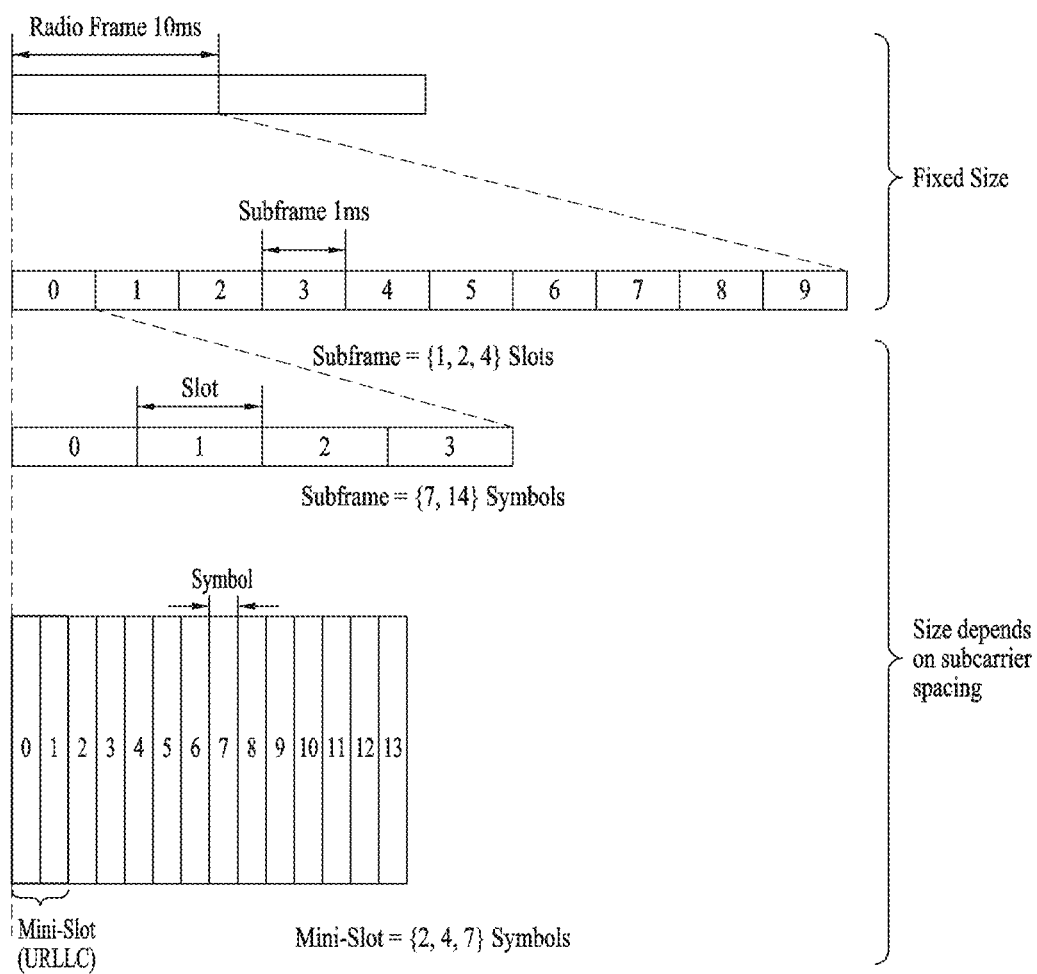
FIG. 7 is a diagram illustrating a radio frame structure in a new radio access technology (NR) system to which various embodiments of the present disclosure are applicable.

FIG. 7 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 4. For a bandwidth part, μ and a CP are obtained from RRC parameters provided by the BS.

TABLE 4

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 5 below defines the NR frequency band, by way of example.

TABLE 5

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/100)*T_c=1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s * N^\mu_{symb}$ in the same subframe.

Table 6 lists the number of symbols per slot, the number of slots per frame, and the number of slots per subframe, for each SCS in a normal CP case, and Table 7 lists the number of symbols per slot, the number of slots per frame, and the number of slots per subframe, for each SCS in an extended CP case.

TABLE 6

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 7

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 7 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Figure 8:
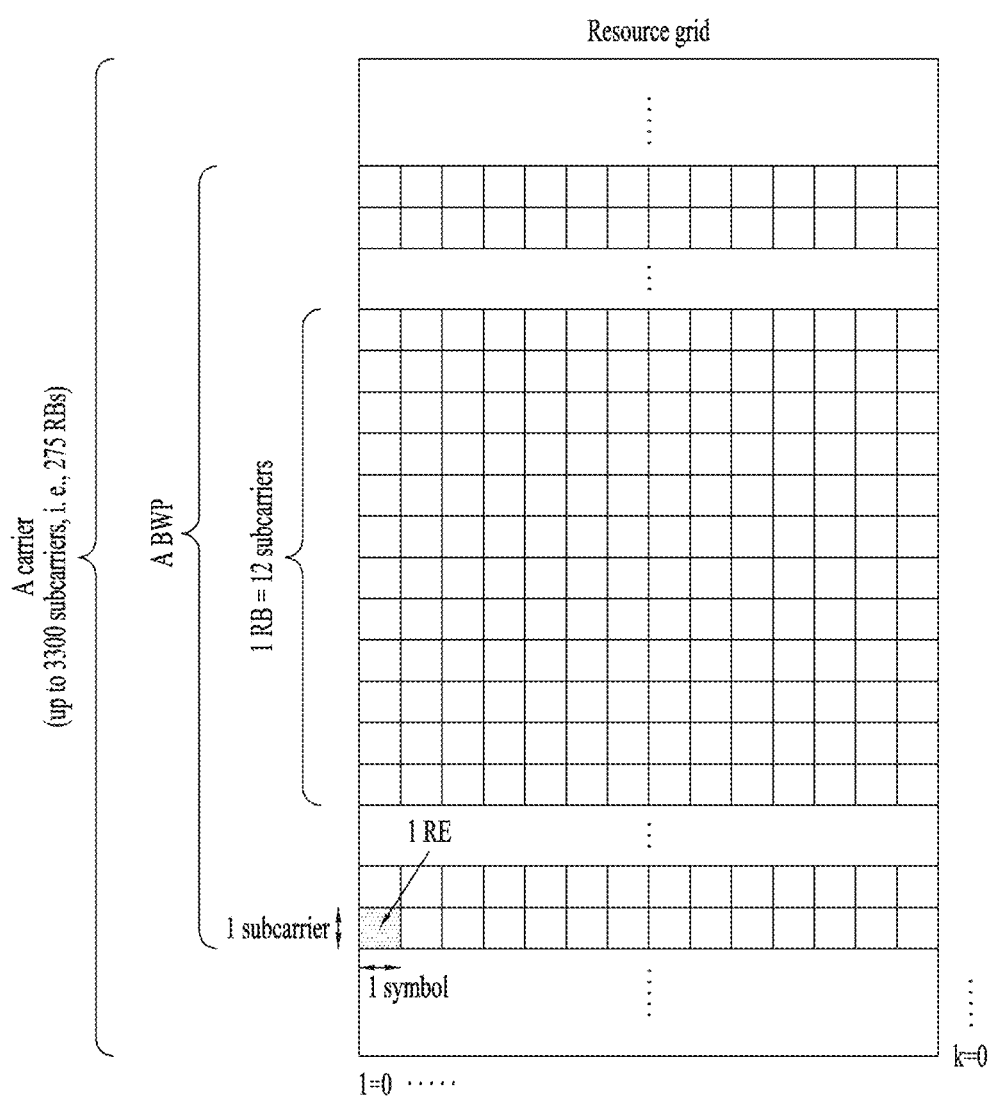
FIG. 8 is a diagram illustrating a slot structure in an NR system to which various embodiments of the present disclosure are applicable.

FIG. 8 is a diagram illustrating a slot structure in an NR system to which various embodiments of the present disclosure are applicable.

Referring FIG. 8, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 9:
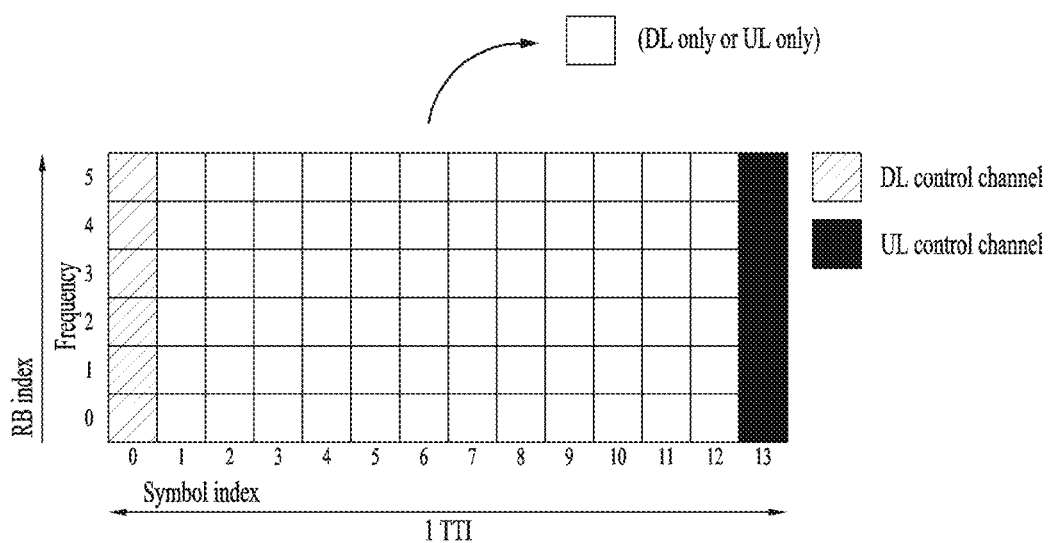
FIG. 9 is a diagram illustrating a self-contained slot structure to which various embodiments of the present disclosure are applicable.

FIG. 9 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
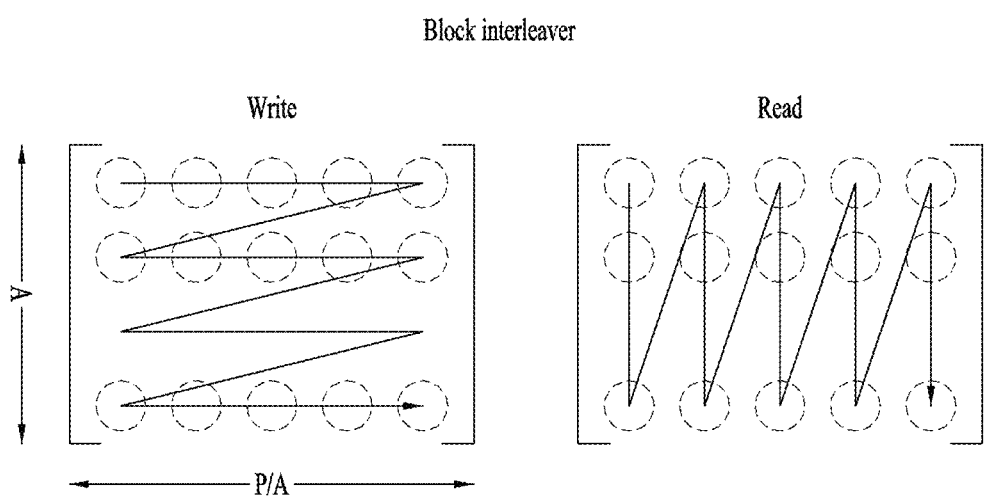
FIG. 12 is a diagram illustrating an exemplary block interleaver according to various embodiments of the present disclosure.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 10:
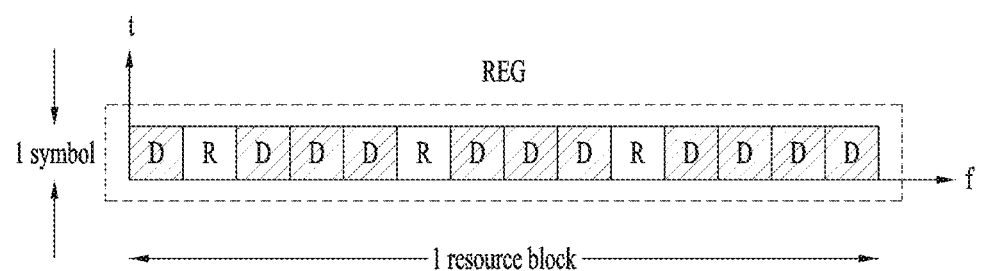
FIG. 10 is a diagram illustrating the structure of one resource element group (REG) in an NR system to which various embodiments of the present disclosure are applicable.

FIG. 10 is a diagram illustrating the structure of one REG to which various embodiments of the present disclosure are applicable.

In FIG. 10, D represents an RE to which DCI is mapped, and R represents an RE to which a DMRS is mapped. The DMRS is mapped to REs #1, #5, and #9 along the frequency axis in one symbol The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:
  sameAsREG-bundle: It equals to an REG bundle size in the frequency domain.
  allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

Figure 11:
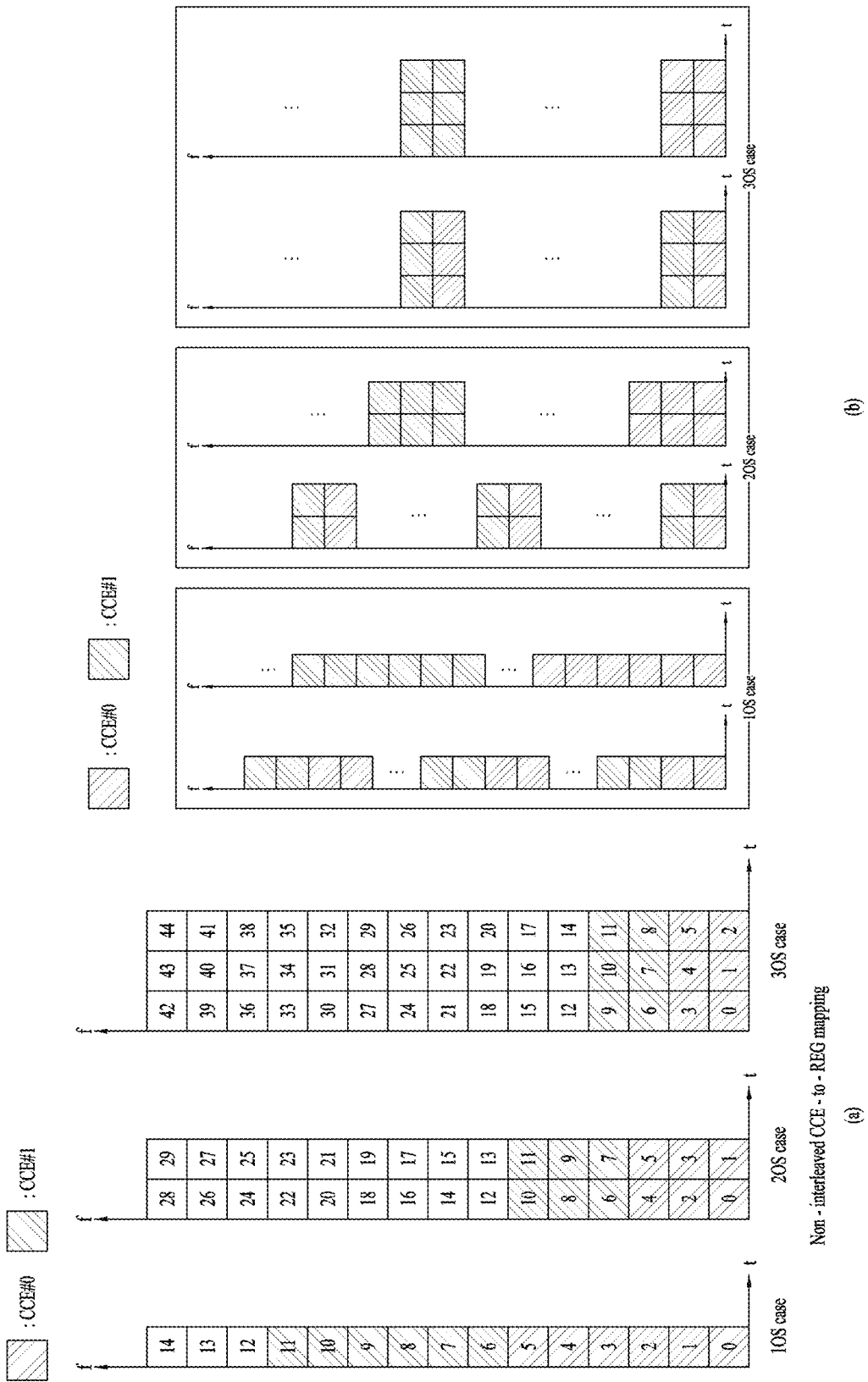
FIG. 11 is a diagram illustrating exemplary control channel element (CCE)-to-resource element group (REG) mapping types according to various embodiments of the present disclosure.

FIG. 11 is a diagram illustrating exemplary CCE-to-REG mapping types according to various embodiments of the present disclosure.

FIG. 11(*a*) is a diagram illustrating exemplary non-interleaved CCE-to-REG mapping according to various embodiments of the present disclosure.
  Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

FIG. 11(*b*) is a diagram illustrating exemplary interleaved CCE-to-REG mapping.
  Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

FIG. 12 illustrates an exemplary block interleaver according to various embodiments of the present disclosure.

For the above interleaving operation, the number A of rows in a (block) interleaver is set to one of 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. C4. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters:

- controlResourceSetId: A set of control resources related to the search space set.
- monitoringSlotPeriodicityAndOffset: A PDCCH monitoring periodicity (in slots) and a PDCCH monitoring offset (in slots).
- monitoringSymbolsWithinSlot: A PDCCH monitoring pattern (e.g., the first symbol(s) in the CORESET) in a PDCCH monitoring slot.
- nrofCandidates: The number of PDCCH candidates for each AL={1, 2, 4, 8, 16} (one of 0, 1, 2, 3, 4, 5, 6, and 8).

Table 8 lists exemplary features of the respective search space types.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 9 lists exemplary DCI formats transmitted on the PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 9-continued

| DCI format | Usage |
|---|---|
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 10 lists exemplary PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Bandwidth Part (BWP)

The NR system to which various embodiments of the present disclosure are applicable may allocate/support up to 400-MHz frequency resources per component carrier (CC). If a UE operating in such a wideband CC always keeps a radio frequency (RF) module on for the whole CC, the battery consumption of the UE may increase.

Alternatively, considering multiple use cases (e.g., eMBB, URLLC, mMTC, V2X, and so on) operating in one wideband CC, different numerologies (e.g., SCSs) may be supported for different frequency bands of the CC.

Alternatively, each UE may have a different capability for a maximum bandwidth.

In this regard, the BS may indicate to/configure the UE to operate only in a partial bandwidth, not the total bandwidth of the wideband CC. The partial bandwidth is referred to as a bandwidth part (BWP).

A BWP may include contiguous RBs in the frequency domain and correspond to one numerology (e.g., an SCS, a CP length, and/or a slot/mini-slot duration).

The BS may configure one or more BWPs in one CC configured for the UE. For example, the BS may configure a BWP occupying a relatively small frequency area in a PDCCH monitoring slot and schedule a PDSCH indicated (or scheduled) by a PDCCH in a larger BWP than the BWP. Alternatively, if UEs are concentrated in a specific BWP, the BS may configure another BWP for some of the UEs, for load balancing. Alternatively, for frequency-domain inter-cell interference cancellation between adjacent cells, the BS may configure BWPs at both ends of the total bandwidth except for some spectrum in the same slot.

The BS may configure at least one DL/UL BWP for a UE associated with a wideband CC, activate at least one of the configured DL/UL BWP(s) at a specific time (by L1 signaling (e.g., DCI or the like), MAC signaling, or RRC signaling). The activated DL/UL BWP may be referred to as an active DL/UL BWP. Before initial access or RRC connection setup, the UE may not receive a DL/UL BWP configuration from the BS. A DL/UL BWP that the UE assumes in this situation is defined as an initial active DL/UL BWP.

More specifically, according to various embodiments of the present disclosure, the UE may perform the following BWP operation.

A UE, which has been configured to operate BWPs of a serving cell, is configured with up to four DL BWPs within the DL bandwidth of the serving cell by a higher-layer parameter (e.g., DL-BWP or BWP-Downlink) and up to four UL BWPs within the UL bandwidth of the serving cell by a higher-layer parameter (e.g., UL BWP or BWP-Uplink).

When the UE fails to receive a higher-layer parameter initialDownlinkBWP, an initial active DL BWP may be defined by the positions and number of consecutive PRBs: consecutive PRBs from the lowest index to the highest index among PRBs included in a CORESET for a Type-0 PDCCH CSS set. Further, the initial active DL BWP is defined by an SCS and a CP for PDCCH reception in the CORESET for the Type-0 PDCCH CSS set. Alternatively, the initial active DL BWP is provided by the higher-layer parameter initial-DownlinkBWP. For an operation in a primary cell or a secondary cell, an initial active UL BWP is indicated to the UE by a higher-layer parameter initialUplinkBWP. When a supplementary UL carrier is configured for the UE, an initial active UL BWP on the supplementary UL carrier may be indicated to the UE by initialUplinkBW in a higher-layer parameter supplementary Uplink.

When the UE has a dedicated BWP configuration, the UE may be provided with a first active DL BWP for reception by a higher-layer parameter firstActiveDownlinkBWP-Id and a first active UL BWP for transmission on the carrier of the primary cell by a higher-layer parameter firstActive-UphnkGBWP-Id.

For each DL BWP of a DL BWP set or each UL BWP of a UL BWP set, the UE may be provided with the following parameters.

An SCS provided based on a higher-layer parameter (e.g., subcarrierSpacing).

A CP provided based on a higher-layer parameter (e.g., cyclicPrefix).

The number of common RBs and contiguous RBs is provided based on a higher-layer parameter locationAndBandwidth. The higher-layer parameter locationAndBandwidth indicates an offset $RB_{start}$ and a length $L_{RB}$ based on a resource indication value (RIV). It is assumed that $N^{size}_{BWP}$ is 275 and $O_{carrier}$ is provided by offsetToCarrier for the higher-layer parameter subcarrierSpacing.

An index in the set of DL BWPs or the set of UL BWPs, provided based on a higher-layer parameter (e.g., bwp-Id) in UL and DL independently.

A BWP-common set parameter or BWP-dedicated set parameter provided based on a higher-layer parameter (e.g., bwp-Common or bwp-Dedicated).

For an unpaired spectrum operation, a DL BWP in a set of DL BWPs with indexes provided by a higher-layer parameter (e.g., bwp-Id) is linked to a UL BWP in a set of UL BWPs with the same indexes, when the DL BWP index and the UL BWP index are identical. For the unpaired spectrum operation, when the higher-layer parameter bwp-Id of a DL BWP is the same as the higher-layer parameter bwp-Id of a UL BWP, the UE does not expect to receive a configuration in which the center frequency for the DL BWP is different from the center frequency for the UL BWP.

For each DL BWP in a set of DL BWPs of the primary cell (referred to as PCell) or of a PUCCH secondary cell (referred to as PUCCH-SCell), the UE may configure CORESETs for every CSS set and a USS. The UE does not expect to be configured without a CSS on the PCell or the PUCCH-SCell in an active DL BWP.

When the UE is provided with controlResourceSetZero and searchSpaceZero in a higher-layer parameter PDCCH-ConfigSIB1 or a higher-layer parameter PDCCH-Config-Common, the UE determines a CORESET for a search space set based on controlResourcesetZero and determines corresponding PDCCH monitoring occasions. When the active DL BWP is not the initial DL BWP, the UE determines PDCCH monitoring occasions for the search space set, only if the bandwidth of the CORESET is within the active DL BWP and the active DL BWP has the same SCS configuration and CP as the initial DL BWP.

For each UL BWP in a set of UL BWPs of the PCell or the PUCCH-SCell, the UE is configured with resource sets for PUCCH transmissions.

The UE receives a PDCCH and a PDSCH in a DL BWP according to a configured SCS and CP length for the DL BWP. The UE transmits a PUCCH and a PUSCH in a UL BWP according to a configured SCS and CP length for the UL BWP.

When a bandwidth part indicator field is configured in DCI format 1_1, the value of the bandwidth part indicator field indicates an active DL BWP in the configured DL BWP set, for DL receptions. When a bandwidth part indicator field is configured in DCI format 0_1, the value of the bandwidth part indicator field indicates an active UL BWP in the configured UL BWP set, for UL transmissions.

If a bandwidth part indicator field is configured in DCI format 0_1 or DCI format 1_1 and indicates a UL or DL BWP different from the active UL BWP or DL BWP, respectively, the UE may operate as follows.

For each information field in the received DCI format 0_1 or DCI format 1_1,
if the size of the information field is smaller than a size required for interpretation of DCI format 0_1 or DCI format 1_1 for the UL BWP or DL BWP indicated by the bandwidth part indicator, the UE prepends zeros to the information field until its size is the size required for the interpretation of the information field for the UL BWP or DL BWP before the information field of DCI format 0_1 or DCI format 1_1 is interpreted.
if the size of the information field is larger than the size required for interpretation of DCI format 0_1 or DCI format 1_1 for the UL BWP or DL BWP indicated by the bandwidth part indicator, the UE uses as many least significant bits (LSBs) of DCI format 0_1 or DCI format 1_1 as the size required for the UL BWP or DL BWP indicated by the bandwidth part indicator before interpreting the information field of DCI format 0_1 or DCI format 1_1.

The UE sets the active UL BWP or DL BWP to the UL BWP or DL BWP indicated by the bandwidth part indicator in DCI format 0_1 or DCI format 1_1.

The UE does not expect to detect DCI format 1_1 or DCI format 0_1 indicating an active DL BWP or active UL BWP change with a time-domain resource assignment field providing a slot offset value smaller than a delay required for the UE for an active DL BWP change or UL BWP change.

When the UE detects DCI format 1_1 indicating an active DL BWP change for a cell, the UE is not required to receive or transmit a signal in the cell during a time period from the end of the third symbol of a slot in which the UE receives a PDCCH including DCI format 1_1 until the beginning of a slot indicated by the slot offset value of the time-domain resource assignment field in DCI format 1_1.

If the UE detects DCI format 0_1 indicating an active UL BWP change for a cell, the UE is not required to receive or transmit a signal in the cell during a time period from the end of the third symbol of a slot in which the UE receives a PDCCH including DCI format 0_1 until the beginning of a slot indicated by the slot offset value of the time-domain resource assignment field in DCI format 0_1.

The UE does not expect to detect DCI format 1_1 indicating an active DL BWP change or DCI format 0_1 indicating an active UL BWP change in a slot other than the first slot of a set of slots for the SCS of a cell that overlaps with a time period during which the UE is not required to receive or transmit a signal for an active BWP change in a different cell.

The UE expects to detect DCI format 0_1 indicating an active UL BWP change or DCI format 1_1 indicating an active DL BWP change, only if a corresponding PDCCH is received within the first 3 symbols of a slot.

For the serving cell, the UE may be provided with a higher-layer parameter defaultDownlinkBWP-Id indicating a default DL BWP among the configured DL BWPs. If the UE is not provided with a default DL BWP by defaultDownlinkBWP-Id, the default DL BWP may be set to the initial active DL BWP.

When the UE is provided with a timer value for the PCell by a higher-layer parameter bwp-Inactivity Timer and the timer is running, the UE decrements the timer at the end of a subframe for FR1 (below 6 GHz) or at the end of a half subframe for FR2 (above 6 GHz), if a restarting condition is not met during a time period corresponding to the subframe for FR1 or a time periodcorresponding to the half-subframe for FR2.

For a cell in which the UE changes an active DL BWP due to expiration of a BWP inactivity timer and for accommodating a delay in the active DL BWP change or the active UL BWP change required by the UE, the UE is not required to receive or transmit a signal in the cell during a time period from the beginning of a subframe for FR1 or a half subframe for FR2, immediately after the BWP inactivity timer expires until the beginning of a slot in which the UE may receive or transmit a signal.

When the BWP inactivity timer of the UE for the specific cell expires within the time period during which the UE is not required to receive or transmit a signal for the active UL/DL BWP change in the cell or in a different cell, the UE may delay the active UL/DL BWP change triggered by expiration of the BWP activity timer until the subframe for FR1 or the half-subframe for FR2 immediately after the UE completes the active UL/DL BWP change in the cell or in the different cell.

When the UE is provided with a first active DL BWP by a higher-layer parameter firstActiveDownlinkBWP-Id and a first active UL BWP by a higher-layer parameter firstActiveUplinkBWP-Id on a carrier of the secondary cell, the UE uses the indicated DL BWP and the indicated UL BWP as the respective first active DL BWP and first active UL BWP on the carrier of the secondary cell.

For a paired spectrum operation, when the UE changes an active UL BWP on the PCell during a time period between a detection time of DCI format 1_0 or DCI format 1_1 and a transmission time of a corresponding PUCCH including HARQ-ACK information, the UE does not expect to transmit the PUCCH including the HARQ-ACK information in PUCCH resources indicated by DCI format 1_0 or DCI format 1_1.

When the UE performs radio resource management (RRM) measurement for a bandwidth outside the active DL BWP for the UE, the UE does not expect to monitor a PDCCH.

1.5. Slot Configuration

In various embodiments of the present disclosure, a slot format includes one or more DL symbols, one or more UL symbols, and a flexible symbol. In various embodiments of the present disclosure, the corresponding configurations will be described as DL, UL, and flexible symbol(s), respectively, for the convenience of description.

The following may be applied to each serving cell.

When the UE is provided with a higher-layer parameter TDD-UL-DL-ConfigurationCommon, the UE may configure a slot format per slot over a certain number of slots, indicated by the higher-layer parameter TDD-UL-DL-ConfigurationCommon.

The higher-layer parameter TDD-UL-DL-ConfigurationCommon may provide the following.

A reference SCS configuration $\mu_{ref}$ based on a higher-layer parameter referenceSubcarrierSpacing.

A higher-layer parameter pattern1.

The higher-layer parameter pattern1 may provide the following.

A slot configuration periodicity P msec based on a higher-layer parameter dl-UL-TransmissionPeriodicity.

The number $d_{slots}$ of slots including only DL symbols based on a higher-layer parameter nrofDownlinkSlots.

The number $d_{sym}$ of DL symbols based on a higher-layer parameter nrofDownlinkSymbols.

The number $u_{slots}$ of slots including only UL symbols based on a higher-layer parameter nrofUplinkSlots.

The number $U_{sym}$ of UL symbols based on a higher-layer parameter nrofUplinkSymbols.

For an SCS configuration $\mu_{ref}=3$, only P=0.625 msec may be valid. For an SCS configuration $\mu_{ref}=2$ or $\mu_{ref}=3$, only P=1.25 msec may be valid. For an SCS configuration $\mu_{ref}=1$, $\mu_{ref}=2$ or $\mu_{ref}=3$, only P=2.5 msec may be valid.

The slot configuration periodicity (P msec) includes S slots given by $S=P\cdot 2^{\mu_{ref}}$ in an SCS configuration $\mu_{ref}$. The first $d_{slots}$ slots of the S slots include only DL symbols, and the last $u_{slots}$ slots of the S slots include only UL symbols. $d_{sym}$ symbols following the first $d_{slots}$ slots are DL symbols. $u_{sym}$ symbols preceding the $u_{slots}$ slots are UL symbols. The remaining $(S-d_{slots}-u_{slots})\cdot N_{symb}^{slot}-d_{sym}-u_{sym}$ symbols are flexible symbols.

The first symbol of every 20/P period is the first symbol of an even-numbered frame.

When the higher-layer parameter TDD-UL-DL-ConfigurationCommon provides higher-layer parameters pattern1 and pattern2, the UE configures a slot format per slot over a first number of slots based on the higher-layer parameter pattern1, and a slot format per slot over a second number of slots based on the higher-layer parameter pattern2.

The higher-layer parameter pattern2 may provide the following.

A slot configuration periodicity $P_2$ msec based on a higher-layer parameter dl-UL-TransmissionPeriodicity The number $d_{slots,2}$ of slots including only DL symbols based on a higher-layer parameter nrofDownlinkSlots.

The number $d_{sym,2}$ of DL symbols based on a higher-layer parameter nrofDownlinkSymbols.

The number $u_{slots,2}$ of slots including only UL symbols based on a higher-layer parameter nrofUplinkSlots.

The number $u_{sym,2}$ of UL symbols based on a higher-layer parameter nrofUplinkSymbols.

A $P_2$ value applicable according to an SCS configuration is equal to a P value applicable according to the SCS configuration.

A slot configuration periodicity P+P2 msec includes the first S slots where $S=P\cdot 2^{\mu_{ref}}$ and the second $S_2$ slots where $S_2=P_2\cdot 2^{\mu_{ref}}$.

The first $d_{slots,2}$ ones of the $S_2$ slots include only DL symbols, and the last $u_{slots,2}$ ones of the $S_2$ slots include only UL symbols. $d_{sym,2}$ symbols following the first $d_{slots,2}$ slots are DL symbols. $u_{sym,2}$ symbols preceding the $u_{slots,2}$ slots are UL symbols. The remaining $lot\ (S_2-d_{slots,2}-u_{slots,2})\cdot N_{symb}^{slot}-d_{sym,2}-u_{sym,2}$ symbols are flexible symbols.

The UE expects the value of $P+P_2$ to be divided by 20 msec without a remainder. In other words, the UE expects the value of P+P2 to be an integer multiple of 20 msec.

The first symbol of every $20/(P+P_2)$ period is the first symbol of an even-numbered frame.

The UE expects that the reference SCS configuration $\mu_{ref}$ is smaller than or equal to an SCS configuration $\mu$ for any configured DL BWP or UL BWP. Each slot (configuration) provided by the higher-layer parameter pattern1 or pattern2 is applicable to $2^{(\mu-\mu_{ref})}$ consecutive slots in the active DL BWP or active UL BWP in the first slot which starts at the same time as the first slot for the reference SCS configuration $\mu_{ref}$. Each DL, flexible, or UL symbol for the reference SCS configuration $\mu_{ref}$ corresponds to $2^{(\mu-\mu_{ref})}$ consecutive DL, flexible, or UL symbols for the SCS configuration $\mu$.

When the UE is additionally provided with a higher-layer parameter Tdd-UL-DL-ConfigurationDedicated, the higher-layer parameter Tdd-UL-DL-ConfigurationDedicated overrides only flexible symbols per slot over the number of slots as provided by the higher-layer parameter Tdd-UL-DL-ConfigurationCommon.

The higher-layer parameter Tdd-UL-DL-ConfigurationDedicated may provide the following.

A set of slot configurations based on a higher-layer parameter slotSpecificConfigurationsToAddModList.

Each slot configuration in the set of slot configurations.

A slot index based on a higher-layer parameter slotIndex.

A set of symbols based on a higher-layer parameter symbols.

If the higher-layer parameter symbols=allDownlink, all symbols in the slot are DL symbols.

If the higher-layer parameter symbols=allUplink, all symbols in the slot are UL symbols.

If the higher-layer parameter symbols=explicit, the higher-layer parameter nrofDownlinkSymbols provides the number of first DL symbols in the slot, and the higher-layer parameter nrofUplinkSymbols provides the number of last UL symbols in the slot. If the higher-layer parameter nrofDownlinkSymbols is not provided, this implies that there are no first DL symbols in the slot. If the higher-layer parameter nrofUplinkSymbols is not provided, this implies that there are no last UL symbols in the slot. The remaining symbols in the slot are flexible symbols.

For each slot having an index provided by a higher-layer parameter slotIndex, the UE applies a (slot) format provided by a corresponding symbols. The UE does not expect the higher-layer parameter TDD-UL-DL-ConfigurationDedicated to indicate, as UL or DL, a symbol that the higher-layer parameter TDD-UL-DL-ConfigurationCommon indicates as DL or UL.

For each slot configuration provided by the higher-layer parameter TDD-UL-DL-ConfigurationDedicated, a reference SCS configuration is the reference SCS configuration $\mu_{ref}$ provided by the higher-layer parameter TDD-UL-DL-ConfigurationCommon.

A slot configuration periodicity and the number of DL/UL/flexible symbols in each slot of the slot configuration periodicity is determined based on the higher-layer parameters TDD-UL-DL-ConfigurationCommon and TDD-UL-DL-ConfigurationDedicated, and the information is common to each configured BWP.

The UE considers symbols in a slot indicated as DL by the higher-layer parameter TDD-UL-DL-ConfigurationCommon or TDD-UL-DL-ConfigurationDedicated to be available for signal reception. Further, the UE considers symbols in a slot indicated as UL by the higher-layer parameter TDD-UL-DL-ConfigurationCommon or TDD-UL-DL-ConfigurationDedicated to be available for signal transmission.

If the UE is not configured to monitor a PDCCH for DCI format 2_0, for a set of symbols of a slot that are indicated as flexible by the higher-layer parameter TDD-UL-DL-ConfigurationCommon or TDD-UL-DL-ConfigurationDedicated, or when the higher-layer parameters TDD-UL-DL-ConfigurationCommon and TDD-UL-DL-ConfigurationDedicated are not provided to the UE, the UE may operate as follows.

The UE may receive a PDSCH or a CSI-RS in the set of symbols of the slot, when the UE receives a corresponding indication by DCI format 1_0, DCI format 1_1, or DCI format 0_1.

The UE may transmit a PUSCH, a PUCCH, a PRACH, or an SRS in the set of symbols of the slot, if the UE receives a corresponding indication by DCI format 0_0, DCI format 0_1, DCI format 1_0, DCI format 1_1, or DCI format 2_3.

It is assumed that the UE is configured by the higher layer to receive a PDCCH, a PDSCH, or a CSI-RS in a set of symbols of a slot. When the UE does not detect DCI format 0_0, DCI format 0_1, DCI format 1_0, DCI format 1_1, or DCI format 2_3 that indicates to the UE to transmit a PUSCH, a PUCCH, a PRACH, or an SRS in at least one symbol of the set of symbols of the slot, the UE may receive the PDCCH, the PDSCH, or the CSI-RS. Otherwise, that is, when the UE detects DCI format 0_0, DCI format 0_1, DCI format 1_0, DCI format 1_1, or DCI format 2_3 that indicates to the UE to transmit a PUSCH, a PUCCH, a PRACH, or an SRS in at least one symbol of the set of symbols of the slot, the UE does not receive the PDCCH, the PDSCH, or the CSI-RS in the set of symbols of the slot.

When the UE is configured by the higher layer to transmit an SRS, a PUCCH, a PUSCH, or a PRACH in a set of symbols of a slot and detects DCI format 1_0, DCI format 1_1, or DCI format 0_1 indicating to the UE to receive a CSI-RS or a PDSCH in a subset of symbols from the set of symbols, the UE operates as follows.

The UE does not expect to cancel signal transmission in a subset of symbols that occur after fewer symbols than a PUSCH preparation time $T_{proc,2}$ for a corresponding UE processing capability on the assumption that $d_{2,1}=1$, relative to the last symbol of a CORESET in which the UE detects DCI format 1_0, DCI format 1_1, or DCI format 0_1.

The UE cancels the PUCCH, PUSCH, or PRACH transmission in the remaining symbols of the set of symbols, and cancels the SRS transmission in the remaining symbols of the set of symbols.

For a set of symbols of a slot that are indicated as UL by the higher-layer parameter TDD-UL-DL-ConfigurationCommon or TDD-UL-DL-ConfigurationDedicated, the UE does not receive a PDCCH, a PDSCH, or a CSI-RS in the set of symbols of the slot.

For a set of symbols of a slot that are indicated as DL by the higher-layer parameter TDD-UL-DL-ConfigurationCommon or TDD-UL-DL-ConfigurationDedicated, the UE does not transmit a PUSCH, a PUCCH, a PRACH, or an SRS in the set of symbols of the slot.

For a set of symbols of a slot that are indicated as flexible by the higher-layer parameter TDD-UL-DL-ConfigurationCommon or TDD-UL-DL-ConfigurationDedicated, the UE does not expect to receive a dedicated configuration for transmission from the UE and a dedicated configuration for reception at the UE in the set of symbols of the slot.

For a set of symbols of a slot indicated by a higher-layer parameter ssb-PositionsInBurst in a higher-layer parameter SystemInformationBlockType1 or ServingCellConfigCommon, for reception of SS/PBCH blocks, the UE does not transmit a PUSCH, a PUCCH, or a PRACH in the slot if a transmission overlaps with any symbol of the set of symbols, and the UE does not transmit an SRS in the set of symbols of the slot. When the higher-layer parameter TDD-UL-DL-ConfigurationCommon or TDD-UL-DL-ConfigDedicated is provided to the UE, the UE does not expect the set of symbols of the slot to be indicated as UL by the higher-layer parameter.

For a set of symbols of a slot corresponding to a valid PRACH occasion, and $N_{gap}$ symbols before the valid PRACH occasion, when a signal reception overlaps with any symbol of the set of symbols in the slot, the UE does not receive a PDCCH, a PDSCH, or a CSI-RS for a Type1-PDCCH CSS set. The UE does not expect the set of symbols of the slot to be indicated as DL by the higher-layer parameter TDD-UL-DL-ConfigurationCommon or TDD-UL-DL-ConfigDedicated.

For a set of symbols of a slot indicated by a higher-layer parameter pdcch-ConfigSIB1 in an MIB for a CORESET for a Type0-PDCCH CSS set, the UE does not expect the set of symbols to be indicated as UL by the higher-layer parameter TDD-UL-DL-ConfigurationCommon or TDD-UL-DL-ConfigDedicated.

When the UE is scheduled by DCI format 1_1 to receive a PDSCH over multiple slots, and the higher-layer parameter TDD-UL-DL-ConfigurationCommon or TDD-UL-DL-ConfigDedicated indicates that, for one of the multiple slots, at least one symbol in a set of symbols in which the UE is scheduled to receive a PDSCH in the slot is a UL symbol, the UE does not receive the PDSCH in the slot.

When the UE is scheduled by DCI format 0_1 to transmit a PUSCH over multiple slots, and the higher-layer parameter TDD-UL-DL-ConfigurationCommon or TDD-UL-DL-ConfigDedicated indicates that, for one of the multiple slots, at least one symbol in a set of symbols in which the UE is scheduled to receive a PDSCH in the slot is a DL symbol, the UE does not transmit the PUSCH in the slot.

A detailed description will be given below of a UE operation for determining a slot format. The UE operation may apply for a serving cell included in a set of serving cells configured for a UE by higher-layer parameters slotFormatCombToAddModList and slotFormatCombToReleaseList.

If the UE is configured with a higher-layer parameter SlotFormatIndicator, the UE is provided with an SFI-RNTI by a higher-layer parameter sfi-RNTI and with a payload size of DCI format 2_0 by a higher-layer parameter dci-PayloadSize.

For one or more serving cells, the UE is also provided with a configuration for a search space set S and a corresponding CORESET P. The search space set S and the corresponding CORESET P may be provided for monitoring $M_{p,s}^{(L_{SFI})}$ PDCCH candidates for DCI format 2_0 with a CCE aggregation level including $L_{SFI}$ CCEs.

The $M_{p,s}^{(L_{SFI})}$ PDCCH candidates are the first $M_{p,s}^{(L_{SFI})}$ PDCCH candidates for the CCE aggregation level $L_{SFI}$ for the search space set S in the CORESET P.

For each serving cell in the set of serving cells, the UE may be provided with:

an ID of the serving cell based on a higher-layer parameter servingCellId.

a location of an SFI-index field in DCI format 2_0 based on a higher-layer parameter positionInDCI.

a set of slot format combinations based on a higher-layer parameter slotFormatCombinations, where each slot format combination in the set of slot format combinations includes one or more slot formats based on a higher-layer parameter slotFormats for the slot format combination, and mapping for the slot format combination provided by the higher-layer parameter slotFormats to a corresponding SFI-index field value in DCI format 2_0 provided by a higher-layer parameter slotFormatCombinationId.

for an unpaired spectrum operation, a reference SCS configuration $\mu_{SFI}$ based on a higher-layer parameter subcarrierSpacing. When a supplementary UL carrier is configured for the serving cell, a reference SCS configuration $\mu_{SFI, SUL}$ based on a higher-layer parameter subcarrierSpacing2 for the supplementary UL carrier.

for a paired spectrum operation, a reference SCS configuration $\mu_{SFI, DL}$ for a DL BWP based on the higher-layer parameter subcarrierSpacing and a reference SCS configuration $\mu_{SFI, UL}$ for an UL BWP based on the higher-layer parameter subcarrierSpacing2.

An SFI-index field value in DCI format 2_0 indicates to the UE a slot format for each slot in a number of slots for each DL BWP or each UL BWP starting from a slot in which the UE detects DCI format 2_0. The number of slots is equal to or larger than a PDCCH monitoring periodicity for DCI format 2_0. The SFI-index field includes max $\{\lfloor \log_2(\text{maxSFIindex}+1) \rfloor, 1\}$ bits where maxSFIindex is the maximum of the values provided by the corresponding higher-layer parameter slotFormatCombinationId. A slot format is identified by a corresponding format index as provided in Table 11 to Table 14. In Table 11 to Table 14, 'D' denotes a DL symbol, 'U' denotes a UL symbol, and 'F' denotes a flexible symbol. In Table 11 to Table 14, 'D' denotes a DL symbol, 'U' denotes a UL symbol, and 'F' denotes a flexible symbol.

TABLE 11

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |

TABLE 12

| 15 | F | F | F | F | F | F | U | U | U | U | U | U | U | U |
|---|---|---|---|---|---|---|---|---|---|---|---|---|---|---|
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |

TABLE 13

| 33 | D | D | D | D | D | D | D | D | D | F | F | F | U | U |
|---|---|---|---|---|---|---|---|---|---|---|---|---|---|---|
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | F | F | U | U | U | U | U | U | U |

TABLE 14

| 46 | D | D | D | D | D | F | U | D | D | D | D | D | F | U |
|---|---|---|---|---|---|---|---|---|---|---|---|---|---|---|
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | F | U | U | D | D | F | F | F | U | U |
| 51 | D | F | F | U | U | U | U | D | F | F | U | U | U | U |

TABLE 14-continued

| 52 | D | F | F | F | F | F | U | D | F | F | F | F | F | U |
|----|---|---|---|---|---|---|---|---|---|---|---|---|---|---|
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | | Reserved | | | | | | | |
| 255 | | | | | | UE determines the slot format for the slot based on TDD-UL-DL-ConfigurationCommon, or TDD-UL-DL-ConfigDedicated and, if any, on detected DCI formats | | | | | | | | |

If a PDCCH monitoring periodicity for DCI format 2_0, provided to the UE for the search space set S by a higher-layer parameter monitoringSlotPeriodicityAndOffset, is smaller than the duration of a slot format combination that the UE obtains in a PDCCH monitoring occasion for DCI format 2_0 by a corresponding SFI-index field value, and the UE detects more than one DCI format 2_0 indicating a slot format for a slot, the UE expects each of the more than one DCI format 2_0 to indicate the same (slot) format for the slot.

The UE does not expect to be configured to monitor a PDCCH for DCI format 2_0 on a second serving cell that uses a larger SCS than the serving cell.

For an unpaired spectrum operation of the UE on a serving cell, the UE is provided, by a higher-layer parameter subcarrierSpacing, with a reference SCS configuration $\mu_{SFI}$ for each slot format in a combination of slot formats indicated by an SFI-index field value in DCI format 2_0. The UE expects that for a reference SCS configuration $\mu_{SFI}$ and for an SCS configuration $\mu$ for an active DL BWP or an active UL BWP, $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP in which the first slot starts at the same time as the first slot for the reference SCS configuration $\mu_{SFI}$. Each DL or flexible or UL symbol for the reference SCS configuration $\mu_{SFI}$ corresponds to $2^{(\mu-\mu_{SFI})}$ consecutive DL or flexible or UL symbols for the SCS configuration $\mu$.

For a paired spectrum operation of the UE on a serving cell, the SFI-index field in DCI format 2_0 includes a combination of slot formats for a reference DL BWP and a combination of slot formats for a reference UL BWP of the serving cell. The UE is provided with a reference SCS configuration $\mu_{SFI}$ for each slot format in the combination of slot formats indicated by the value. For the reference SCS configuration $\mu_{SFI}$ and an SCS configuration $\mu$ for the active DL BWP or the active UL BWP, the UE expects that $\mu \geq \mu_{SFI}$ The UE is provided, by a higher-layer parameter subcarrierSpacing, with a reference SCS configuration $\mu_{SFI, DL}$ for the combination of slot formats indicated by the SFI-index field value in DCI format 2_0 for the reference DL BWP of the serving cell. The UE is provided, by a higher-layer parameter subcarrierSpacing2, with a reference SCS configuration $\mu_{SFI, UL}$ for the combination of slot formats indicated by the SFI-index field value in DCI format 2_0 for the reference UL BWP of the serving cell. If $\mu_{SFI, DL} \leq \mu_{SFI, UL}$, for each $2^{(\mu_{SFI, DL}-\mu_{SFI, UL})}+1$ value provided by a value of the higher-layer parameter slotFormats, the value of the higher-layer parameter slotFormats is determined based on a value of the higher-layer parameter slotFormatCombinationId in the higher-layer parameter slotFormatCombination, the value of the higher-layer parameter slotFormatCombinationId is set based on the value of the SFI-index field value in DCI format 2_0 the first $2^{(\mu_{SFI, DL}-\mu_{SFI, UL})}$ values for the combination of slot formats are applicable to the reference DL BWP, and the next value is applicable to the reference UL BWP. If $\mu_{SFI, DL} < \mu_{SFI, UL}$, for each $2^{(\mu_{SFI, DL}-\mu_{SFI, UL})}+1$ value provided by the higher-layer parameter slotFormats, the first value for the combination of slot formats is applicable to the reference DL BWP and the next $2^{(\mu_{SFI, UL}-\mu_{SFI, DL})}$ values are applicable to the reference UL BWP.

For a set of symbols of a slot, the UE does not expect to detect DCI format 2_0 with an SFI-index field value indicating the set of symbols in the slot as UL and to detect DCI format 1_0, DCI format 1_1, or DCI format 0_1 indicating to the UE to receive a PDSCH or a CSI-RS in the set of symbols of the slot.

For a set of symbols of a slot, the UE does not expect to detect DCI format 2_0 with an SFI-index field value indicating the set of symbols in the slot as DL and to detect DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot.

For a set of symbols of a slot that are indicated as DL/UL by the higher-layer parameter TDD-UL-DL-Configuration-Common, or TDDUL-DL-ConfigDedicated, the UE does not expect to detect DCI format 2_0 with an SFI-index field value indicating the set of symbols of the slot as UL/DL, respectively, or as flexible.

For a set of symbols of a slot indicated to the UE by the higher-layer parameter ssb-PositionsInBurst in a higher-layer parameter SystemInformationBlockType1 or Serving-CellConfigCommon for reception of SS/PBCH blocks, the UE does not expect to detect DCI format 2_0 with an SFI-index field value indicating the set of symbols of the slot as UL.

For a set of symbols of a slot indicated to the UE by a higher-layer parameterprach-ConfigurationIndex in a higher-layer parameter RACH-ConfigCommon for PRACH transmissions, the UE does not expect to detect DCI format 2_0 with an SFI-index field value indicating the set of symbols of the slot as DL.

For a set of symbols of a slot indicated to the UE by a higher-layer parameterpdcch-ConfigSIB1 in MIB for a CORESET for a Type0-PDCCH CSS set, the UE does not expect to detect DCI format 2_0 with an SFI-index field value indicating the set of symbols of the slot as UL.

For a set of symbols of a slot indicated to the UE as flexible by the higher-layer parameter TDD-UL-DL-ConfigurationCommon and the higher-layer parameter TDD-UL-DL-ConfigDedicated, or when the higher-layer parameter TDD-UL-DL-ConfigurationCommon and the higher-layer parameter TDD-UL-DL-ConfigDedicated are not provided to the UE, if the UE detects DCI format 2_0 providing a slot format corresponding to a slot format value other than 255, if one or more symbols in the set of symbols are symbols in a CORESET configured for the UE for PDCCH monitoring, the UE receives a PDCCH in the CORESET only if an SFI-index field value in DCI format 2_0 indicates that the one or more symbols are DL symbols.

if the SFI-index field value in DCI format 2_0 indicates the set of symbols of the slot as flexible and the UE detects DCI format 1_0, DCI format 1_1, or DCI format 0_1 indicating to the UE to receive a PDSCH or a CSI-RS in the set of symbols of the slot, the UE receives a PDSCH or a CSI-RS in the set of symbols of the slot.

if the SFI-index field value in DCI format 2_0 indicates the set of symbols of the slot as flexible and the UE detects DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot, the UE transmits the PUSCH, PUCCH, PRACH, or SRS in the set of symbols of the slot.

if the SFI-index field value in DCI format 2_0 indicates the set of symbols of the slot as flexible, and the UE does not detect DCI format 1_0, DCI format 1_1, or DCI format 0_1 indicating to the UE to receive a PDSCH or a CSI-RS, or the UE does not detect DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot, the UE does not transmit or receive a signal in the set of symbols of the slot.

if the UE is configured by the higher layer to receive a PDSCH or a CSI-RS in the set of symbols of the slot, the UE receives the PDSCH or the CSI-RS in the set of symbols of the slot, only if the SFI-index field value in DCI format 2_0 indicates the set of symbols of the slot as DL.

if the UE is configured by the higher layer to transmit a PUCCH, a PUSCH, or a PRACH in the set of symbols of the slot, the UE transmits the PUCCH, or the PUSCH, or the PRACH in the slot only if the SFI-index field value in DCI format 2_0 indicates the set of symbols of the slot as UL.

if the UE is configured by the higher layer to transmit an SRS in the set of symbols of the slot, the UE transmits the SRS only in a subset of symbols from the set of symbols of the slot indicated as UL symbols by the SFI-index field value in DCI format 2_0.

the UE does not expect to detect an SFI-index field value in DCI format 2_0 indicating the set of symbols of the slot as DL and also detect DCI format 0_0, DCI format 0_1, DCI format 1_0, DCI format 1_1, DCI format 2_3, or an RAR UL grant indicating to the UE to transmit an SRS, a PUSCH, a PUCCH, or a PRACH, in one or more symbols from the set of symbols of the slot.

the UE does not expect to detect an SFI-index field value in DCI format 2_0 indicating the set of symbols of the slot as DL or flexible, if the set of symbols of the slot includes symbols corresponding to any repetition of a PUSCH transmission activated by a UL Type 2 grant PDCCH.

the UE does not expect to detect an SFI-index field value in DCI format 2_0 indicating the set of symbols of the slot as UL and also detect DCI format 1_0 or DCI format 1_1 or DCI format 0_1 indicating to the UE to receive a PDSCH or a CSI-RS in one or more symbols from the set of symbols of the slot.

If the UE is configured by the higher layer to receive a CSI-RS or a PDSCH in a set of symbols of a slot and detects DCI format 2_0 indicating a subset of symbols from the set of symbols as UL or flexible or DCI format 0_0, DCI format 0_1, DCI format 1_0, DCI format 1_1, or DCI format 2_3 indicating to the UE to transmit a PUSCH, a PUCCH, an SRS, or a PRACH in at least one symbol in the set of the symbols, the UE cancels the CSI-RS reception or the PDSCH reception in the slot.

If the UE is configured by the higher layer to transmit an SRS, a PUCCH, or a PUSCH, or a PRACH in a set of symbols of a slot and detects DCI format 2_0 with a slot format value indicating a subset of symbols from the set of symbols as DL or flexible, or DCI format 1_0, DCI format 1_1, or DCI format 0_1 indicating to the UE to receive a CSI-RS or a PDSCH in at least one symbol in the set of symbols, then the UE does not expect to cancel the signal transmission in the subset of symbols that occur, relative to a last symbol of a CORESET in which the UE detects DCI format 2_0, DCI format 1_0, DCI format 1_1, or DCI format 0_1, after fewer symbols than a PUSCH preparation time $T_{proc,2}$ for the corresponding PUSCH processing capability.

the UE cancels the PUCCH, or PUSCH, or PRACH transmission in the remaining symbols in the set of symbols and cancels the SRS transmission in the remaining symbols in the set of symbols.

If the UE does not detect DCI format 2_0 indicating the set of symbols of the slot as flexible or UL or DCI format 0_0, DCI format 0_1, DCI format 1_0, DCI format 1_1, or DCI format 2_3 indicating to the UE to transmit an SRS, a PUSCH, a PUCCH, or a PRACH in the set of symbols, the UE assumes that flexible symbols in a CORESET configured for the UE for PDCCH monitoring are DL symbols.

For a set of symbols of a slot that are indicated as flexible by the higher-layer parameters TDD-UL-DL-Configuration-Common and TDD-UL-DLConfigDedicated, or when the higher-layer parameters TDD-UL-DL-ConfigurationCommon, and TDD-UL-DL-ConfigDedicated are not provided to the UE, if the UE does not detect DCI format 2_0 providing a slot format for the slot, the UE receives a PDSCH or a CSI-RS in the set of symbols of the slot, if the UE receives a corresponding indication by DCI format 1_0, DCI format 1_1, or DCI format 0_1.

the UE transmits a PUSCH, a PUCCH, a PRACH, or an SRS in the set of symbols of the slot, if the UE receives a corresponding indication by DCI format 0_0, DCI format 0_1, DCI format 1_0, DCI format 1_1, or DCI format 2_3.

the UE may receive a PDCCH.

if the UE is configured by the higher layer to receive a PDSCH or a CSI-RS in the set of symbols of the slot, the UE does not receive the PDSCH or the CSI-RS in the set of symbols of the slot.

if the UE is configured by the higher layer to transmit an SRS, a PUCCH, a PUSCH, or a PRACH in the set of symbols of the slot, the UE does not transmit the PUCCH, the PUSCH, or the PRACH in the slot and does not transmit the SRS in symbols from the set of symbols in the slot, if any, starting from a symbol that is a number of symbols equal to the PUSCH preparation time N2 for the corresponding PUSCH timing capability after a last symbol of a CORESET where the UE is configured to monitor PDCCH for DCI format 2_0.

The UE does not expect to cancel the transmission of the SRS, or the PUCCH, or the PUSCH, or the PRACH in symbols from the set of symbols in the slot, if any, starting before a symbol that is a number of symbols equal to the PUSCH preparation time $N_2$ for the corresponding PUSCH timing capability after a last symbol of a CORESET where the UE is configured to monitor a PDCCH for DCI format 2_0.

1.6. Dynamic Slot Format Indication Information (e.g., DCI format 2_0)

Basically, a slot format indicates the usage of each symbol in a slot. The slot format indicates each symbol as DL (D), UL (U), or flexible (F). Slot format-related information may be transmitted in one or more of the following signals:

- a static or semi-static slot format indication (SFI) (e.g., TDD-UL-DL-ConfigurationCommon and/or TDD-UL-DL-ConfigDedicated) by higher-layer signaling
- a measurement-related scheduling signal (e.g., a measurement-related signal configured by UE-specific RRC signaling)
- a dynamic SFI (e.g., a signal transmitted in DCI format 2_0)
- a UE-specific data transmission scheduling signal (e.g., UE-specific DCI)

The static or semi-static SFI may be indicated by cell-specific RRC signaling (e.g., TDD-UL-DL-ConfigurationCommon) or UE-specific RRC signaling (e.g., TDD-UL-DL-ConfigDedicated). The measurement-related signal may be indicated by UE-specific RRC signaling, and the corresponding signal may indicate a periodic/semi-persistent CSI-RS, a periodic CSI report, a periodic/semi-persistent SRS, or the like. The UE-specific data transmission-related signal may include UE-specific DCI that triggers a PUCCH along with an A/N for a PDSCH, a PUSCH, or a PDSCH, and DCI that triggers an aperiodic measurement-related signal such as an aperiodic CSI-RS, an aperiodic SRS, or the like.

FIG. 13 is a diagram illustrating exemplary slot formats according to various embodiments of the present disclosure. More specifically, FIG. 13 illustrates an exemplary slot format for each number of switching points according to various embodiments of the present disclosure.

The slot formats include a format for zero, one or two switching points. FIG. C5 illustrates various exemplary slot formats. Specifically, FIG. 13(a) illustrates an exemplary slot format for zero switching point, FIG. 13(b) illustrates an exemplary slot format for one switching point, and FIG. 13(c) illustrates an exemplary slot format for two switching points.

The slot format for zero switching point includes 14 DL symbols, 14 flexible symbols, or 14 UL symbols. The slot format for one switching point is configured to start with zero or more DL symbols and end with zero or more UL symbols, with one or more flexible symbols and DL/UL symbols in between. The slot format for two switching points is configured to include first 7 symbols starting with zero or more DL symbols and ending with one or more UL symbols in a $7^{th}$ symbol, and second 7 symbols starting with one or more DL symbols and ending with zero or more UL symbols. Each of the sets of the first 7 symbols and the second 7 symbols may include zero or more flexible symbols.

Up to 256 such slot formats may be defined, and their configurations are defined in the technical specification TS 38.211 and so on. The UE is configured with a UE-specific SFI table based on the up to 256 slot formats by higher-layer signaling, and receives a specific index value of the UE-specific SFI table in DCI format 2_0 (or a GC-PDCCH).

The UE determines a slot format based on the following prioritization for signals carrying the above-described slot format-related information. More specifically, when the UE receives slot format-related information in a plurality of signals, the UE considers indication information of signals with the following priority only to identify the usage of a symbol indicated as flexible by a high-priority signal.

Slot format information by cell-specific higher-layer signaling (e.g., TDD-UL-DL-ConfigurationCommon)>slot format information by UE-specific higher-layer signaling (e.g., TDD-UL-DL-ConfigDedicated)>slot format information by a GC-PDCCH (e.g., DCI format 2_0)>UE-specific data transmission scheduling information>measurement-related scheduling information Therefore, when a specific symbol in a slot is indicated to the UE as DL/UL by cell-specific RRC signaling or UE-specific RRC signaling, the UE does not expect DCI format 2_0 (or a group-specific PDCCH including DCI format 2_0) to indicate the specific symbol as UL/DL or flexible. When a specific symbol in a slot is indicated as flexible by DCI format 2_0 (or a group-specific PDCCH including DCI format 2_0), the UE transmits and receives a related signal in the specific symbol only when separately receiving scheduling information (e.g., UE-specific scheduling DCI). When the UE does not receive the scheduling information separately, the UE does not transmit/receive a signal in the specific symbol.

1.7. DL Preemption-Related Information (e.g., DCI format 2_1)

The wireless communication system to which various embodiments of the present disclosure are applied supports eMBB transmission with a relatively large traffic size and URLLC transmission with a relatively small traffic size.

FIG. 14 is a diagram illustrating exemplary resource sharing between an eMBB transmission and a URLLC transmission according to various embodiments of the present disclosure.

When an eMBB transmission and a URLLC transmission have the same transmission duration, the eMBB transmission and the URLLC transmission may share non-overlapped time/frequency resources based on scheduling, as illustrated in FIG. 14(a). Alternatively, in DL transmission, a URLLC transmission may occur in resources for an on-going eMBB transmission, to satisfy different latency and/or reliability requirements for the eMBB transmission and the URLLC transmission.

For this purpose, DCI format 2_1 delivers information about resources (partially) overlapped with scheduled resources for a DL eMBB transmission to the UE (for a URLLC transmission). The UE assumes that there is no signal transmission in an RB and a symbol indicated by DCI format 2_1. The UE may exclude indicated coded bits from a soft buffer and (re)decode a PDSCH, referring to a DL preemption indication.

Figure 15:
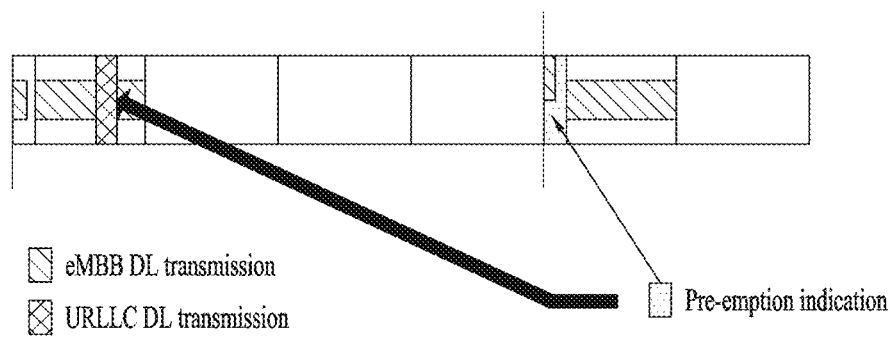
FIG. 15 is a diagram illustrating an exemplary DL preemption indication according to various embodiments of the present disclosure.

FIG. 15 is a diagram illustrating an exemplary DL preemption indication according to various embodiments of the present disclosure. More specifically, FIG. 15 is a diagram illustrating a configuration of indicating URLLC transmission resources overlapped with preconfigured DL eMBB resources by a DL preemption indication according to various embodiments of the present disclosure.

Figure 16:
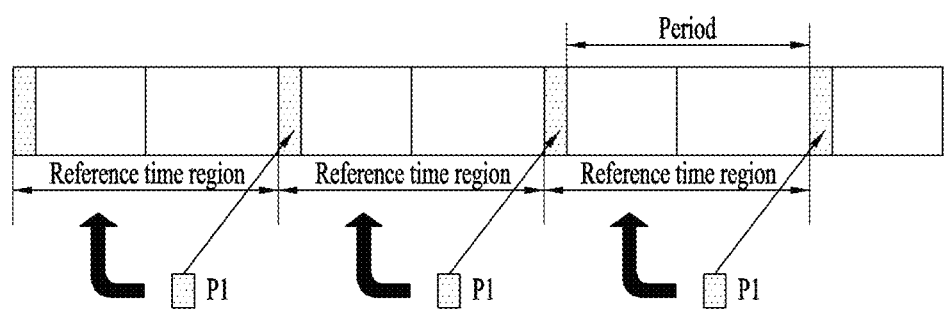
FIG. 16 is a diagram illustrating an exemplary preemption operation according to various embodiments of the present disclosure.

FIG. 16 is a diagram illustrating an exemplary preemption operation according to various embodiments of the present disclosure. More specifically, FIG. 16 illustrates an exemplary operation of preempting some resources by a PI in DCI format 2_1 according to various embodiments of the present disclosure.

The BS transmits a DL preemption indication in DCI format 2_1 to UE(s). DCI format 2_1 indicates preempted resources in a reference time/frequency resource area. The monitoring periodicity of DCI format 2_1 including a preemption indication (PI) may be equal to the periodicity of the reference time area. The reference frequency area may be identical to an active DL BWP.

Figure 17:
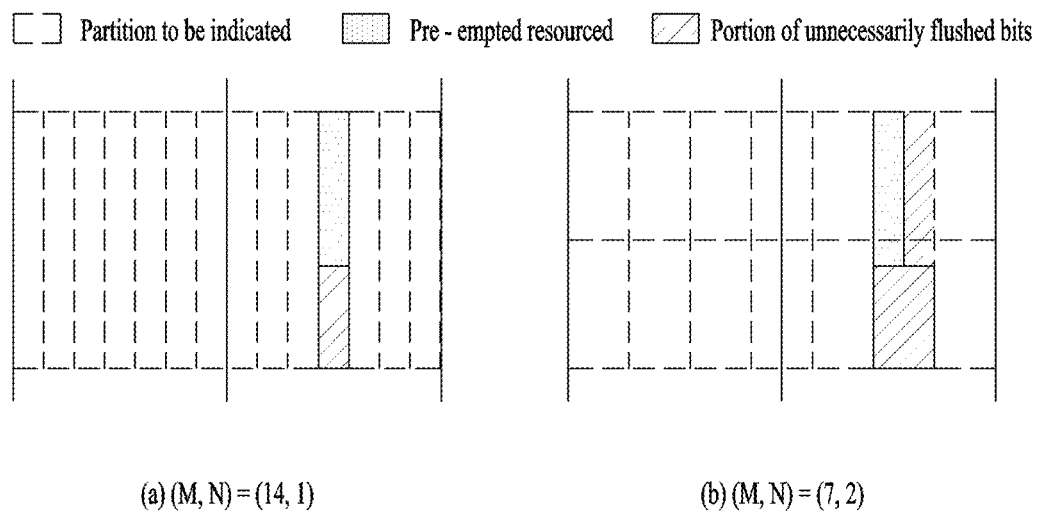
FIG. 17 is a diagram illustrating an exemplary method of representing preemption indication information in a bitmap according to various embodiments of the present disclosure.

FIG. 17 is a diagram illustrating an exemplary method of representing preemption indication information as a bitmap according to various embodiments of the present disclosure.

The time/frequency granularity of the preemption indication information is determined by timeFrequencySet in higher-layer signaling DownlinkPreemption.

When the value of timeFrequencySet is 0 (Set0), DL resources for preemption indication are divided into 14 time-domain parts or groups (e.g., each group includes consecutive symbols), and each bit indicates the presence or absence of a transmission to the UE in a corresponding time-domain part or group (e.g., when the value of a bit is 1, this indicates the presence of a signal transmission for the UE, and when the value of a bit is 0, this indicates the absence of a signal transmission for the UE, as illustrated in FIG. 17(a)).

When the value of timeFrequencySet is 1 (Set1), DL resources for preemption indication are divided into 7 time-domain parts or pairs (e.g., each group includes consecutive symbols). The first bit of each pair indicates the presence or absence of a signal transmission to the UE in some frequency-domain part of a corresponding time-domain part or pair, and the second bit of the pair indicates the presence or absence of a signal transmission to the UE in the remaining frequency-domain parts of the corresponding time-domain part or pair (e.g., when the value of a bit is 1, this indicates the presence of a signal transmission in a corresponding time/frequency area for the UE, and when the value of a bit is 0, this indicates the absence of a signal transmission in the time/frequency area for the UE, as illustrated FIG. 17(b)).

1.8. Multiplexing of Short PUCCH and Long PUCCH

Figure 18:
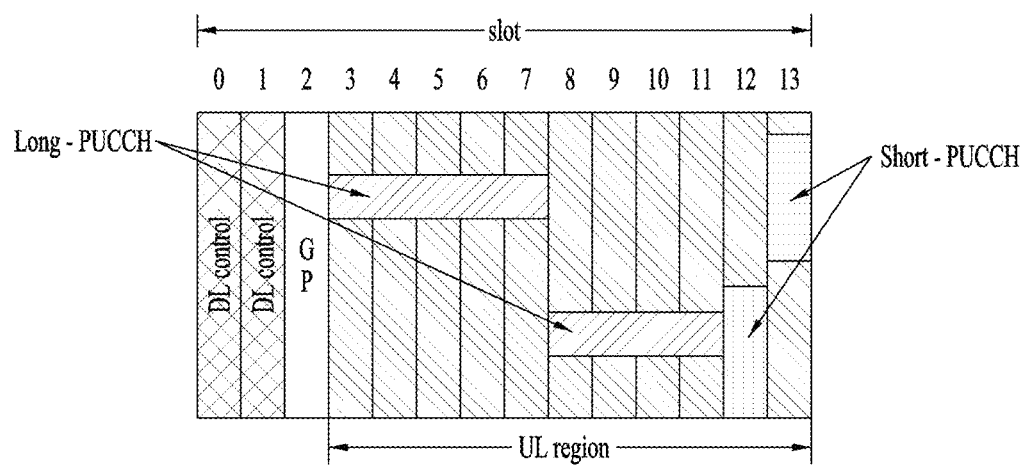
FIG. 18 is a diagram illustrating exemplary multiplexing between short and long PUCCHs and a UL signal according to various embodiments of the present disclosure.

FIG. 18 illustrates exemplary multiplexing between a UL signal and short and long PUCCHs according to various embodiments of the present disclosure.

A PUCCH (e.g., PUCCH format 0/2) and a PUSCH may be multiplexed in TDM or FDM. A short PUCCH and a long PUCCH from different UEs may be multiplexed in TDM or FDM. Short PUCCHs from a single UE may be multiplexed in TDM within one slot. A short PUCCH and a long PUCCH from a single UE may be multiplexed in TDM or FDM within one slot.

2. Unlicensed Band/Shared Spectrum System

FIG. 19 is a diagram illustrating an exemplary wireless communication system supporting an unlicensed band to which various embodiments of the present disclosure are applicable.

In the following description, a cell operating in a licensed band (L-band) is defined as an L-cell, and a carrier of the L-cell is defined as a (DL/UL) LCC. Further, a cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is generically referred to as a cell.

When a UE and a BS transmit and receive signals to and from each other in a carrier-aggregated LCC and UCC, the LCC may be configured as a primary CC (PCC), and the UCC may be configured as a secondary CC (SCC), as illustrated in FIG. 19(a).

As illustrated in FIG. 19(b), the UE and the BS may transmit and receive signals to and from each other in one UCC or a plurality of carrier-aggregated LCCs and UCCs. That is, the UE and the BS may transmit and receive signals only in UCC(s) without an LCC. (Unless otherwise mentioned) a signal transmission and reception operation in an unlicensed band as described in various embodiments of the present disclosure may be performed based on all of the above-described deployment scenarios.

2.1. Radio Frame Structure for Unlicensed Band

For an operation in an unlicensed band, frame structure type 3 of LTE (see FIG. 3) or an NR frame structure (see FIG. 7) may be used. The configuration of OFDM symbols occupied by a UL/DL signal transmission in a frame structure for the unlicensed band may be configured by the BS. Herein, the term OFDM symbol may be replaced with SC-FDM(A) symbol.

For a DL signal transmission in the unlicensed band, the BS may indicate the configuration of OFDM symbols used in subframe #n to the UE by signaling. In the following description, the term subframe may be replaced with slot or time unit (TU).

Specifically, in the wireless communication system supporting the unlicensed band, the UE may assume (or identify) the configuration of OFDM symbols occupied in subframe #n by a specific field (e.g., a Subframe configuration for LAA field or the like) in DCI received in subframe #n−1 or subframe #n from the BS.

Table 15 illustrates an exemplary method of representing the configuration of occupied OFDM symbols for transmission of a DL physical channel and/or physical signal in a current subframe and/or next subframe by the Subframe configuration for LAA field in the wireless communication system.

TABLE 15

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For a UL signal transmission in the unlicensed band, the BS may transmit information about a UL transmission duration to the UE by signaling.

Specifically, in an LTE system supporting an unlicensed band, the UE may acquire 'UL duration' and 'UL offset' information for subframe #n by a 'UL duration and offset' field in detected DCI.

Table 16 illustrates an exemplary method of representing a UL offset and UL duration configuration by the UL duration and offset field in the wireless communication system.

TABLE 16

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) UL offset 1 and UL duration d for subframe #n, the UE does not need to receive a DL physical channel and/or physical signal in subframe #n+1+i (i=0, 1, . . . , d−1).

2.2 Overview of Channel Access Procedures (CAPs)

Unless otherwise noted, the definitions below are applicable for the following terminologies used in the present disclosure.

A channel refers to a carrier or a part of a carrier composed of a contiguous set of RBs in which a CAP is performed in a shared spectrum.

A channel access procedure (CAP) may be a procedure based on sensing that evaluates the availability of a channel for performing transmissions. A basic unit for sensing is a sensing slot with a duration of $T_{sl}$=9 us. The sensing slot duration may be considered to be idle if an eNB/gNB or a UE senses the channel during the sensing slot duration, and determines that the detected power for at least 4 us within the sensing slot duration is less than an energy detection threshold $X_{Thresh}$. Otherwise, the sensing slot duration $T_{sl}$ may be considered to be busy.

Channel occupancy refers to transmission(s) on channel(s) by eNB/gNB/UE(s) after performing a corresponding CAP in this subclause.

A channel occupancy time (COT) refers to the total time for which eNB/gNB/UE(s) and any eNB/gNB/UE(s) sharing the channel occupancy perform transmission(s) on a channel after an eNB/gNB/UE performs the corresponding CAPs described in this subclause. For determining a COT, if a transmission gap is less than or equal to 25 us, the gap duration may be counted in the COT. The COT may be shared for transmission between an eNB/gNB and corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB may transmit transmission(s) after a gap within a DL transmission burst without sensing the corresponding channel(s) for availability.

A UL transmission burst is defined as a set of transmissions from a UE without any gap greater than 16 us. Transmissions from a UE separated by a gap of more than 16 us are considered as separate UL transmission bursts. A UE may transmit transmission(s) after a gap within a UL transmission burst without sensing the corresponding channel(s) for availability.

A discovery burst refers to a DL transmission burst including a set of signal(s) and/or channel(s) confined within a window and associated with a duty cycle. The discovery burst may be any of the following:

Transmission(s) initiated by an eNB that includes a primary synchronization signal (PSS), secondary synchronization signal (SSS) and cell-specific reference signal(s)(CRS) and may include non-zero power CSI-RS.

Transmission(s) initiated by a gNB that includes at least an SS/PBCH block and may also include a CORE-SET for a PDCCH scheduling a PDSCH with SIB1, and a PDSCH carrying SIB1 and/or non-zero power CS-RS. The SS/PBCH block may include a PSS, a SSS, and a PBCH with an associated demodulation reference signal (DM-RS).

2.3. Downlink Channel Access Procedures (DL CAPs)

For a DL signal transmission in an unlicensed band, the BS may perform a DL CAP for the unlicensed band as follows. On the assumption that a PCell being a licensed band and one or more SCells being an unlicensed band are basically configured for the BS, the following description is given of DL CAPs to which various embodiments of the present disclosure are applicable, in which an unlicensed band is referred to as a licensed assisted access (LAA) SCell. However, the DL CAPs may also be applied in the same manner, when only an unlicensed band is configured for the BS.

2.3.1. Type 1 DL Channel Access Procedures

This subclause describes CAPs to be performed by a BS for which a time duration spanned by sensing slots that are sensed to be idle before DL transmission(s) is random. This subclause is applicable to the following transmissions:

Transmission(s) initiated by a BS including a PDSCH/PDCCH/EPDCCH, or

Transmission(s) initiated by a BS including a unicast PDSCH with user plane data, or a unicast PDSCH with user plane data and a unicast PDCCH scheduling user plane data, or Transmission(s) initiated by a BS with only a discovery burst or with a discovery burst multiplexed with non-unicast information, where the duration of the transmission(s) is larger than 1 ms or the transmission causes the discovery burst duty cycle to exceed 1/20.

The BS may perform a transmission after sensing the channel to be idle during the sensing slot durations of a defer duration $T_d$ and after a counter N is zero in step 4 described below. The counter N is adjusted by sensing the channel for an additional sensing slot duration according to the following procedure:

1) set N=$N_{init}$ where $N_{init}$ is a random number uniformly distributed between 0 and $CW_p$, and go to step 4;

2) if N>0 and the BS chooses to decrement the counter, set N=N-1;
3) sense the channel for an additional sensing slot duration, and if the additional sensing slot duration is idle, go to step 4; else, go to step 5;
4) if N=0, stop; else, go to step 2;
5) sense the channel until either a busy sensing slot is detected within an additional defer duration $T_d$ or all the sensing slots of the additional defer duration $T_d$ are detected to be idle; and
6) if the channel is sensed to be idle during all the sensing slot durations of the additional defer duration $T_d$, go to step 4; else, go to step 5.

Figure 20:
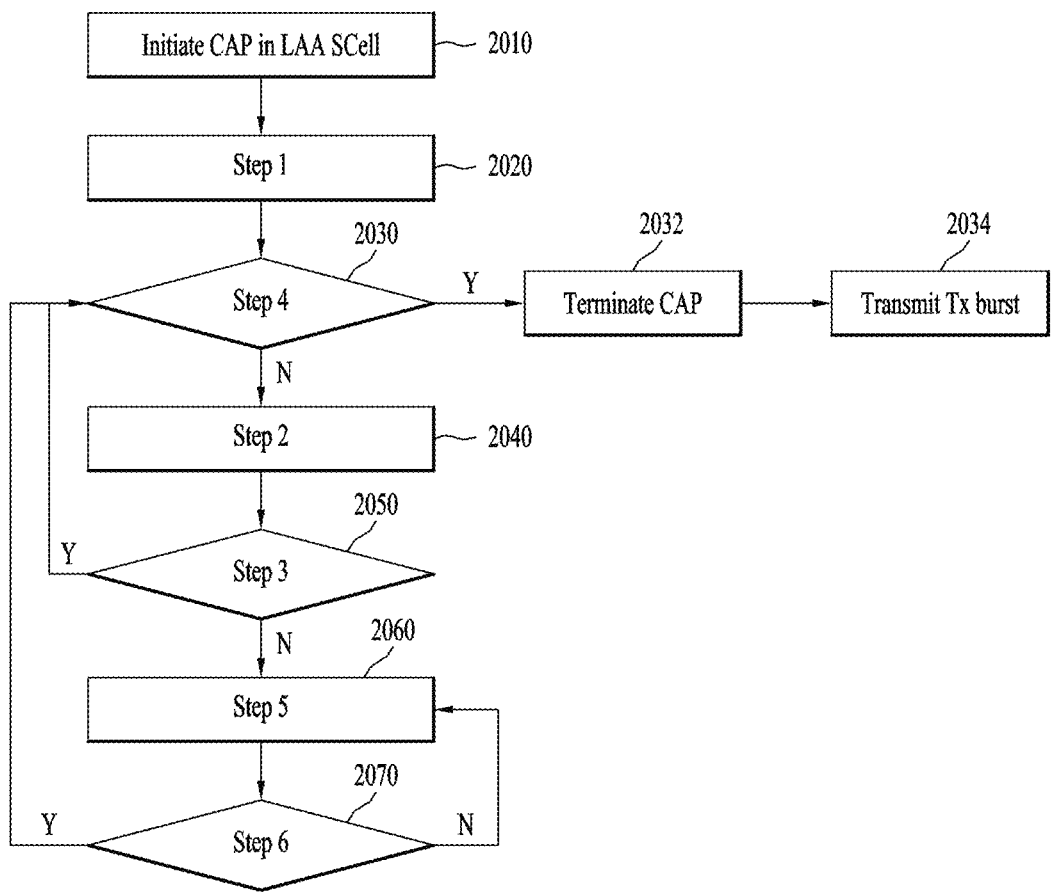
FIG. 20 is a flowchart illustrating a DL channel access procedure (CAP) for transmission in an unlicensed band, to which various embodiments of the present disclosure are applicable.

FIG. 20 is a flowchart illustrating a DL CAP for transmission in an unlicensed band, to which various embodiments of the present disclosure are applicable.

The afore-described Type 1 DL CAP may be summarized as follows.

For a DL transmission, a transmission node (e.g., a BS) may initiate a CAP (2010).

The BS may randomly select a backoff counter N within a contention window (CW) according to step 1. N is set to an initial value $N_{init}$ (2020). $N_{init}$ is a random value selected between 0 and $CW_p$.

Subsequently, when the backoff counter value N is 0 according to step 4 (2030; Y), the BS terminates the CAP (2032). The BS may then perform a Tx burst transmission (2034). On the contrary, when the backoff counter value N is not 0 (2030; N), the BS decrements the backoff counter value by 1 according to step 2 (2040).

Subsequently, the BS checks whether the channel is idle (2050). If the channel is idle (2050; Y), the BS determines whether the backoff counter value is 0 (2030).

On the contrary, when the channel is not idle, that is, the channel is busy in operation 2050 (2050; N), the BS determines whether the channel is idle during a longer defer duration $T_d$ (25 usec or longer) than a sensing slot duration (e.g., 9 usec) (2060). If the channel is idle during the defer duration (2070; Y), the BS may resume the CAP.

For example, when the backoff counter value $N_{init}$ is 10 and the channel is determined to be idle after the backoff counter value is decremented to 5, the BS senses the channel during the defer duration and determines whether the channel is idle. If the channel is idle during the defer duration, the BS may resume the CAP from the backoff counter value 5 (or from the backoff counter value 4 obtained by decrementing the backoff counter value 5 by 1), instead of setting the backoff counter value $N_{init}$.

On the other hand, when the channel is busy during the defer duration (2070; N), the BS determines again whether the channel is idle during a new defer duration by performing step 2060 again.

If the BS has not performed a transmission after step 4 in the above procedure, the BS may perform a transmission on the channel, if the following condition is satisfied:
if the BS is ready to transmit and the channel is sensed to be idle at least in a sensing slot duration $T_{sl}$, and if the channel has been sensed to be idle during all the sensing slot durations of a defer duration $T_d$ immediately before this transmission.

On the contrary, if the channel has not been sensed to be idle in the sensing slot duration $T_{sl}$ when the BS first senses the channel after it is ready to transmit or if the channel has not been sensed to be idle during any of the sensing slot durations of the defer duration $T_d$ immediately before this intended transmission, the BS proceeds to step 1 after sensing the channel to be idle during the sensing slot durations of the defer duration $T_{sl}$.

The defer duration $T_d$ includes a duration $T_f(=16$ us) immediately followed by $m_p$ consecutive sensing slot durations. Each sensing slot duration $T_{sl}$ is 9 us and the duration $T_f$ includes an idle sensing slot duration $T_{sl}$ at the start of the duration $T_f$.

$CW_{min,p} \leq CW_p \leq CW_{max,p}$ is the contention window. $CW_p$ adjustment is described in subclause 2.2.3.

$CW_{min,p}$ and $CW_{max,p}$ are chosen before step 1 of the above procedure.

$m_p$, $CW_{min,p}$ and $CW_{max,p}$ are determined based on a channel access priority class associated with the BS transmission (refer to Table 17).

$X_{Thresh}$ is adjusted according to subclause 2.3.4. as described later.

TABLE 17

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If N>0 in the above procedure, when the BS transmits discovery burst(s), the BS does not decrement the counter N during the sensing slot duration(s) overlapping with the discovery burst(s).

The BS may use any channel access priority class for performing the above procedures to perform transmission(s) including discovery burst(s) satisfying the conditions described in this subclause.

The BS should use a channel access priority class applicable to unicast user plane data multiplexed in a PDSCH for performing the above procedures to perform transmission(s) including a unicast PDSCH with user plane data.

For p=3 and p=4 in Table 13, if the absence of any other technology sharing the channel may be guaranteed on a long term basis (e.g. by level of regulation), $T_{mcot,p}$ is set to 10 ms. Otherwise, $T_{mcot,p}$ is set to 8 ms.

2.3.2. Type 2 DL Channel Access Procedures

This subclause describes CAPs to be performed by the BS, for which a time duration spanned by sensing slots that are sensed to be idle before DL transmission(s) is deterministic.

Type 2A DL CAPs may be applied to the following transmission(s) performed by the BS.
Transmission(s) initiated by a BS, including a discovery burst and not including a PDSCH, or
transmission(s) initiated by a BS, with only a discovery burst or with a discovery burst multiplexed with non-unicast information. Herein, the transmission duration is at most 1 ms, or the transmission causes the discovery burst duty cycle to exceed 1/20. Alternatively,
transmission(s) of a BS, following transmission(s) of a UE after a gap of 25 us in a shared channel occupancy.
Type 2B or Type 2C DL CAPs are applicable to transmission(s) performed by a BS, following transmission(s) of a UE after a gap of 16 us or up to 16 us, respectively, in a shared channel occupancy.

2.3.2.1. Type 2A DL Channel Access Procedure

The BS may perform a DL transmission immediately after sensing the channel to be idle for at least a sensing duration $T_{short\_dl}=25$ us. $T_{short\_dl}$ include a duration $T_f(=16$ us) following one sensing slot duration. $T_f$ includes a sensing slot at the start of $T_f$. If both sensing slots of $T_{short\_dl}$ are sensed to be idle, the channel is considered to be idle for $T_{short\_dl}$.

2.3.2.2. Type 2B DL Channel Access Procedure

The BS may perform a DL transmission immediately after sensing the channel to be idle for a duration of $T_f=16$ us. $T_f$ includes a sensing slot that occurs within the last 9 us of $T_f$. The channel is considered to be idle within the duration $T_f$, if the channel is sensed to be idle for a total of 5 us at least with at least of 4 us sensing occurring in the sensing slot, the channel is considered to be idle for $T_f$.

2.3.2.3. Type 2C DL Channel Access Procedure

When the BS follows the procedure in this subclause, for a DL transmission, the BS does not sense the channel before the DL transmission. The duration of the corresponding DL transmission is at most 584 us.

2.3.3. Contention Window Adjustment Procedures

If the BS performs a transmission including a PDSCH that is associated with a channel access priority class p on a channel, the BS maintains a contention window value $CW_p$ and adjusts the contention widow value $CW_p$ before step 1 of the procedure described in subclause 2.3.1. for the transmission.

2.3.3.1. Contention Window Adjustment Procedures for Transmissions by eNB

If an eNB performs a transmission including a PDSCH that is associated with a channel access priority class p on a channel, the eNB maintains a contention window value $CW_p$ and adjusts $CW_p$ before step 1 of the procedure described in subclause 2.3.1. (i.e., before a CAP is performed) for the transmission using the following steps.

1> For every priority class $p \in \{1, 2, 3, 4\}$, set $CW_p=CW_{min,p}$.

2> If at least Z=80% of HARQ-ACK values corresponding to PDSCH transmission(s) in a reference subframe k are determined as NACK, increase $CW_p$ for every priority class $p \in \{1, 2, 3, 4\}$ to the next higher allowed value and remain in step 2; otherwise, go to step 1.

In other words, if the probability of HARQ-ACK values corresponding to PDSCH transmission(s) in reference subframe k being determined as NACK is at least 80%, the eNB increases a CW value set for each priority class to the next higher allowed value. Alternatively, the eNB maintains the CW value set for each priority class to be an initial value.

Reference subframe k is the starting subframe of the most recent transmission on the channel made by the eNB, for which at least some HARQ-ACK feedback is expected to be available.

The eNB adjusts the value $CW_p$ of for every priority class $p \in \{1, 2, 3, 4\}$ based on a given reference subframe k only once.

The probability Z of HARQ-ACK values corresponding to PDSCH transmission(s) in reference subframe k being determined as NACK may be determined in consideration of the following.

If the eNB transmission(s) for which HARQ-ACK feedback is available starts in the second slot of the subframe k, HARQ-ACK values corresponding to PDSCH transmission(s) in subframe k+1 are also used in addition to the HARQ-ACK values corresponding to PDSCH transmission(s) in the subframe k.

If the HARQ-ACK values correspond to PDSCH transmission(s) on an LAA SCell that are assigned by an (E)PDCCH transmitted on the same LAA SCell,
  if no HARQ-ACK feedback is detected for a PDSCH transmission by the eNB or if the eNB detects 'DTX', 'NACK/DTX' or 'any' state, it is counted as NACK.

If the HARQ-ACK values correspond to PDSCH transmission(s) on another LAA SCell that are assigned by an (E)PDCCH transmitted on an LAA SCell,
  if the HARQ-ACK feedback for a PDSCH transmission is detected by the eNB, 'NACK/DTX' or 'any' state is counted as NACK, and 'DTX' state is ignored.

If no HARQ-ACK feedback is detected for a PDSCH transmission by the eNB,
  if PUCCH format 1 with channel selection is expected to be used by the eNB, 'NACK/DTX' state corresponding to 'no transmission' is counted as NACK, and 'DTX' state corresponding to 'no transmission' is ignored.
  Otherwise, the HARQ-ACK for the PDSCH transmission is ignored.

If a PDSCH transmission has two codewords, the HARQ-ACK value of each codeword is considered separately. A bundled HARQ-ACK across M subframes is considered as M HARQ-ACK responses.

If the eNB performs a transmission including a PDCCH/EPDCCH with DCI format 0A/0B/4A/4B and not including a PDSCH associated with a channel access priority class p on a channel starting from time to, the eNB maintains the contention window value $CW_p$ and adjusts $CW_p$ before step 1 of the procedure described in subclause 2.3.1. for the transmission using the following steps.

1> For every priority class $p \in \{1, 2, 3, 4\}$, set $CW_p=CW_{min,p}$.

2> If less than 10% of UL transport blocks scheduled by the eNB using the Type 2 CAP (described in subclause 2.3.1.2) in the time duration between $t_0$ and $t_0+T_{CO}$ have been received successfully, increase $CW_p$ for every priority class $p \in \{1, 2, 3, 4\}$ to the next higher allowed value and remain in step 2; otherwise, go to step 1.

$T_{CO}$ is computed as described in subclause 2.3.1. which will be described below.

If $CW_p=CW_{max,p}$ is used K times consecutively to generate $N_{init}$, only $CW_p$ for a priority class p for $CW_p=CW_{max,p}$ used K times consecutively is reset to $CW_{min,p}$. K is selected from a set of values $\{1, 2, \ldots, 8\}$ for every priority class $p \in \{1, 2, 3, 4\}$ by the eNB.

2.3.3.2. Contention Window Adjustment Procedures for DL Transmissions by gNB If a gNB performs a transmission including a PDSCH that is associated with a channel access priority class p on a channel, the gNB maintains a contention window value $CW_p$ and adjusts $CW_p$ before step 1 of the procedure described in subclause 2.3.1. (i.e., before a CAP is performed) for the transmission using the following steps.

1> For every priority class $p \in \{1, 2, 3, 4\}$, set $CW_p=CW_{min,p}$.

2> If HARQ-ACK feedback is available after the last update of $CW_p$, go to step 3. Otherwise, if the gNB transmission after the procedure described in subclause 2.3.1 does not include a retransmission or is performed within a duration $T_w$ from the end of a reference duration corresponding to the earliest DL transmission burst after the last update of $CW_p$ transmitted after the procedure described in subclause 2.3.1, go to step 5; otherwise go to step 4.

3> The HARQ-ACK feedback(s) corresponding to PDSCH(s) in the reference duration for the latest DL transmission burst for which HARQ-ACK feedback is available is used as follows.
    a. If at least one HARQ-ACK feedback is 'ACK' for PDSCH(s) with TB-based transmissions or at least 10% of HARQ-ACK feedbacks is 'ACK' for PDSCH(s) with CBG-based transmissions, go to step 1; otherwise go to step 4.
4> Increase $CW_p$ for every priority class $p \in \{1, 2, 3, 4\}$ to the next higher allowed value.
5> For every priority class $p \in \{1, 2, 3, 4\}$, maintain $CW_p$ as it is; go to step 2.

The reference duration and the duration Tw in the above procedure are defined as follows.

The reference duration corresponding to a channel occupancy initiated by the gNB, including transmission of PDSCH(s) is defined in this subclause as a duration starting from the beginning of the channel occupancy until the end of the first slot in which at least one unicast PDSCH is transmitted over all the resources allocated for the PDSCH, or until the end of the first transmission burst by the gNB that contains unicast PDSCH(s) transmitted over all the resources allocated for the PDSCH, whichever occurs earlier. If the channel occupancy includes a unicast PDSCH, but it does not include any unicast PDSCH transmitted over all the resources allocated for that PDSCH, then, the duration of the first transmission burst from the gNB within the channel occupancy that contains unicast PDSCH(s) is the reference duration for CWS adjustment.

$T_w = \max(T_A, T_B + 1 \text{ ms})$ where $T_B$ is the duration of the transmission burst from the start of the reference duration in ms, If the absence of any other technology sharing the channel may not be guaranteed on a long-term basis, $T_A = 5$ ms, and otherwise, $T_A = 10$ ms.

If the gNB performs a transmission using the Type 1 CAP associated with a channel access priority class p on a channel and the transmission is not associated with an explicit HARQ-ACK feedback by the corresponding UE(s), the gNB adjusts $CW_p$ before step 1 in the procedure described in subclause 2.3.1., using the latest $CW_p$ used for any DL transmission on the channel using the Type 1 CAP associated with the channel access priority class p. If the corresponding channel access priority class p has not been used for any DL transmission on the channel, $CW_p = CW_{min,p}$ is used.

2.3.3.3. Common Procedures for CWS Adjustments for DL Transmissions

The following applies to the procedures described in subclauses 2.3.3.1. and 2.3.3.2.

If $CW_p = CW_{max,p}$, the next higher allowed value for adjusting $CW_p$ is $CW_{max,p}$.

If $CW_p = CW_{max,p}$ is consecutively used K times for generation of $N_{init}$, $CW_p$ is reset to $CW_{min}$ only for that priority class p for which $CW_p = CW_{max,p}$ is consecutively used K times for generation of $N_{init}$. K is selected by the eNB/gNB from the set of values $\{1, 2, \ldots, 8\}$ for each priority class $p \in \{1, 2, 3, 4\}$.

2.3.4. Energy Detection Threshold Adaptation Procedure

An eNB/gNB accessing a channel on which transmission(s) are performed sets an energy detection threshold $X_{Thresh}$ to be less than or equal to a maximum energy detection threshold $X_{Thresh\_max}$.

The maximum energy detection threshold $X_{Thresh\_max}$ is determined as follows.

If the absence of any other technology sharing the channel may be guaranteed on a long-term basis (e.g. by level of regulation) then:

$$X_{Thresh\_max} = \min\left\{ \begin{array}{l} T_{max} + 10 \text{ dB}, \\ X_r \end{array} \right\}$$

$X_r$ is a maximum energy detection threshold in dBm defined by regulatory requirements, when such requirements are defined, and otherwise $X_r = T_{max} + 10$ dB. Otherwise, $$X_{Thresh\_max} = \max\left\{ \begin{array}{l} -72 + 10 \cdot \log 10 (BW\text{MHz}/20 \text{ MHz}) \text{ dBm}, \\ \min\left\{ \begin{array}{l} T_{max}, \\ T_{max} - T_A + (P_H + 10 \cdot \log 10 (BW\text{MHz}/20 \text{ MHz}) - P_{TX}) \end{array} \right\} \end{array} \right\}$$

where each parameter is defined as follows:
$T_A = 10$ dB for transmission(s) including PDSCH;
$T_A = 5$ dB for transmissions including discovery burst(s) as described in subclause 4.1.2;
$P_H = 23$ dBm dBm;
$P_{TX}$ is the set maximum eNB/gNB output power in dBm for the channel;
    eNB/gNB uses the set maximum transmission power over a single channel irrespective of whether single channel or multi-channel transmission is employed
$T_{max}(\text{dBm}) = 10 \cdot \log 10 (3.16228 \cdot 10^{-8} \text{ (mW/MHz)} \cdot BW\text{MMHz (MHz)})$;
BWMHz is the single channel bandwidth in MHz.

2.3.5. Channel Access Procedure for Transmission(s) on Multiple Channels

An eNB/gNB may access multiple channels on which transmission(s) are performed, according to one of the Type A or Type B procedures described below.

2.3.5.1. Type A Multi-Channel Access Procedure

An eNB/gNB performs channel access on each channel $c_i \in C$ according to the procedure described in this subclause. Herein, C is a set of channels on which the eNB/gNB intends to transmit, and $i = 0, 1, \ldots q-1$ where q is the number of channels on which the eNB/gNB intends to transmit.

The counter N described in subclause 2.3.1. (i.e., the counter N considered in a CAP) is determined for each channel $c_i$ and is denoted as $N_{c_i}$. $N_{c_i}$ is maintained according to subclause 2.3.5.1.1. or 2.3.5.1.2.

2.3.5.1.1. Type A1 Multi-Channel Access Procedure

The counter N as described in subclause 2.3.1. (i.e., the counter N considered in a CAP) is independently determined for each channel $c_i$ and is denoted as $N_{c_i}$.

In the case where the eNB/gNB ceases a transmission on any one channel $c_i \in C$, if the absence of any other technology sharing the channel may not be guaranteed on a long term basis (e.g. by level of regulation), for each channel $c_i$ ($c_i$ is different from $c_j$, $c_i \neq c_j$), the eNB/gNB may resume decrementing $N_{c_i}$ when idle sensing slots are detected either after waiting for a duration of $4 \cdot T_{sl}$ or after reinitializing $N_{c_i}$.

2.3.5.1.2. Type A2 Multi-Channel Access Procedure

For each channel $c_i \in C$, the counter N is determined as described in subclause 2.3.1. and denoted as $N_{c_j}$, where $c_j$ is a channel that has the largest $CW_p$ value. For each channel $c_i$, $N_{c_i} = N_{c_j}$.

When the eNB/gNB ceases a transmission on any one channel for which $N_{c_j}$ is determined, the eNB/gNB reinitializes $N_{c_j}$ for all channels.

2.3.5.2. Type B Multi-Channel Access Procedure

A channel $c_j \in C$ may be selected by the eNB/gNB as follows.

The eNB/gNB selects $c_j$ by uniformly randomly choosing $c_j$ from C before each transmission on multiple channels $c_i \in C$, or the eNB/gNB selects $c_j$ no more frequently than once every 1 second.

Herein, C is a set of channels on which the eNB/gNB intends to transmit, and i=0, 1, . . . q−1 where q is the number of channels on which the eNB/gNB intends to transmit.

To transmit on a channel $c_j$, the eNB/gNB performs channel access on the channel $c_j$ according to the procedure described in subclause 2.2.1. with the modifications described in subclause 2.3.5.2.1. or 2.3.5.2.2.

To transmit on a channel $c_i \neq c_j$ among channels $c_i \in C$, for each channel $c_i$, the eNB/gNB senses the channel $c_i$ for at least a sensing interval $T_{mc}$=25 us immediately before the transmission on the channel $c_j$. The eNB/gNB may perform a transmission on the channel $c_i$ immediately after sensing the channel $c_i$ to be idle for at least a sensing duration $T_{mc}$. The channel $c_i$ may be considered to be idle for $T_{mc}$ if the channel is sensed to be idle during all the time durations in which such idle sensing is performed on the channel $c_j$ in the given duration $T_{mc}$.

The eNB/gNB does not perform a transmission on a channel $c_i \neq c_j$ (where $c_j \in C$), for a period exceeding $T_{mcot,p}$ as given in Table 12, where the value of $T_{mcot,p}$ is determined using the channel access parameters used for the channel $c_j$.

For the procedure in this subclause, the channel frequencies of the set C of channels selected by the gNB is a subset of one of predefined sets of channel frequencies.

2.3.5.2.1. Type B1 Multi-Channel Access Procedure

A single $CW_p$ value is maintained for a set of channels C.

For determining $CW_p$ for channel access on a channel $c_j$, step 2 of the procedure described in subclause 2.3.3. is modified as follows.

If at least Z=80% of HARQ-ACK values corresponding to PDSCH transmission(s) in reference subframe k of all channels $c_i \in C$ are determined as NACK, increase $CW_p$ for each priority class $p \in \{1, 2, 3, 4\}$ to the next higher allowed value; otherwise, go to step 1.

For determining $CW_p$ for a set of channels C, any PDSCH that fully or partially overlaps with any channel $c_i \in C$ may be used in the procedure described in subclause 2.3.3.2.

2.3.5.2.2. Type B2 Multi-Channel Access Procedure

A value $CW_p$ is maintained independently for each channel $c_i \in C$ using the procedure described in subclause 2.3.3. For determining $CW_p$ for a channel $c_i$, any PDSCH that fully or partially overlaps with the channel $c_i$ may be used in the procedure described in subclause 2.3.3.2. For determining $N_{init}$ for the channel $c_j$, the $CW_p$ value of a channel $c_{j1} \in C$ is used, where $c_{j1}$ is the channel with a largest $CW_p$ among all channels in the set C.

2.4. Uplink Channel Access Procedures

A UE and a BS scheduling or configuring UL transmission(s) for the UE perform the following procedures for the UE to access channel(s) (on which LAA SCell transmission(s) are performed). On the assumption of a PCell being a licensed band and one or more SCells being an unlicensed band are basically configured for the UE and the BS, the following description is given of a UL CAP to which various embodiments of the present disclosure are applied However, the UL CAP may also be applied in the same manner, when only an unlicensed band is configured for the UE and the BS.

2.4.1. Channel Access Procedures for Uplink Transmission(s)

The UE may access a channel on which UL transmission(s) are performed according to one of the Type 1 or Type 2 UL CAP. The Type 1 CAP is described in subclause 2.3.1.1. The Type 2 CAP is described in subclause 2.3.1.2.

If a UL grant scheduling a PUSCH transmission indicates the Type 1 CAP, the UE performs the Type 1 CAP for performing transmissions including a PUSCH transmission, unless stated otherwise in this subclause.

If a UL grant scheduling a PUSCH transmission indicates the Type 2 CAP, the UE performs the Type 2 CAP for performing transmissions including a PUSCH transmission, unless stated otherwise in this subclause.

The UE performs the Type 1 CAP for performing a transmission including an autonomous PUSCH transmission in configured UL resources, unless stated otherwise in this subclause.

The UE performs the Type 1 CAP for performing SRS transmissions not including a PUSCH transmission. A UL channel access priority class p=1 is used for SRS transmissions not including a PUSCH.

TABLE 18

| Channel Access Priority Class (p) | $m_p$ | $CW_{min, p}$ | $CW_{max, p}$ | $T_{ulm\ cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot, p}$ = 10 ms if the higher layer parameter absenceOfAnyOtherTechnology-r14 or absenceOfAnyOtherTechnology-r16 is provided, otherwise, $T_{ulm\ cot, p}$ = 6 ms.
NOTE 2:
When $T_{ulm\ cot, p}$ = 6 ms it may be increased to 8 ms by insetting one or more gaps. The minimum duration of a gap shall be 100 us. The maximum duration before including any such gap shall be 6 ms.

2.4.1.1. Channel Access Procedures and UL-Related Signaling

If a UE detects a 'UL configuration for LAA' field and/or a 'UL duration and offset' field (e.g., in DCI format 1C), the following is applicable.

If the 'UL configuration for LAA' field and/or the 'UL duration and offset' field configures and/or indicates 'UL offset' 1 and 'UL duration' d for subframe n, then the UE may use the Type 2 CAP for transmissions in subframe n+l+i (where i=0, 1, . . . d−1), irrespective of a channel access type signaled in a UL grant for those subframes, if the end of a UE transmission occurs in or before subframe n+l+d−1.

If the 'UL configuration for LAA' field and/or the 'UL duration and offset' field configures and/or indicates 'UL offset' 1 and an 'UL duration' d for subframe n and a 'COT sharing indication for AUL' field is set to '1', then a UE configured with autonomous UL may use the Type 2 CAP for autonomous UL transmission(s), assuming any priority class in subframes n+l+i (where i=0, 1, . . . d−1), if the end of the UE autonomous UL transmission occurs in or before subframe n+l+d−1 and the autonomous UL transmissions between n+l and n+l+d−1 are contiguous.

If the 'UL configuration for LAA' field and/or the 'UL duration and offset' field indicates 'UL offset' 1 and an 'UL duration' d for subframe n and the 'COT sharing indication for AUL' field is set to '0', then a UE configured with autonomous UL should not transmit autonomous UL in subframe n+l+i (where i=0, 1, . . . d−1).

2.4.1.2. Channel Access Procedures for Consecutive UL Transmission(s)

For contiguous UL transmission(s), the following is applicable.

If a UE is scheduled to perform a set of UL transmission(s) including a PUSCH using a UL grant, and if the UE may not access the channel for a transmission in the set prior to the last transmission, the UE should attempt to transmit a next transmission according to a channel access type indicated by the UL grant.

If the UE is scheduled to perform a set of consecutive UL transmissions without gaps including a PUSCH using one or more UL grants, and if the UE transmits one of the scheduled UL transmissions in the set after accessing the channel according to one of the Type 1 or Type 2 UL CAP, the UE may continue transmission of the remaining UL transmissions in the set, if any.

The UE does not expect different channel access types to be indicated for any consecutive UL transmissions without gaps between the transmissions.

For contiguous UL transmissions(s) including a transmission pause, the following is applicable.

If a UE is scheduled to perform a set of consecutive UL transmissions without gaps using one or more UL grants, if the UE has stopped transmitting during or before one of these UL transmissions in the set and prior to the last UL transmission in the set, and if the channel is sensed by the UE to be continuously idle after the UE has stopped transmitting, the UE may transmit a later UL transmission in the set using the Type 2 CAP.

If a channel sensed by the UE is not continuously idle after the UE has stopped transmitting, the UE may perform a later UL transmission in the set using the Type 1 CAP with a UL channel access priority class indicated in the DCI corresponding to the UL transmission.

2.4.1.3. Conditions for Maintaining Type 1 UL Channel Access Procedures

If a UE receives DCI indicating a UL grant scheduling a PUSCH transmission using the Type 1 CAP and/or DCI indicating a DL grant scheduling a PUCCH transmission using the Type 1 CAP, and if the UE has an ongoing Type 1 CAP before the PUSCH or PUCCH transmission starting time, if the UL channel access priority class value $p_1$ used for the ongoing Type 1 CAP is equal to or larger than a UL channel access priority class value pa indicated by the DCI, the UE may perform the PUSCH transmission in response to the UL grant by accessing the channel by using the ongoing Type 1 CAP.

If the UL channel access priority class value $p_1$ used for the ongoing Type 1 CAP is less than the UL channel access priority class value $p_2$ indicated by the DCI, the UE terminates the ongoing CAP.

The UE may perform a PUCCH transmission in response to the DL grant by accessing the channel by using the ongoing Type 1 CAP.

2.4.1.4. Conditions for Indicating Type 2 Channel Access Procedures

If the BS has transmitted on the channel according to the CAP described in subclause 2.3.1, the BS may indicate the Type 2 CAP in DCI of a UL grant which schedules a transmission including a PUSCH on a channel in subframe n.

Alternatively, when the BS has transmitted on the channel according to the CAP described in subclause 2.3.1., the BS may indicate, the BS may indicate, using the 'UL Configuration for LAA' field and/or the 'UL duration and offset' field, that the UE may perform the Type 2 CAP for transmissions including a PUSCH on a channel in subframe n.

Alternatively, if the UL transmission occurs within a time interval starting at $t_0$ and ending at $t_0+T_{CO}$, the BS may schedule a UL transmission on a channel, which follows a transmission by the BS on that channel with the Type 2A CAP for the UL transmission. Herein, $T_{CO}=T_{mcot,p}+T_g$ and each parameter may be defined as follows.

$t_0$: a time instant when the BS has started a transmission.

$T_{mcot,p}$: a value determined by the BS as described in subclause 2.2.

$T_g$: the total duration of all gaps of a duration greater than 25 us that occur between the DL transmission of the BS and a UL transmission scheduled by the BS, and between any two UL transmissions scheduled by the BS, starting from to.

If the UL transmissions may be scheduled contiguously, the BS schedules the UL transmissions without gaps between the consecutive UL transmissions within $t_0$ and $t_0+T_{CO}$.

For a UL transmission on the channel following a transmission of the BS on the channel within a duration $T_{sheet\_ul}$=25 us, the UE may perform the Type 2A CAP for the UL transmission.

If the BS indicates the Type 2 CAP for the UE by the DCI, the BS indicates the channel access priority class used to obtain access to the channel by the DCI.

2.4.1.5. Channel Access Procedure for UL Multi-Channel Transmission(s)

If a UE is scheduled to transmit on a set of channels C, if the Type 1 CAP is indicated by UL scheduling grants for UL transmissions on the set of channels C, and if the UL transmissions are scheduled to start at the same time on all channels in the set of channels C, and/or intends to perform a UL transmission on configured resources on the set of channels C with the Type 1 CAP, and if the channel frequencies of the set of channels C is a subset of one of the sets of preconfigured channel frequencies, the UE may transmit on a channel $c_i \in C$ using the Type 2 CAP.

If the Type 2 CAP is performed on the channel $c_i$ immediately before the UE transmission on the channel $c_j \in C$ (where i≠j), and if the UE has accessed a channel $c_j$ using the Type 1 CAP, the channel $c_j$ is selected by the UE uniformly randomly from the set of channels C before performing the Type 1 CAP on any channel in the set of channels C.

If the UE fails to access any of the channels, the UE may not transmit on the channel $c_i \in C$ within the bandwidth of a carrier of a carrier bandwidth, on which the UE is scheduled or configured by UL resources.

2.4.2. Type 1 UL Channel Access Procedure

This subclause describes a CAP performed by a UE, in which a time duration spanned by sensing slots that are sensed to be idle before a UL transmission(s) is random. The subclause is applicable to the following transmissions.

- PUSCH/SRS transmission(s) scheduled or configured by the BS.
- PUCCH transmission(s) scheduled or configured by the BS.
- Transmission(s) related to a random access procedure (RAP).

The UE may perform a transmission using the Type 1 CAP after a channel is sensed to be idle during the slot durations of a defer duration $T_d$, and a counter N is zero in step 4. The counter N is adjusted by sensing the channel for additional slot duration(s) according to the following procedure.

1) Set $N=N_{input}$ where $N_{init}$ is a random number uniformly distributed between 0 and $CW_p$, and go to step 4.
2) If N>0 and the UE chooses to decrement the counter, set N=N−1.
3) Sense the channel for an additional slot duration, and if the additional slot duration is idle, go to step 4; else, go to step 5.
4) If N=0, stop; else, go to step 2.
5) Sense the channel until either a busy slot is detected within an additional defer duration $T_d$ or all the slots of the additional defer duration $T_d$ are detected to be idle.
6) If the channel is sensed to be idle during all the slot durations of the additional defer duration $T_d$, go to step 4; else, go to step 5.

Figure 21:
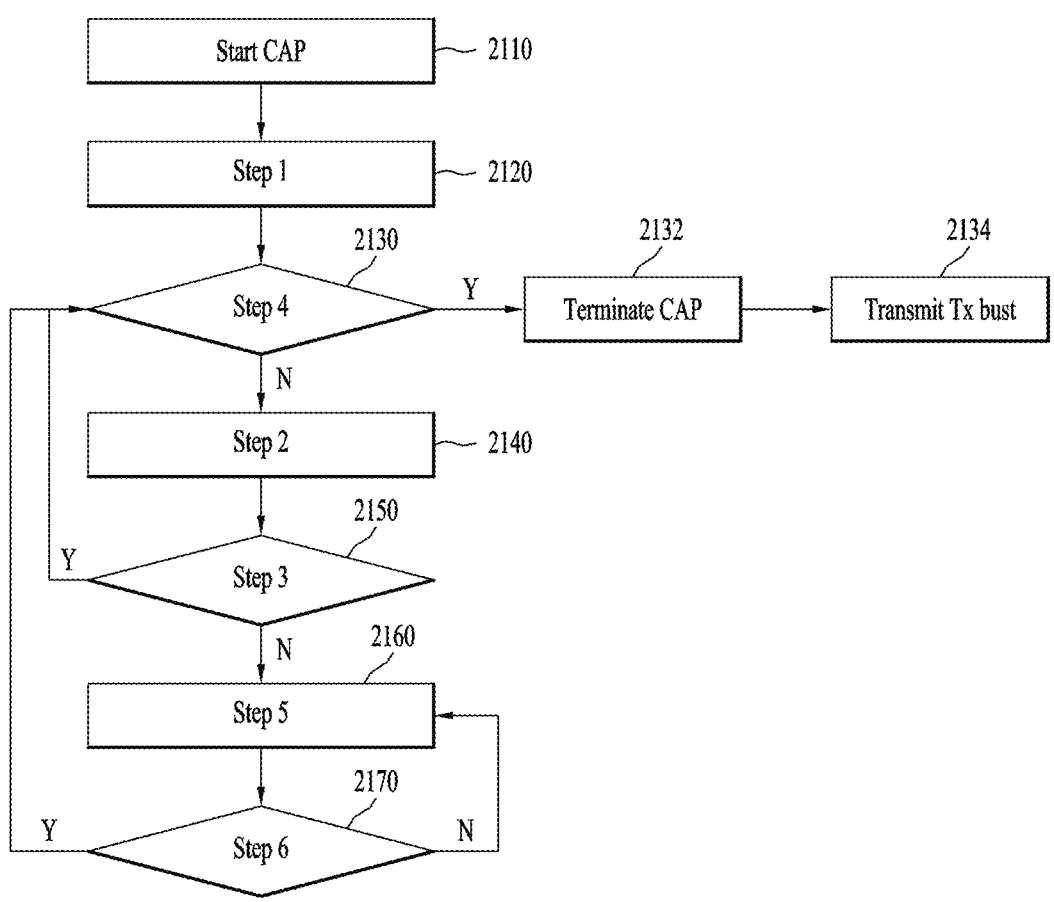
FIG. 21 is a flowchart illustrating a UL CAP for transmission in an unlicensed band, to which various embodiments of the present disclosure are applicable.

FIG. 21 is a diagram illustrating a UL CAP for transmission in an unlicensed band to which various embodiments of the present disclosure are applicable.

The afore-described Type 1 UL CAP of a UE may be summarized as follows.

For a UL transmission, a transmission node (e.g., a UE) may initiate a CAP to operate in an unlicensed band (2110).

The UE may select a backoff counter N randomly within a CW according to step 1. N is set to an initial value $N_{init}$ (2120). $N_{init}$ is a value randomly selected between 0 and $CW_p$.

Subsequently, when the backoff counter value N is 0 according to step 4 (2130; Y), the UE ends the CAP (2132). The UE may then transmit a Tx burst (2134). On the other hand, if the backoff counter value is not 0 (2130; N), the UE decrements the backoff counter value by 1 according to step 2 (2140).

Subsequently, the UE checks whether a channel is idle (2150). If the channel is idle (2150; Y), the UE checks whether the backoff counter value is 0 (2130).

On the contrary, if the channel is not idle, that is, the channel is busy (2150; N), the UE checks whether the channel is idle for a defer duration $T_d$ (of 25 usec or more) longer than a slot duration (e.g., 9 usec) according to step 5 (2160). If the channel is idle for the defer duration (2170; Y), the UE may resume the CAP.

For example, if the backoff counter value $N_{init}$ is 10 and the channel is determined to be idle after the backoff counter value is decremented to 5, the UE senses the channel for the defer duration and determines whether the channel is idle. If the channel is idle for the defer duration, the UE may perform the CAP again from the backoff counter value 5 (or the backoff counter value 4 after decrementing the backoff counter value by 1), instead of setting the backoff counter value $N_{init}$.

On the other hand, if the channel is busy for the defer duration (2170; N), the UE checks again whether the channel is idle for a new defer duration by performing operation 2160 again.

If the UE has not performed a UL transmission on a channel on which UL transmission(s) are performed after step 4 in the above procedure, the UE may perform a UL transmission on the channel, if the following condition is satisfied:

- if the channel is sensed to be idle at least in a sensing slot duration $T_{sl}$ when the UE is ready to perform the transmission; and
- if the channel has been sensed to be idle during all the slot durations of a defer duration $T_d$ immediately before the transmission.

On the contrary, if the channel has not been sensed to be idle in a sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the slot durations of the defer duration $T_d$.

The defer duration $T_d$ includes a duration $T_f(=16$ us) immediately followed by $m_p$ consecutive slot durations where each slot duration $T_{sl}$ is 9 us, and $T_f$ includes an idle slot duration $T_{sl}$ at the start of $T_f$.

$CW_{min,p} \leq CW_p \leq CW_{max,p}$ is the contention window. $CW_p$ adjustment is described in subclause 2.3.2.

$CW_{min,p}$ and $CW_{max,p}$ are chosen before step 1 of the above procedure.

$m_p$, $CW_{min,p}$ and $CW_{max,p}$ are based on a channel access priority class signaled to the UE (see Table 18).

$X_{Thresh}$ is adjusted according to subclause 2.3.3. as described below.

2.4.3. Type 2 UL Channel Access Procedure

This subclause describes a CAP performed by a UE, in which a time duration spanned by sensing slots sensed to be idle before a UL transmission(s) is deterministic.

If the UE is indicated by the BS to perform the Type 2 UL CAP, the UE follows the procedure described in subclause 2.4.3.1.

2.4.3.1. Type 2A UL Channel Access Procedure

If the UE is indicated to perform the Type 2A UL CAP, the UE uses the Type 2A UL CAP for a UL transmission. The UE may perform the transmission immediately after sensing the channel to be idle for at least a sensing duration $T_{short\_ul}=25$ us $T_{short\_ul}$ includes a duration $T_f=16$ us immediately followed by one slot sensing slot duration $T_{sl}=9$ us, and $T_f$ includes a sensing slot at the start of $T_f$. The channel is considered to be idle for $T_{short\_ul}$, if both sensing slots of $T_{short\_ul}$ are sensed to be idle.

2.4.3.2. Type 2B UL Channel Access Procedure

If the UE is indicated to perform a Type 2B UL CAP, the UE uses the Type 2B UL CAP for a UL transmission. The UE may perform the transmission immediately after sensing the channel to be idle within a duration of $T_f=16$ us. $T_f$ includes a sensing slot that occurs within the last 9 us of $T_f$. The channel is considered to be idle within the duration $T_f$, if the channel is sensed to be idle for a total of at least 5 us with at least of 4 us sensing occurring in the sensing slot.

2.4.3.3. Type 2C UL Channel Access Procedure

If the UE is indicated to perform a Type 2C UL CAP for a UL transmission, the UE does not sense the channel before the transmission. The duration of the corresponding UL transmission is at most 584 us.

2.4.4. Contention Window Adjustment Procedure

If the UE performs a transmission associated with a channel access priority class p on a channel, the UE maintains the contention window value $CW_p$ and adjusts $CW_p$ for the transmission before step 1 of the procedure described in subclause 2.4.2. (i.e., before a CAP is performed).

2.4.4.1. Contention Window Adjustment Procedure for UL Transmission Scheduled/Configured by eNB If the UE performs a transmission using the Type 1 CAP associated with a channel access priority class p on a channel, the UE maintains the contention window value $CW_p$ and adjusts $CW_p$ for the transmission before step 1 of the procedure described in subclause 2.4.1. (i.e., before the CAP is performed), using the following procedure.

If the UE receives a UL grant and/or an autonomous uplink downlink feedback information (AUL-DFI), the contention window size for all the priority classes is adjusted as follows.

If a new data indicator (NDI) value for at least one HARQ process associated with HARQ_ID ref is toggled, and/or if the HARQ-ACK value(s) for at least one of the HARQ processes associated with HARQ_ID ref received in the earliest AUL-DFI after $n_{ref}+3$ indicates ACK, for every priority class p∈{1, 2, 3, 4}, set $CW_p = CW_{min,p}$.

Otherwise, increase $CW_p$ for every priority class p∈{1, 2, 3, 4} to the next higher allowed value.

Herein, HARQ_ID ref is the HARQ process ID of a UL-SCH in reference subframe $n_{ref}$. The reference subframe $n_{ref}$ is determined as follows.

If the UE receives a UL grant in subframe $n_g$, subframe $n_w$ is the most recent subframe before subframe $n_g$−3 in which the UE has transmitted a UL-SCH using the Type 1 CAP.

If the UE performs transmissions including a UL-SCH without gaps starting with subframe no and in subframes $n_0$, $n_1$, . . . , $n_w$, reference subframe $n_{ref}$ is subframe $n_0$.

Otherwise, reference subframe $n_{ref}$ is subframe $n_w$.

If the UE is scheduled to perform transmissions without gaps including a PUSCH in a set of subframes $n_0$, $n_1$, . . . , $n_{w-1}$ using the Type 1 CAP, and if the UE is not able to perform any transmission including a PUSCH in the set of subframes, the UE may keep the value $CW_p$ unchanged for every priority class p∈{1, 2, 3, 4}.

If the reference subframe for the last scheduled transmission is also $n_{ref}$, the UE may keep the value $CW_p$ for every priority class p∈{1, 2, 3, 4} the same as that for the last scheduled transmission including a PUSCH using the Type 1 CAP.

If $CW_p = CW_{max,p}$, the next higher allowed value for adjusting $CW_p$ is $CW_{max,p}$.

If $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by the UE from the set of values {1, 2, . . . , 8} for each priority class p∈{1, 2, 3, 4}.

2.4.4.2. Contention Window Adjustment Procedures for UL Transmissions Scheduled/Configured by gNB If the UE performs transmissions using the Type 1 CAP associated with a channel access priority class p on a channel, the UE maintains the contention window value $CW_p$ and adjusts $CW_p$ for those transmissions before step 1 of the procedure described in subclause 2.4.1. (i.e., before the CAP is performed), using the following steps.

1> For every priority class p∈{1, 2, 3, 4}, set $CW_p = CW_{min,p}$.

2> If an HARQ-ACK feedback is available after the last update of $CW_p$, go to step 3. Otherwise, if the UE transmission after the procedure described in subclause 2.4.1. does not include a retransmission or is performed within a duration $T_w$ from the end of a reference duration corresponding to the earliest UL transmission burst after the last update of $CW_p$ transmitted after the procedure described in subclause 2.4.1., go to step 5; otherwise go to step 4.

3> The HARQ-ACK feedback(s) corresponding to PUSCH(s) in the reference duration for the latest UL transmission burst for which an HARQ-ACK feedback is available is used as follows.

a. If at least one HARQ-ACK feedback is 'ACK' for PUSCH(s) with TB-based transmissions or at least 10% of HARQ-ACK feedbacks is 'ACK' for PUSCH(s) with CBG-based transmissions, go to step 1; otherwise go to step 4.

4> Increase $CW_p$ for every priority class p∈{1, 2, 3, 4} to the next higher allowed value.

5> For every priority class p∈{1, 2, 3, 4}, maintain $CW_p$ as it is; go to step 2.

The HARQ-ACK feedback, reference duration and duration Tw in the above procedure are defined as follows.

HARQ-ACK feedback for PUSCH(s) transmissions is expected to be provided to UE(s) explicitly or implicitly where implicit HARQ-ACK feedback for the purpose of contention window adjustment in this subclause is determined based on an indication for a new transmission or retransmission in DCI scheduling PUSCH(s) as follows.

If a new transmission is indicated, 'ACK' is assumed for the TBs or CBGs in the corresponding PUSCH(s) for the TB-based and CBG-based transmission, respectively.

If a retransmission is indicated for TB-based transmissions, 'NACK' is assumed for the TBs in the corresponding PUSCH(s).

If a retransmission is indicated for CBG-based transmissions, and if a bit value in a code block group transmission information (CBGTI) field is '0' or '1', 'ACK' or 'NACK' is assumed for the corresponding CBG in the corresponding PUSCH(s), respectively.

The reference duration corresponding to a channel occupancy initiated by the UE, including transmission of PUSCH(s) is defined in this subclause as a duration starting from the beginning of the channel occupancy until the end of the first slot where at least one unicast PUSCH is transmitted over all the resources allocated for the PDSCH, or until the end of the first transmission burst by the gNB that contains unicast PUSCH(s) transmitted over all the resources allocated for the PDSCH, whichever occurs earlier. If the channel occupancy includes a unicast PUSCH, but it does not include any unicast PUSCH transmitted over all the resources allocated for that PUSCH, then, the duration of the first transmission burst by the UE within the channel occupancy that contains PUSCH(s) is the reference duration for CWS adjustment.

$T_W = \max(T_A, T_B+1 \text{ ms})$ where $T_B$ is the duration in ms of a transmission burst from the start of the reference duration. If the absence of any other technology sharing the channel may not be guaranteed on a long-term basis (e.g. by level of regulation), $T_A=5$ ms, and otherwise, $T_A=10$ ms.

If the UE performs transmissions using the Type 1 CAP associated with a channel access priority class p on a channel and the transmissions are not associated with explicit or implicit HARQ-ACK feedbacks as described above in this subclause, the UE adjusts $CW_p$ before step 1 in the procedure described in subclause 2.4.1., using the latest $CW_p$ used for any UL transmissions on the channel using the Type 1 CAP associated with the channel access priority class p. If the corresponding channel access priority class p has not been used for any UL transmission on the channel, $CW_p = CW_{min,p}$ is used.

2.4.4.3. Common Procedures for CWS Adjustments for UL Transmissions

The following applies to the procedures described in subclauses 2.4.4.1 and 2.4.4.2.

If $CW_p = CW_{max,p}$ the next higher allowed value for adjusting $CW_p$ is $CW_{max,p}$.

If $CW_p = CW_{max,p}$ consecutively used K times for generation of $N_{init}$, $CW_p$ is reset to $CW_{min}$ only for that priority class p for which $CW_p = CW_{max,\ p}$ is consecutively used K times for generation of $N_{init}$. K is selected by the UE from the set of values $\{1, 2, \ldots, 8\}$ for each priority class $p \in \{1, 2, 3, 4\}$.

2.4.5. Energy Detection Threshold Adaptation Procedure

A UE accessing a channel on which UL transmission(s) are performed should set an energy detection threshold $X_{Thres}$ to be less than or equal to a maximum energy detection threshold $X_{Thresh\_max}$.

The maximum energy detection threshold $X_{Thresh\_max}$ is determined as follows.

If the UE is configured with a higher layer parameter maxEnergyDetectionThreshold-r14 and/or maxEnergyDetectionThreshold-r16, $X_{Thresh\_max}$ is set to be equal to a value signaled by the higher-layer parameter.

Otherwise, the UE should determine $X'_{Thresh\_max}$ according to the procedure described in subclause 2.3.3.1.

If the UE is configured with a higher layer parameter energyDetectionThresholdOffset-r14 and/or energyDetectionThresholdOffset-r16, $X'_{Thresh\_max}$ is set by adjusting $X_{Thresh\_max}$ according to an offset value signaled by the higher-layer parameter.

Otherwise, the UE sets $X_{Thresh\_max} = X'_{Thresh\_max}$.

2.3.3.1. Default Maximum Energy Detection Threshold Computation Procedure

If the higher-layer parameter 'absenceOfAnyOtherTechnology-r14' and/or 'absenceOfAnyOtherTechnology-r16' is provided:

$$X'_{Thresh\_max} = \min\left\{ \begin{array}{l} T_{\max} + 10 \text{ dB}, \\ X_r \end{array} \right\}$$

where $X_r$ is a maximum energy detection threshold defined in dBm by regulatory requirements when such requirements are defined. Otherwise $X_r = T_{max} + 10$ dB Otherwise:

$$X'_{Thresh\_max} = \max\left\{ \begin{array}{l} -72 + 10 \cdot \log10(BW\text{MHz}/20 \text{ MHz}) \text{ dBm}, \\ \min\left\{ \begin{array}{l} T_{max}, \\ T_{max} - T_A + (P_H + 10 \cdot \log10(BW\text{MHz}/20 \text{ MHz}) - P_{TX}) \end{array} \right\} \end{array} \right\}$$

where $T_A = 10$ dB $P_H = 23$ dBm;

$P_{TX}$ the set to the value of $P_{CMAX\_H,c}$ $T_{max}$ (dBm) = $10 \cdot \log 10(3.16228 \cdot 10^{-8}$ (mW/MHz) $\cdot$ BWMHz (MHz))

BWMHz is the single channel bandwidth in MHz.

3. Various Embodiments of the Present Disclosure

A detailed description will be given of various embodiments of the present disclosure based on the above technical ideas. The afore-described contents of clause 1 and clause 2 are applicable to various embodiments of the present disclosure described below. For example, operations, functions, terminologies, and so on which are not defined in various embodiments of the present disclosure may be performed and described based on clause 1 and clause 2.

Symbols/abbreviations/terms used in the description of various embodiments of the present disclosure may be defined as follows.

PDCCH: physical downlink control channel
PDSCH: physical downlink shared channel
PUSCH: physical uplink shared channel
CSI: channel state information
RRM: radio resource management
DCI: downlink control information
CAP: channel access procedure
Ucell: unlicensed cell
TBS: transport block size
SLIV: starting and length indicator value (a field indicating the index of the starting symbol and the number of symbols in a slot of a PDSCH and/or a PUSCH. This field may be carried on a PDCCH scheduling the PDSCH and/or the PUSCH.)
BWP: bandwidth part (it may include contiguous RBs on the frequency axis and correspond to one numerology (e.g., an SCS, a CP length, a slot/mini-slot duration, or the like). Although multiple BWPs may be configured in one carrier (e.g., the number of BWPs per carrier may also be limited), the number of active BWPs may be limited to a value less than the number (e.g., 1) of the multiple BWPs in the carrier.
CORESET: control resource set (a time and frequency resource area in which a PDCCH may be transmitted. The number of CORESETs per BWP may be limited.)
REG: resource element group
SFI: slot format indicator (an indicator indicating a symbol-level DL/UL direction in specific slot(s), which may be transmitted on a GC-PDCCH.)
COT: channel occupancy time
CO structure: channel occupancy structure. This may be related to one or more of time-domain resources and/or frequency-domain resources occupied by a transmission on a channel by a BS/UE after a CAP is performed. The term CO structure may be interchangeably used with COT structure in an equivalent meaning.

SPS: semi-persistent scheduling

As more and more communication devices require larger communication capacities, efficient use of a limited frequency band becomes a significant requirement. In this context, techniques of using an unlicensed band such as 2.4 GHz mainly used in the legacy WiFi system or 5 GHz and/or 60 GHz which has newly attracted attention are under consideration for a cellular communication system such as 3GPP LTE/NR. Hereinbelow, the term unlicensed band may be replaced with unlicensed spectrum or shared spectrum.

To transmit a signal in an unlicensed band, a UE or a BS uses wireless transmission and reception based on contention between communication nodes. That is, when each communication node is to transmit a signal in the unlicensed band, the communication node may confirm that another communication node is not transmitting a signal in the unlicensed band by performing channel sensing before the signal transmission. For the convenience of description, this operation is defined as a listen before talk (LBT) operation or a CAP. Particularly, the operation of checking whether another communication node is transmitting a signal is defined as carrier sensing (CS), and determining that another communication node is not transmitting a signal is defined as confirming clear channel assessment (CCA).

In an LTE/NR system to which various embodiments of the present disclosure are applicable, an eNB/gNB or a UE may also have to perform an LBT operation or a CAP for signal transmission in an unlicensed band. In other words, the eNB/gNB or the UE may transmit a signal in the unlicensed band, using or based on the CAP.

Further, when the eNB/gNB or the UE transmits a signal in the unlicensed band, other communication nodes such as WiFi nodes should not interfere with the eNB/gNB or the UE by performing a CAP. For example, the WiFi standard (e.g., 801.11ac) specifies a CCA threshold as −62 dBm for a non-WiFi signal and as −82 dBm for a WiFi signal. Accordingly, a station (STA) or access point (AP) operating in conformance to the WiFi standard may not transmit a signal to prevent interference, for example, when receiving a signal other than a WiFi signal at or above −62 dBm.

In the following description of various embodiments of the present disclosure, when it is said that a BS succeeds in a CAP, this may imply that the BS determines that an unlicensed band is idle and thus starts to transmit a signal in the unlicensed band at a specific time. On the contrary, when it is said that the BS fails in the CAP, this may imply that the BS determines that the unlicensed band is busy and thus does not start to transmit a signal in the unlicensed band at a specific time.

For co-existence with a WiFi system in which a CAP is performed in units of 20 MHz, a carrier bandwidth is basically limited to 20 MHz in an LTE LAA system. However, the carrier bandwidth may vary according to SCSs in the NR system. Thus, the carrier bandwidth may be larger than 20 MHz. Further, the UE may be configured with a BWP narrower than the carrier bandwidth operated by the gNB. The same thing may be applied to an NR-unlicensed band (NR-U) system. In consideration of a frequency unit in which the CAP is performed in the WiFi system, the carrier bandwidth may be set to a multiple of 20 MHz in the NR-U system.

Accordingly, 20 MHz has a meaning as a frequency unit in which the CAP is performed, and it will be clearly understood to those skilled in the art that various embodiments of the present disclosure are not limited to the specific frequency value of 20 MHz.

Meanwhile, the above-described carrier bandwidth may be understood as a wideband, and a frequency unit in which the CAP is performed may be understood as a CAP subband and/or a CAP (LBT) bandwidth and/or a channel. The CAP subband and/or LBT bandwidth and/or channel is a carrier including a set of contiguous RBs in which the CAP is performed within an unlicensed band (and/or a shared spectrum) or a part of the carrier.

When consecutive transmissions without a gap on the time axis or a set of transmissions without a gap greater than a predetermined size (e.g., 16 us) on the time axis from one transmission node (a gNB and/or a UE) is referred to as a burst or a Tx burst) in an unlicensed-band NR system, various embodiments of the present disclosure described below may be related to methods of transmitting and receiving an initial signal to indicate a burst transmission and enable the burst transmission to be recognized, a PDCCH monitoring method, and a cross-carrier scheduling (CCS) method.

In the NR system, for example, a scheduling unit is a slot and a time-domain structure which also allows only a part of a slot to be filled for transmission (mini-slot transmission) may be supported. For example, this may be a time-domain structure considered to support an unlicensed band.

Accordingly, considering the time-domain structure of the NR system, while the following description is given of various embodiments of the present disclosure, focusing on operations in an unlicensed band (and an NR system operating in the unlicensed band), those skilled in the art will understand that various embodiments of the present disclosure are also readily applicable to a licensed band (and an NR system operating in the licensed band).

Operations according to various embodiments of the present disclosure will be described below in detail. Those skilled in the art will understand that the various embodiments of the present disclosure described below may be combined in whole or in part to constitute other various embodiments of the present disclosure, unless contradicting with each other.

3.1. Method of Transmitting and Receiving Initial Signal

Figure 23:
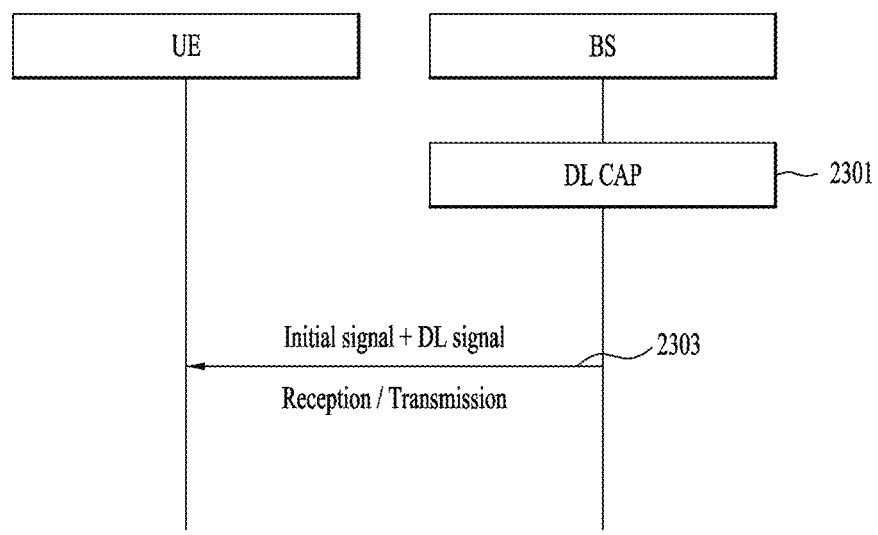
FIG. 23 is a diagram illustrating a signal flow for an exemplary method of transmitting and receiving an initial signal according to various embodiments of the present disclosure.

FIG. 23 is a diagram illustrating an exemplary method of transmitting and receiving an initial signal according to various embodiments of the present disclosure.

Referring to FIG. 23, in operation 2301 according to an exemplary embodiment of the present disclosure, a BS may perform a DL CAP for an unlicensed band to transmit a DL signal to a UE. For example, the DL CAP may be one or more of the afore-described various DL CAPs for DL transmission.

In operation 2303 according to an exemplary embodiment of the present disclosure, when the BS determines that the unlicensed band is available (or a channel configured in the unlicensed band is idle) by the DL CAP, the BS may transmit an initial signal and/or a DL signal in the unlicensed band (or on the channel configured in the unlicensed band) to the UE based on a method according to various embodiments of the present disclosure.

Accordingly, for example, the UE may expect the BS to transmit the DL signal based on the initial signal received earlier than the DL signal. Thus, the UE may receive the DL signal from the BS.

For example, the UE may transmit or receive a signal associated with the received DL signal to or from the BS. For example, when the UE is to transmit a specific signal to the BS, the UE may transmit the specific signal to the BS based on the result of a UL CAP. For example, the UL CAP may be one or more of the afore-described various UL CAPs for UL transmission.

In the descriptions of this subclause and various embodiments of the present disclosure, determination of the inside/outside of a COT may refer to acquisition/transmission of a DL burst based on a DL signal and/or a PDCCH as in [Method #1-1A], [Method #1-2A], [Method #1-1B], and [Method #1-2B] described below.

Information elements (IEs) described in this subclause and various embodiments of the present disclosure may be defined as follows.

For example, precoderGranularity is an IE included in an RRC parameter ControlResourceSet used to configure a time and/or frequency CORESET for DCI detection. For example, this IE may provide information about a precoder granularity on the frequency axis.

For example, precoderGranularity may be set to one of sameAsREG-bundle and allContiguousRBs (ENUMERATED {sameAsREG-bundle, allContiguousRBs}).

For example, sameAsREG-bundle may be information indicating that a frequency-domain precoder granularity for each CORESET is equal to a frequency-domain REG bundle size.

For example, allContiguousRBs may be information indicating that a frequency-domain precoder granularity for each CORESET is equal to the number of frequency-domain contiguous RBs in the CORESET.

For example, pdcch-DMRS-ScramblingID is an IE included in the RRC parameter ControlResourceSet used to configure a time and/or frequency CORESET for DCI detection. pdcch-DMRS-ScramblingID may be an RRC parameter for PDCCH DMRS scrambling initialization.

For example, searchSpaceType may be an IE included in an RRC parameter SearchSpace defining how and/or where a PDCCH (PDCCH candidates) is to be detected, and each search space may be associated with one ControlResourceSet.

For example, searchSpaceType may be an RRC parameter indicating a CSS and/or a USS and/or a DCI format for monitoring.

For example, frequencyDomainResources may be an IE included in the RRC parameter ControlResourceSet.

For example, frequencyDomainResources may provide information about the frequency-domain resources of the CORESET.

Now, a description will be given of a specific operation of a UE and/or a BS based on an initial signal transmission and reception method according to various embodiments of the present disclosure.

For example, when transmission data is generated or a signal/channel such as an RS for measurement requires periodic transmissions in a licensed channel/carrier at the BS, it may be guaranteed that the transmission starts at an intended time.

On the other hand, even though the BS is to transmit a DL signal at a specific time in an unlicensed channel/carrier, the BS may not start the transmission when the BS fails in a CAP immediately before the specific time. That is, the BS may or may not transmit a signal in the unlicensed channel/carrier depending on whether the BS succeeds in the CAP. Therefore, the UE needs to identify when the BS starts a transmission, and thus requires a signal indicating whether a DL transmission is actually performed. This signal indicating whether a DL transmission is actually performed may be referred to as an initial signal.

For example, the initial signal may be transmitted at the start of a Tx burst.

In another example, the initial signal may be transmitted in every specific time unit of the Tx burst (per specific time unit, for example, per slot boundary in the Tx burst).

According to various embodiments of the present disclosure, the initial signal may be transmitted in the unlicensed channel/carrier at least for the following purposes.

1> For example, to receive DCI in a Tx burst from a serving cell and receive a PDSCH scheduled by the DCI.

2> For example, to perform CSI measurement in a CSI-RS transmitted in a Tx burst from a serving cell.

3> For example, to perform RRM measurement in signals of a Tx burst from a serving cell/neighbor cell.

4> For example, for automatic gain control (AGC) gain setting: for example, the initial signal may be used to set AGC for receiving a burst transmitted after the initial signal.

5> For example, (coarse or fine) time and/or frequency synchronization: for example, the initial signal may be used for accurate time and/or frequency synchronization between signals (for RRM or CSI measurement) to be transmitted periodically. Alternatively, for example, the initial signal may be used to detect a frame/subframe/slot/symbol boundary. Alternatively, for example, an NR node may usually attempt to discover/detect the initial signal without FFT, and only when discovering/detecting the initial signal, may perform FFT. In this case, there may be a gain in terms of battery saving.

6> For example, for power saving: for example, the UE does not perform or performs minimally a DL reception operation such as PDCCH monitoring until before discovering/detecting the initial signal. Upon discovery of the initial signal, the UE is allowed to start the DL reception operation such as PDCCH monitoring. Therefore, power consumption of the UE may be reduced.

3.1.1. Operation on Receiver Side (Entity A)

3.1.1.1. [Method #1-1A] DL Tx Burst is Obtained Based on DL Signal

According to various embodiments of the present disclosure, specific DL signal(s) may be defined as an initial signal. According to various embodiments of the present disclosure, upon discovery of the initial signal, the UE may recognize the presence of a DL Tx burst. Alternatively, according to various embodiments of the present disclosure, upon discovery of the specific DL signal(s), the UE may recognize the presence of a DL Tx burst.

For example, the specific DL signal(s) may be at least all or a part of the following signals.

PSS and/or SSS and/or PBCH DM-RS: In an exemplary embodiment, a PSS and/or an SSS and/or a PBCH DM-RS defined in NR may be modified and repeated along the time axis and/or may be extended along the frequency axis. Thus, tracking performance may be secured or transmission power may be increased.

PDCCH DM-RS: In an exemplary embodiment, the constraint that the DM-RS includes only one symbol to minimize time-axis occupation may be imposed.

In an exemplary embodiment, the DM-RS may be a separate (PDCCH) DM-RS which is not linked to a specific CORESET. In this case, for example, the DM-RS may be configured to occupy a frequency band made up of a specific number of or more RBs (e.g., 50 RBs) in consideration of the tracking performance and/or transmission power of the DM-RS. For example, a transmission periodicity (e.g., 7 symbols (7-symbol periodicity)) may be additionally configured.

In an exemplary embodiment, the DM-RS may be a (PDCCH) DM-RS linked to a specific CORESET. For example, in this case, the DM-RS may be configured to occupy a frequency band made up of a specific number of or more RBs (e.g., 50 RBs) in consideration of the tracking performance and/or transmission power of the DM-RS, and may be transmitted in a specific REG or total REGs of the CORESET irrespective of a PDCCH transmission. In another example, characteristically, the DM-RS may be a DM-RS corresponding to a CORESET for which precoderGranularity is set to allContiguousRBs. For example, when precoderGranularity is set to allContiguousRBs in the NR system, the UE may assume that the DM-RS exists in every REG in contiguous RBs including REGs in mapped (or discovered) PDCCH candidates. On the other hand, for example, the UE may assume that the DM-RS exists in all REGs (or some REG(s)) of the CORESET irrespective of the mapped (or discovered) PDCCH candidates.

In an exemplary embodiment, the UE may be configured with a specific PDCCH DM-RS as an initial signal by the BS. In another example, when the UE is configured with a PDCCH DM-RS associated with a CORESET satisfying a specific condition, the UE may determine the PDCCH DM-RS as an initial signal. For example, the CORESET satisfying the specific condition may be determined by parameters such as a specific CORESET index (e.g., the lowest index or the highest index larger than 0 among CORESET indexes configured for an active DL BWP) and/or pdcch-DMRS-ScramblingID (e.g., when it is set only by a function of cell-specific information such as a cell ID) and/or precoderGranularity (e.g., when it is set to allContiguousRBs) and/or duration information (e.g., when it is set to a 1-symbol duration) and/or frequencyDomainResources (e.g., when it indicates a predetermined number of or more RBs). For example, a CORESET associated with CORESET index 0 and/or a CORSET associated with a DM-RS with pdcch-DMRS-ScramblingID configured only by a function of cell-specific information may be the CORESET satisfying the specific condition. For example, PDCCHs configured to be monitored in a search space set associated with the CORESET satisfying the specific condition may be defined/configured as initial signals. For example, a PDCCH DM-RS in every search space set (or search space, this may also be applied to this subclause and various embodiments of the present disclosure) associated with the CORESET may be configured as an initial signal. In another example, for a search space set satisfying a specific condition (e.g., the index of a specific search space set such as the lowest of CORESET indexes configured for an active DL BWP and/or a monitoring occasion interval of k or fewer slots/symbols and/or a specific aggregation level and/or a CSS and/or a specific DCI format such as DCI format 2_0 and/or configuration of a CORESET at a specific symbol position in a slot) among search space sets associated with the CORESET, a PDCCH DM-RS in a CORESET associated with the search space set may be configured as an initial signal. In another example, when the PDCCH DM-RS in the CORESET associated with the search space set satisfying the specific condition is configured, the UE may determine the PDCCH DM-RS as an initial signal. For example, the search space set satisfying the specific condition may be determined by parameters such as a specific search space set index (e.g., the lowest index or the lowest index larger than 0, among search space set indexes configured for an active DL BWP) and/or a monitoring occasion interval (e.g., k or fewer slots/symbols) and/or an aggregation level (e.g., including a specific aggregation level such as AL=16) and/or searchSpaceType (e.g., CSS type) and/or a configuration for a specific DCI format (e.g., DCI format 2_0/1/2/3 and/or a DCI format indicating a COT structure) and/or a monitoring symbol index in a slot (e.g., symbol 0, symbol 7, or the like). In another example, when a PDCCH DM-RS in a CORESET satisfying a specific condition among CORESETs associated with search space sets satisfying a specific condition is configured, the UE may determine the PDCCH DM-RS as an initial signal.

CSI-RS (channel state information-reference signal): In an exemplary embodiment, the UE may be configured with a specific CSI-RS as an initial signal by the BS. In another example, when a CSI-RS satisfying a specific condition is configured, the UE may determine the CSI-RS as an initial signal. For example, the CSI-RS satisfying the specific condition may be determined by a configuration such as a configured usage (e.g., tracking and/or RRM measurement and/or CSI acquisition/obtaining and/or beam management) and/or a frequency band (e.g., a specific number of or more RBs) and/or a monitoring occasion interval (e.g., equal to or less than k slots/symbols) and/or a parameter involved in a sequence initialization signal (e.g., set by a function of only a cell-specific parameter such as a cell ID irrespective of a UE-specific parameter).

According to various embodiments of the present disclosure, when the UE discovers the initial signal, the UE may perform PDCCH monitoring and/or CSI-RS reception and/or DL semi-persistent scheduling (SPS)-based signal reception, considering at least a specific duration to be DL-directed.

For example, the specific duration may be X symbol(s) or slot(s) from a symbol in which the initial signal has been discovered (in the case of multiple symbols (a plurality of symbols)), the starting or ending symbol), and may be considered to be DL-directed.

For example, the value of X may be configured/indicated or predefined.

In another example, the specific duration may be an entire slot (from the starting/ending symbol of the initial signal in the slot to the ending symbol of the slot) including the symbol in which the initial signal has been discovered (in the case of multiple symbols (a plurality of symbols), the starting or ending symbol) and the following Y symbol(s) or slot(s), and may be considered to be DL-directed.

For example, the value of Y may be configured/indicated or predefined.

According to various embodiments of the present disclosure, a different initial signal sequence and/or a different initial signal may be defined according to information about X and/or Y.

For example, the information about X and/or Y may be received by using a different linear feedback shift register (LFSR) initial value and/or a different polynomial for generating an m-sequence such as a PSS/SSS.

In another example, X and/or Y may be used as a parameter for sequence initialization of a pseudo-random sequence such as a DM-RS/CSI-RS.

In another example, it may be configured that X=1 (symbol or slot) for a DM-RS linked to CORESET index 1, and X=2 (symbols or slots) for a DM-RS linked to CORESET index 2. That is, when the DM-RS linked to CORESET index 1 is discovered (used) as an initial signal, X=1 (symbol or slot). When the DM-RS linked to CORESET index 2 is discovered (used) as an initial signal, X=2 (symbols or slots). In other words, for example, when the DM-RS linked to CORESET index 1 is discovered (used) as an initial signal, the specific duration is one symbol or slot. When the DM-RS linked to CORESET index 2 is discovered (used) as an initial signal, the specific duration is two symbols or slots. On the contrary, it may be configured that X=2 (symbols or slots) for a DM-RS linked to CORESET index 1, and X=1 (symbol or slot) for a DM-RS linked to CORESET index 2.

In another example, information delivered in the initial signal (e.g., PSS/SSS and/or DM-RS/CSI-RS) may include information (e.g., an offset and a duration) about a UL duration as well as information about a DL duration.

3.1.1.2. [Method #1-2A] DL Tx Burst is Obtained Based on PDCCH

According to various embodiments of the present disclosure, specific PDCCH(s) may be defined as an initial signal. For example, upon discovery of the initial signal, the UE may recognize the presence of a DL Tx burst. In another example, upon discovery of specific PDCCH(s), the UE may recognize the presence of a DL Tx burst.

In an exemplary embodiment, the specific PDCCH(s) may be PDCCH(s) (PDCCH candidate(s)) linked to a CORESET satisfying a specific condition. For example, the CORESET satisfying the specific condition may be determined by parameters such as a specific CORESET index (e.g., the lowest index or the lowest index larger than 0, among CORESET indexes configured for an active DL BWP) and/or pdcch-DMRS-ScramblingID (e.g., when it is set by a function of only cell-specific information such as a cell ID) and/or precoderGranularity (e.g., when it is set to allContiguousRBs) and/or duration information (e.g., when it is set to 1-symbol duration) and/or frequencyDomainResources (e.g., when it indicates a predetermined number of or more RBs). For example, a CORESET associated with CORESET index 0 and/or a CORESET associated with a DM-RS with pdcch-DMRS-ScramblingID configured by a function of only cell-specific information may be the CORESET satisfying the specific condition.

For example, PDCCHs configured to be monitored in a search space set associated with the CORESET satisfying the specific condition may be defined/configured as initial signals. For example, specific PDCCH(s) in every search space set linked to the CORESET may be configured as an initial signal.

In another example, for a search space set satisfying a specific condition (e.g., the index of a specific search space set such as the lowest of CORESET indexes configured for an active DL BWP and/or a monitoring occasion interval of k or fewer slots/symbols and/or a specific aggregation level and/or a CSS and/or a specific DCI format such as DCI format 2_0 and/or configuration of a CORESET at a specific symbol position in a slot) among search space sets associated with the CORESET, specific PDCCH(s) in a CORESET associated with the search space set may be configured as an initial signal.

In another example, when specific PDCCH(s) (PDCCH candidate(s)) are configured in the CORESET associated with the search space set satisfying the specific condition, the UE may determine the PDCCH(s) as an initial signal.

For example, the search space set satisfying the specific condition may be determined by parameters such as a specific search space set index (e.g., the lowest index or the lowest index larger than 0, among search space set indexes configured for an active DL BWP) and/or a monitoring occasion interval (e.g., k or fewer slots/symbols) and/or an aggregation level (e.g., including a specific aggregation level such as AL=16) and/or searchSpaceType (e.g., CSS type) and/or a configuration for a specific DCI format (e.g., DCI format 2_0/1/2/3 and/or a DCI format indicating a COT structure) and/or a monitoring symbol index in a slot (e.g., symbol 0, symbol 7, or the like).

In another example, when specific PDCCH(s) (PDCCH candidate(s)) is configured in a CORESET satisfying a specific condition among CORESETs associated with search space sets satisfying a specific condition, the UE may determine the PDCCH as an initial signal.

According to various embodiments of the present disclosure, when the UE discovers the initial signal, the UE may perform PDCCH monitoring and/or CSI-RS reception and/or DL SPS-based signal reception, considering at least a specific duration to be DL-directed.

For example, the specific duration may be X symbol(s) or slot(s) from a symbol in which the initial signal has been discovered (in the case of multiple symbols (a plurality of symbols), the starting or ending symbol), and may be considered to be DL-directed.

For example, the value of X may be configured/indicated or predefined.

In another example, the specific duration may be an entire slot (or from the starting/ending symbol of the initial signal in the slot to the last symbol of the slot) including a symbol in which the initial signal has been discovered (in the case of multiple symbols (a plurality of symbols), the starting or ending symbol) and the following Y symbol(s) or slot(s), and may be considered to be DL-directed.

For example, the value of Y may be configured/indicated or predefined.

According to various embodiments of the present disclosure, the information about X and/or Y may be included in the initial signal. For example, the information about X and/or Y may be indicated by DCI payload in the initial signal (i.e., the information may be included in the DCI payload).

In another example, the information delivered in the initial signal (e.g., the PDCCH) may include information about a UL duration (e.g., an offset and a duration) as well as information about a DL duration.

When a PDCCH is defined as an initial signal or a DL Tx burst is acquired through the PDCCH as in the above method, the UE may not succeed in decoding the PDCCH due to a PDCCH CRC error or the like, although the UE has discovered a DM-RS associated with the PDCCH. In this case, the UE may perform, for example, a DM-RS-based DL Tx burst reception operation as in [Method #1-1A]. Alternatively, for example, the UE may attempt to detect a PDCCH defined as an initial signal (or for acquiring a DL Tx burst) in the next PDCCH monitoring occasion, considering that there is no DL Tx burst for the UE.

In the above method, when a plurality of PDCCHs (PDCCH candidates) are defined as an initial signal for a specific duration (e.g., one symbol or slot, or X/Y symbol(s) or slot(s)) or when a DL Tx burst is acquired through a plurality of PDCCHs (PDCCH candidates), upon discovery of at least one of the PDCCHs, the UE may perform PDCCH monitoring and/or CSI-RS reception and/or DL SPS-based signal reception, considering at least the specific duration to be DL-directed.

In an exemplary embodiment, when a DL duration and/or a UL duration is indicated to the UE in the above-described [Method #1-1A] and [Method #1-2A], the DL duration and/or the UL duration may be interpreted differently depending on a signal and/or a channel defined as an initial signal.

For example, when a CSI-RS for tracking is discovered (used) as an initial signal, X=1 (symbol or slot), and when a PDCCH is discovered (used) as an initial signal, X=2 (symbols or slots). That is, for example, when the CSI-RS for tracking is discovered (used) as an initial signal, the DL duration and/or the UL duration may be one symbol or slot, and when the PDCCH is discovered (used) as an initial signal, the DL duration and/or the UL duration may be two symbols or slots.

For example, a different initial signal may be defined according to a slot/symbol index. For example, an initial signal may be defined for an even-numbered slot according to [Method #1-1A] and for an odd-numbered slot according to [Method #1-2A].

In an exemplary embodiment, when a DL Tx burst is acquired based on a DL signal and/or a PDCCH as in the above-described [Method #1-1A] and [Method #1-2A], a different method may be applied depending on the inside or outside of a COT of the BS. That is, for example, different methods may be applied to the inside and outside of the COT of the BS. For example, a DL Tx burst may be acquired inside the COT of the BS based on the exemplary embodiment described in [Method #1-1A]. For example, a DL Tx burst may be acquired outside the COT of the BS based on the exemplary embodiment described in [Method #1-2A].

For example, outside the COT and/or in the first k slot(s) of the COT (e.g., k=1 and the value of k may be predefined or indicated/configured to/for the UE by L1 signaling and/or higher-layer signalling), the UE may acquire a DL Tx burst and/or information about the DL Tx burst by using a specific PDCCH and/or DM-RS linked to a specific CORESET or search space set for which precoderGranularity is set to allContiguousRBs and/or frequencyDomainResources indicates a specific number of or more RBs (e.g., 48 RBs for a 30-kHz SCS and 96 RBs for a 15-kHz SCS where the SCS may be related to an unlicensed band in which a DL Tx burst is transmitted and received).

For example, the first k slot(s) of the COT may be the first k slot(s) inside the COT. For example, k may be associated with a processing time of the UE for determining the inside or outside of the COT and/or changing an operation accordingly. For example, the first k slot(s) of the corresponding COT is inside the COT, but considering the processing time, it may be difficult for the UE to immediately change the operation. Therefore, according to an exemplary embodiment, the UE may acquire a corresponding DL Tx burst and/or information on the DL Tx burst based on a similar operation to for the outside of the COT, in the first k slot(s) of the COT.

For example, it may be desirable in terms of reliable reception to design a corresponding signal/channel (e.g., DL signal and/or PDCCH) to occupy a significant amount of frequency-axis resources.

On the other hand, for example, it may be desirable to design the signal/channel to utilize less frequency resources inside the COT and/or after the first k slot(s) of the COT, when considering transmissions of other DL signals/channels such as other PDCCHs.

Therefore, for example, the UE may acquire a DL Tx burst and/or information about the DL Tx burst by using a specific PDCCH and/or DM-RS linked to a specific CORESET or search space set for which "precoderGranularity is not set to allContiguousRBs and/or which does not satisfy the condition that frequencyDomainResources indicates a specific number or more RBs (e.g., 48 RBs for a 30-kHz SCS and 96 RBs for a 15-kHz SCS)", inside the COT and/or after the first k slot(s) of the COT.

More specifically, for example, it is assumed that COT information (e.g., time-axis information and/or frequency-axis information about the COT) of the BS may be transmitted in a DCI format scrambled with a COT-RNTI. In this case, for example, it may be configured that the DCI format scrambled with the COT-RNTI is transmitted in CORESET #X for which precoderGranularity is set to allContiguousRBs and frequencyDomainResources indicates 48 RBs for a 30-kHz SCS or search space set #X linked to the CORESET. Further, for example, it may be configured that the DCI format scrambled with the COT-RNTI is transmitted in CORESET #Y for which precoderGranularny is not set to allContiguousRBs and frequencyDomainResources indicates 24 RBs for a 30-kHz SCS or search space set #Y linked to the CORESET.

For example, the BS may transmit the DCI format scrambled with the COT-RNTI in CORESET #X or the search space set #X linked to the CORESET, outside the COT and/or in the first k slot(s) of the COT. Further, for example, the BS may transmit the DCI format scrambled with the COT-RNTI in CORESET #Y or the search space set #Y linked to the CORESET, inside the COT and/or after the first k slot(s) of the COT. According to this exemplary embodiment, resources available for transmission of a DL channel/signal such as a PDCCH other than the DCI format and/or a PDSCH inside the COT may be efficiently used.

3.1.2. Operation on Transmitter Side (Entity B)

3.1.2.1. [Method #1-1B] DL Tx Burst is Transmitted Based on DL Signal

According to various embodiments of the present disclosure, specific DL signal(s) may be defined as an initial signal. According to various embodiments of the present disclosure, the BS may indicate the presence of a DL Tx burst by transmitting an initial signal after the BS succeeds in a CAP. In another example, the BS may indicate the presence of a DL Tx burst by transmitting specific DL signal(s) after the BS succeeds in a CAP. For example, the specific DL signal(s) may be all or a part of the signals proposed in [Method #1-1A] according to various embodiments of the present disclosure.

In an exemplary embodiment, when the BS transmits the initial signal, the BS may perform a DL transmission at least for a specific duration.

For example, the specific duration may be X symbol(s) or slot(s) from a symbol in which the initial signal has been discovered (in the case of multiple symbols (a plurality of symbols)), the starting or ending symbol), and may be considered to be DL-directed.

For example, the value of X may be configured/indicated or predefined for the UE by the BS.

In another example, the specific duration may be an entire slot (or from the starting/ending symbol of the slot to the last symbol of the slot) including the symbol in which the initial signal has been discovered (in the case of multiple symbols (a plurality of symbols), the starting or ending symbol) and the following Y symbol(s) or slot(s), and may be considered to be DL-directed.

For example, the value of Y may be configured/indicated or predefined for the UE by the BS.

According to various embodiments of the present disclosure, a different initial signal sequence and/or a different initial signal may be defined according to information about X and/or Y.

For example, the information about X and/or Y may be received by using a different LFSR initial value and/or a different polynomial for generating an m-sequence such as a PSS/SSS.

In another example, X and/or Y may be used as a parameter for sequence initialization of a pseudo-random sequence such as a DM-RS/CSI-RS.

In another example, information delivered in the initial signal (e.g., PSS/SSS and/or DM-RS/CSI-RS) may include information (e.g., an offset and a duration) about a UL duration as well as information about a DL duration.

3.1.2.2. [Method #1-2B] DL Tx Burst is Transmitted Based on PDCCH

According to various embodiments of the present disclosure, specific PDCCH(s) may be defined as an initial signal. According to various embodiments of the present disclosure, the BS may indicate the presence of a DL Tx burst by transmitting an initial signal after succeeding in a CAP. In another example, the BS may indicate the presence of a DL Tx burst by transmitting specific PDCCH(s) after succeeding in a CAP. For example, the specific DL signal(s) may be at least a part or all of PDCCH(s) (PDCCH candidate(s)) proposed in the afore-described [Method #1-2A] according to various embodiments of the present disclosure.

In an exemplary embodiment, once the BS transmits the initial signal, the BS may perform a DL transmission during at least a specific duration.

For example, the specific duration may be X symbol(s) or slot(s) from a symbol in which the initial signal has been discovered (in the case of multiple symbols (a plurality of symbols), the starting or ending symbol), and may be considered to be DL-directed.

For example, the value of X may be configured/indicated or predefined for the UE by the BS.

In another example, the specific duration may be an entire slot (or from the starting/ending symbol of the slot to the last symbol of the slot) including a symbol in which the initial signal has been discovered (in the case of multiple symbols (a plurality of symbols), the starting or ending symbol) and the following Y symbol(s) or slot(s), and may be considered to be DL-directed.

For example, the value of Y may be configured/indicated or predefined for the UE by the BS.

According to various embodiments of the present disclosure, information about X and/or Y may be included in the initial signal. For example, the information about X and/or Y may be indicated by DCI payload in the initial signal (i.e., the information may be included in the DCI payload).

In another example, the information delivered in the initial signal (e.g., the PDCCH) may include information about a UL duration (e.g., an offset and a duration) as well as information about a DL duration.

In an exemplary embodiment, when a DL Tx burst is acquired based on a DL signal and/or a PDCCH as in the above-described [Method #1-1A] and [Method #1-2A], a different method may be applied depending on the inside or outside of a COT of the BS. That is, for example, different methods may be applied to the inside and outside of the COT of the BS. For example, a DL Tx burst may be acquired inside the COT of the BS based on the exemplary embodiment described in [Method #1-1A]. For example, a DL Tx burst may be acquired outside the COT of the BS based on the exemplary embodiment described in [Method #1-2A].

For example, outside the COT and/or in the first k slot(s) of the COT (k=1 and the value of k may be predefined or indicated/configured to/for the UE by L1 signaling and/or higher-layer signalling), the BS may transmit information about a DL Tx burst by using a specific PDCCH and/or DM-RS linked to a specific CORESET or search space set for which precoderGranularity is set to allContiguousRBs and/or frequencyDomainResources indicates a specific number of or more RBs (e.g., 48 RBs for a 30-kHz SCS and 96 RBs for a 15-kHz SCS where the SCS may be related to an unlicensed band in which a DL Tx burst is transmitted and received).

For example, the first k slot(s) of the COT may be the first k slot(s) inside the COT. For example, k may be associated with a processing time of the UE for determining the inside or outside of the COT and/or changing an operation accordingly. For example, the first k slot(s) of the corresponding COT is inside the COT, but considering the processing time, it may be difficult for the UE to immediately change the operation. Therefore, according to an exemplary embodiment, the UE may acquire a corresponding DL Tx burst and/or information on the DL Tx burst based on a similar operation to for the outside of the COT, in the first k slot(s) of the COT.

For example, it may be desirable in terms of reliable reception to design a corresponding signal/channel (e.g., DL signal and/or PDCCH) to occupy a significant amount of frequency-axis resources.

On the other hand, for example, it may be desirable to design the signal/channel to utilize less frequency resources inside the COT and/or after the first k slot(s) of the COT, when considering transmissions of other DL signals/channels such as other PDCCHs.

Therefore, for example, a DL Tx burst and/or information about the DL Tx burst may be transmitted (to the UE by the BS) by using a specific PDCCH and/or DM-RS linked to a specific CORESET or search space set for which "precoderGranularity is not set to allContiguousRBs and/or which does not satisfy the condition that frequencyDomainResources indicates a specific number or more RBs (e.g., 48 RBs for a 30-kHz SCS and 96 RBs for a 15-kHz SCS)", inside the COT and/or after the first k slot(s) of the COT.

More specifically, for example, it is assumed that COT information (e.g., time-axis information and/or frequency-axis information about the COT) of the BS may be transmitted in a DCI format scrambled with a COT-RNTI. In this case, for example, it may be configured that the DCI format scrambled with the COT-RNTI is transmitted in CORESET #X for which precoderGranularity is set to allContiguousRBs and frequencyDomainResources indicates 48 RBs for a 30-kHz SCS or search space set #X linked to the CORESET. Further, for example, it may be configured that the DCI format scrambled with the COT-RNTI is transmitted in CORESET #Y for which precoderGranularity is not set to allContiguousRBs and frequencyDomainResources indicates 24 RBs for a 30-kHz SCS or search space set #Y linked to the CORESET.

For example, the BS may transmit the DCI format scrambled with the COT-RNTI in CORESET #X or the search space set #X linked to the CORESET, outside the COT and/or in the first k slot(s) of the COT. Further, for example, the BS may transmit the DCI format scrambled with the COT-RNTI in CORESET #Y or the search space set #Y linked to the CORESET, inside the COT and/or after the first k slot(s) of the COT. According to this exemplary embodiment, resources available for transmission of a DL channel/signal such as a PDCCH other than the DCI format and/or a PDSCH inside the COT may be efficiently used.

In [Method #1-1A], [Method #1-2A], [Method #1-1B], and [Method #1-2B] according to various embodiments of the present disclosure, an initial signal may include a plurality of symbols. That is, according to various embodiments of the present disclosure, the initial signal may be transmitted and received in a plurality of symbols.

For example, the initial signal may be repeated in each symbol.

For example, a different initial signal may be defined for each symbol.

For example, the initial signal may be repeated and multiplexed by a time-axis orthogonal cover code (OCC) in each symbol.

In [Method #1-1A], [Method #1-2A], [Method #1-1B], and [Method #1-2B] according to various embodiments of the present disclosure, a plurality of signals/channels may be defined as an initial signal even in a specific duration (e.g., one symbol or slot or X/Y symbols or slots).

Alternatively, according to various embodiments of the present disclosure, the UE may recognize a DL Tx burst based on a plurality of signals/channels within a specific duration.

Alternatively, according to various embodiments of the present disclosure, a different signal/channel may be defined as an initial signal in each specific duration (e.g., one symbol or slot or X/Y symbols or slots).

With reference to the example of FIG. 22, various embodiments of the present disclosure will be described below in greater detail.

Figure 22:
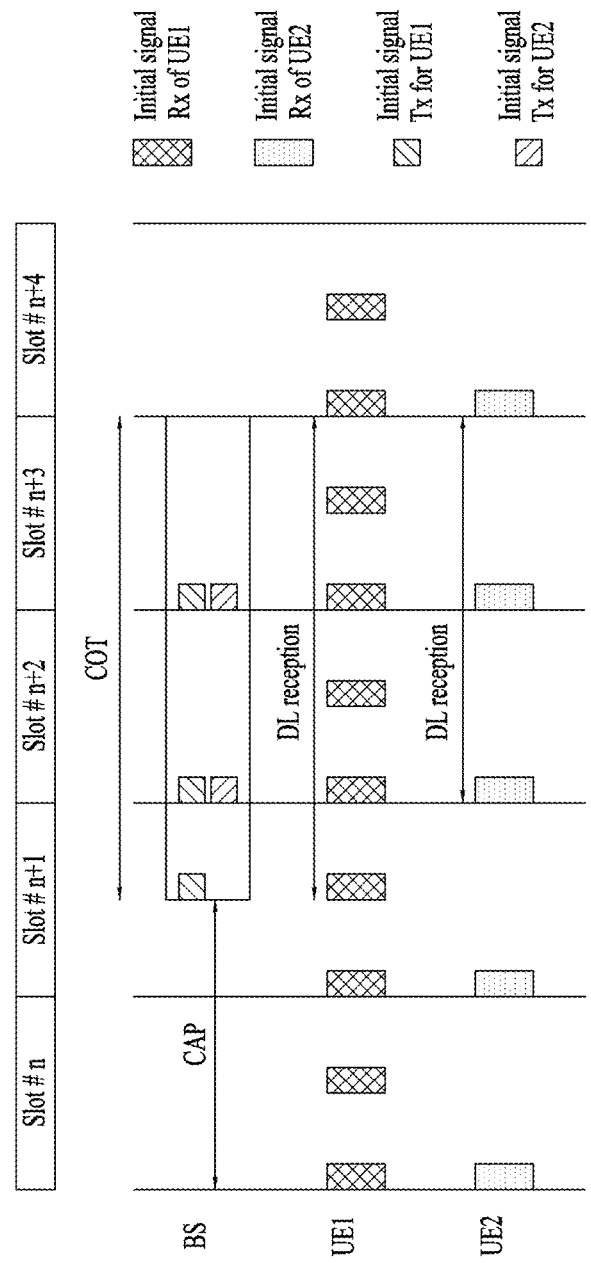
FIG. 22 is a diagram illustrating an exemplary structure of transmitting and receiving an initial signal according to various embodiments of the present disclosure.

FIG. 22 is a diagram illustrating an exemplary structure of transmitting and receiving an initial signal according to various embodiments of the present disclosure.

Referring to FIG. 22, for example, a BS may configure an initial signal with a half-slot periodicity for a first UE (UE1), and an initial signal with a 1-slot periodicity for a second UE (UE2).

For example, it may be predefined or signalled that when the initial signal is detected in a specific slot, the entire specific slot may be used for DL.

For example, after succeeding in a CAP, the BS may configure a COT to span 2.5 slots from the middle of slot #n+1 and transmit a DL Tx burst.

For example, when UE1 detecting the initial signal with the half-slot periodicity succeeds in detecting the initial signal in the middle of slot #n+1, UE1 may perform a DL reception on the assumption that at least the slot is DL-directed.

Further, for example, when UE2 detecting the initial signal in every slot (with the 1-slot periodicity) succeeds in detecting the initial signal in slot #n+2, UE2 may perform a DL reception on the assumption that at least the slot is DL-directed.

For example, even for a specific UE, a different initial signal may be defined for each slot and/or slot group and/or symbol and/or symbol group.

For example, a PDCCH may be configured as an initial signal in a slot in which a CSS is configured. For example, a CSI-RS for tracking may be configured as an initial signal in a slot in which a USS is configured.

On the contrary, a CSI-RS for tracking may be configured as an initial signal in a slot in which a CSS is configured. For example, a PDCCH may be configured as an initial signal in a slot in which a USS is configured.

In another example, for an initial access UE (i.e., a UE which has performed/is performing initial access), a PDCCH may be defined/configured as an initial signal, and then a new signal/channel may be defined/configured as an initial signal by a configuration.

In another example, a CSI-RS for tracking may be defined/configured as an initial signal for an RRC-connected UE, and a PSS/SSS and/or a PDCCH may be defined/configured as an initial signal for other UEs (e.g., an RRC-inactive and/or RRC-idle UE).

On the contrary, for example, a PSS/SSS and/or a PDCCH may be defined/configured as an initial signal for an RRC-connected UE, and a CSI-RS for tracking may be defined/configured as an initial signal for other UEs (e.g., an RRC-inactive and/or RRC-idle UE).

In another example, a PDCCH DM-RS may be defined/configured as an initial signal for a UE operating for DL only in an unlicensed-band NR cell, and a PDCCH (indicating a DL/UL direction and/or a COT structure) may be defined/configured as an initial signal for a UE operating for both DL and UL in the unlicensed-band NR cell.

3.2. Method of Controlling PDCCH Monitoring Periodicity and/or Time Instance

Figure 27:
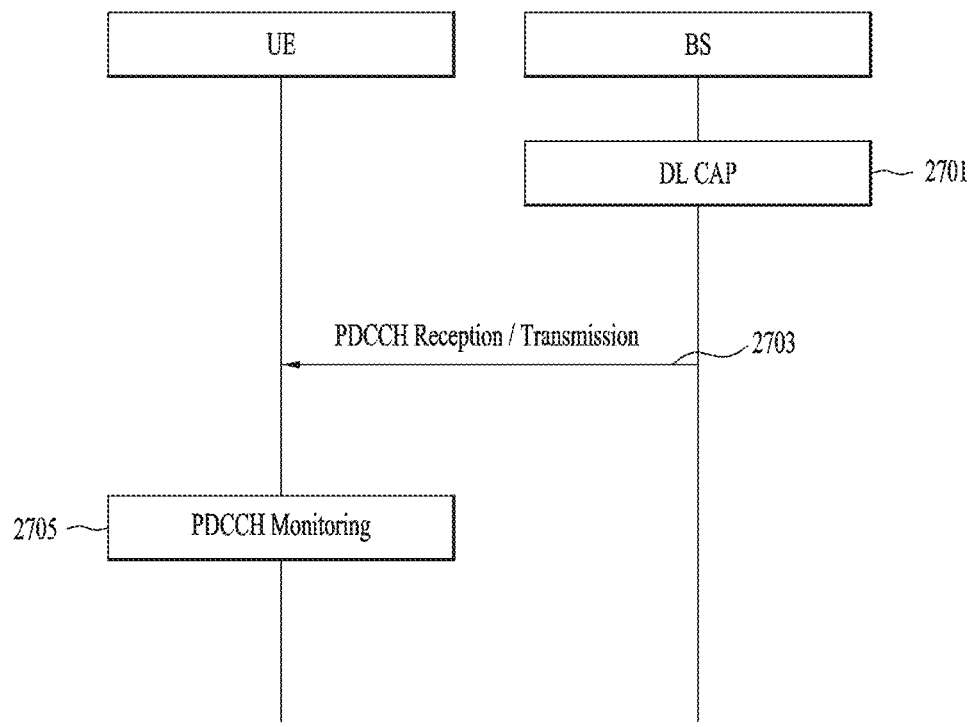
FIG. 27 is a diagram illustrating a signal flow for an exemplary method of transmitting and receiving a PDCCH according to various embodiments of the present disclosure.

FIG. 27 is a diagram illustrating an exemplary method of transmitting and receiving a PDCCH according to various embodiments of the present disclosure.

Referring to FIG. 27, in operation 2701 according to an exemplary embodiment, a BS may perform a DL cap for an unlicensed band to transmit a DL signal/channel such as a PDCCH to a UE. For example, the DL CAP may be one or more of the afore-described various DL CAPs for DL transmission.

In operation 2703 according to an exemplary embodiment, when the BS determines from the DL CAP that the unlicensed band is available (or a channel configured in the unlicensed band is idle), the BS may transmit a PDCCH to the UE in the unlicensed band (or on the channel configured in the unlicensed band) based on a method according to various embodiments of the present disclosure.

For example, a PDCCH monitoring periodicity and/or time instance for the UE may be determined based on a later-described method according to various embodiments of the present disclosure. In operation 2705 according to an exemplary embodiment, the UE may monitor and/or decode the PDCCH received form the BS based on the determined PDCCH monitoring periodicity and/or time instance.

For example, the UE may transmit and receive a signal scheduled by the received PDCCH (e.g., DCI) to and from the BS. For example, when the UE is to transmit a specific signal to the BS, the UE may transmit the specific signal based on the result of a UL CAP. For example, the UL CAP may be one or more of the afore-described various UL CAPs for UL transmission.

For example, in operation 2703 according to the above-described exemplary embodiment, the BS may transmit the PDCCH to the UE in consideration of the PDCCH monitoring periodicity for the UE.

Now, a description will be given of a specific operation of a UE and/or a BS based on a PDCCH transmission and reception method according to various embodiments of the present disclosure.

For example, a time when the BS succeeds in a CAP may not be predicted. Therefore, it may be favorable in terms of efficient channel occupancy to set a PDCCH monitoring periodicity and/or time instance interval to be very short.

On the contrary, for example, because setting of a short PDCCH monitoring periodicity and/or time instance interval may result in great power consumption of the UE for PDCCH monitoring, it may be favorable in terms of power consumption of the UE to set a relatively long PDCCH monitoring periodicity and/or time instance interval.

Various embodiments of the present disclosure may provide specific methods of controlling a PDCCH monitoring periodicity and/or time instance interval in consideration of the above-described aspects.

In the following description of various embodiments of the present disclosure in this subclause, a DL COT structure may be obtained through an initial signal as described in subclause 3.1. Alternatively, for example, the DL COT structure may be acquired through DCI format 2_0 and/or a separate DCI format.

3.2.1. Operation of Receiver Side (Entity A)

3.2.1.1. [Method #2-1A] Method of Controlling PDCCH Monitoring Period and/or Time Instance Interval According to Length of First Slot of DL COT For example, when the first slot of a DL COT is too short, it may be very difficult to control a PDCCH monitoring periodicity and/or time instance interval immediately starting in the following slot (or after K slots), in terms of UE implementation (e.g., in terms of a processing time of the UE).

In this regard, according to various embodiments of the present disclosure, for example, when the length of the first slot of a DL COT is equal to or less than or less than N symbols (e.g., N=3), the UE may perform PDCCH monitoring with a (PDCCH monitoring) periodicity applied to the outside of the DL COT in the slot to the next slot (immediately following the slot) (and/or the following K slots).

On the contrary, according to various embodiments of the present disclosure, for example, when the length of the first slot of the DL COT is equal to or larger than or larger than N symbols (e.g., N=3), the UE may perform PDCCH monitoring with the (PDCCH monitoring) periodicity applied to the outside of the DL COT, only in the slot (and/or the slot to the (immediately) following K−1 slots). For example, the UE may perform PDCCH monitoring with a (PDCCH monitoring) periodicity configured for the inside of the DL COT, starting in the next slot (and/or the following K slots).

For example, the UE may switch to PDCCH monitoring with the (PDCCH monitoring) periodicity configured for the inside of the DL COT, starting in the first of the slots following the corresponding slot (e.g., from the beginning and/or boundary of the first slot).

For example, the above-described N may be set to a larger value than a processing time of the UE for switching of a PDCCH monitoring operation. For example, N (the number of symbols) may be set to a value equal to or larger than a time taken for the UE to switch the PDCCH monitoring operation.

In an exemplary embodiment, it is assumed that multiple PDCCH monitoring occasions (and/or CORESETs) are configured in a search space set within a specific slot.

For example, 0 & 4 & 7 & 11 are set as monitoring symbols (i.e., symbol #0 and symbol #4 and symbol #7 and symbol #11 are configured as monitoring symbols) in a slot of a 1-symbol CORESET, and 0/1 & 4/5 & 7/8 & 11/12 are set as monitoring symbols (i.e., symbol #0/1 and symbol #4/5 and symbol #7/8 and symbol #11/12 are configured as monitoring symbols) in a slot of a 2-symbol CORESET.

According to various embodiments of the present disclosure, based on the assumption, when the length of the first slot of a discovered DL COT is equal to or less than (or less than) 3 symbols, the UE may perform PDCCH reception in multiple PDCCH monitoring occasions (and/or CORESETs) with a configured periodicity (e.g., the periodicity of monitoring symbols in the above 1-symbol/2-symbol CORESET) even a slot in the corresponding slot to the next slot. According to various embodiments of the present disclosure, the UE may perform PDCCH reception only in the earliest symbol area (and/or CORESET) among multiple PDCCH monitoring occasions (and/or CORESETs) in a slot, starting in the next slot. For example, the PDCCH may be received only in the earliest symbol #0 of the monitoring symbols in the slot of the 1-symbol CORESET, and only in the earliest symbol #0/1 of the monitoring symbols in the slot of the 2-symbol CORESET. Accordingly, PDCCH occasions may be reduced.

On the contrary, according to various embodiments of the present disclosure, based on the assumption, when the length of the first slot of a discovered DL COT is larger than (or equal to or larger than) 3 symbols, the UE may perform PDCCH reception in multiple PDCCH monitoring occasions (and/or CORESETs) with a periodicity even within the slot and only for the slot. According to various embodiments of the present disclosure, the UE may perform PDCCH reception only in the earliest symbol area (and/or CORESET) among multiple PDCCH monitoring occasions (and/or CORESETs) in a slot, starting from the next slot.

For a 1-symbol CORESET, for example, when the length of the first slot of a discovered DL COT is equal to or less than 3 symbols, the UE may receive a PDCCH based on PDCCH monitoring in monitoring symbols 0 & 4 & 7 & 11 in the corresponding slot to the next slot, and based on PDCCH monitoring in monitoring symbol 0 in slots following the next slot. On the contrary, when the length of the first slot of the discovered DL COT is larger than 3 symbols, the UE may receive a PDCCH based on PDCCH monitoring in monitoring symbols 0 & 4 & 7 & 11 only in the corresponding slot, and based on PDCCH monitoring in monitoring symbol 0 in slots following the slot.

For a 2-symbol CORESET, for example, when the length of the first slot of a discovered DL COT is equal to or less than 3 symbols, the UE may receive a PDCCH based on PDCCH monitoring in monitoring symbols 0/1 & 4/5 & 7/8 & 11/12 in the corresponding slot to the next slot, and based on PDCCH monitoring in monitoring symbol 0/1 in slots following the next slot. On the contrary, when the length of the first slot of the discovered DL COT is larger than 3 symbols, the UE may receive a PDCCH based on PDCCH monitoring in monitoring symbols 0/1 & 4/5 & 7/8 & 11/12 only in the corresponding slot, and based on PDCCH monitoring in monitoring symbol 0/1 in slots following the slot.

For example, when monitoring occasions of different periodicities are configured for multiple search space sets, the above-described various embodiments of the present disclosure may be applied to specific search space set(s).

For example, the above-described various embodiments of the present disclosure may be applied to all search space set(s) in which PDCCH monitoring occasions are configured at an interval less than a specific threshold (e.g., one slot) among multiple search space sets.

For example, it is assumed that PDCCH monitoring is configured at an interval of 2 slots in search space set #0, at an interval of 2 symbols in search space set #1, and at an interval of 7 symbols in search space set #2. That is, in this example, PDCCH monitoring occasions are configured at a larger interval than a specific threshold in search space set

0, and PDCCH monitoring occasions are configured at a smaller interval than the specific threshold in search space set #1/2.

In this case, the UE may perform PDCCH monitoring at the configured interval only in some starting slot(s) of a DL COT in each search space set #0/1/2. In slot(s) following the corresponding slot(s), PDCCH monitoring is performed at an interval of one slot, particularly in the earliest symbols (i.e., CORESET duration) of each slot in search space set #1/2 (whereas PDCCH monitoring may be performed still at an interval of 2 slots in search space set #0).

3.2.1.2. [Method #2-2A] Method of Controlling PDCCH Monitoring Periodicity and/or Time Instance Interval According to various embodiments of the present disclosure, a PDCCH monitoring periodicity and/or time instance interval may be controlled explicitly by UE-specific DCI and/or cell-specific DCI (e.g., explicit signaling). According to various embodiments of the present disclosure, a PDCCH monitoring periodicity and/or time instance interval may be controlled implicitly after detection of a predetermined signal (e.g., a DL burst, a DM-RS, a GC-PDCCH and/or a PDCCH) and/or based on information about a COT structure.

For example, multiple PDCCH monitoring intervals may be configured for a specific search space set, and which one of the PDCCH monitoring intervals is to be used may be signaled. For example, when the PDCCH monitoring interval is signaled by UE-specific DCI and/or cell-specific DCI, the UE-specific DCI and/or cell-specific DCI may include information about the PDCCH monitoring interval.

In another example, search space sets may be divided into two or more groups and a group including search space sets in which PDCCH monitoring will be performed may be signaled. For example, each of the groups may include one or more search space sets (one search space set may belong to two or more groups), and which one of the groups is used for PDCCH monitoring may be signaled to the UE. For example, when the group is signaled by UE-specific DCI and/or cell-specific DCI, the UE-specific DCI and/or cell-specific DCI may include information about the group. For example, it may be configured that a different PDCCH monitoring periodicity and/or time instance interval is applied to each group.

It may be difficult in terms of UE implementation for the UE to instantly change the monitoring behavior after the time of receiving explicit signaling (i.e., to change the monitoring behavior as soon as receiving the explicit signaling). In this regard, according to various embodiments of the present disclosure, the UE may perform PDCCH reception at an indicated PDCCH monitoring interval after Z symbols from the time of receiving the explicit signal (or from an HARQ-ACK feedback (for the explicit signaling)).

For example, it is assumed that PDCCH monitoring is configured at an interval of 2 slots (type A) or 4 slots (type B) in search space set #0, at an interval of 2 symbols (type A) or 1 slot (type B) in search space set #1, and at an interval of 7 symbols (type A) or 1 slot (type B) in search space set #2.

Based on the above assumption, for example, the BS may signal type A/type B as a PDCCH monitoring periodicity by UE-specific DCI and/or cell-specific DCI. For example, the UE may apply the changed monitoring periodicity after Z symbols from the time of receiving the UE-specific DCI and/or cell-specific DCI.

In another example, it is assumed that PDCCH monitoring is configured at an interval of 2 slots in search space set #0, at an interval of 2 symbols in search space set #1, and at an interval of 7 symbols in search space set #2.

Based on the above assumption, for example, group A (or group #0) may set for search space set #0 and group B (or group #1) may set for search space set #1/2. For example, this configuration may be based on higher-layer signalling. For example, the UE may receive information indicating a group to which each search space set belongs, such as information indicating that search space set #0 belongs to group A, search space set #1 belongs to group B, and search space set #2 belongs to group B.

For example, the BS may signal which one of group A and group B (and/or which search space set related to the group) and/or which search space set is activated by UE-specific DCI and/or cell-specific DCI. For example, the UE may perform PDCCH monitoring in each active search space set (e.g., in each search space set included in an active group) after Z symbols from the time of receiving the UE-specific DCI and/or cell-specific DCI.

That is, for example, the BS may indicate which one of group A and group B is active by the UE-specific DCI and/or cell-specific DCI, at a group level.

In another example, the BS may indicate which one of group A and group B an activated search space set belongs to by UE-specific DCI and/or cell-specific DCI. In this case, the BS may also indicate which one of the search space sets included in the group is activated.

The above-described method according to various embodiments of the present disclosure may be applied in the same manner to a method of controlling a PDCCH monitoring periodicity and/or time instance according to a COT structure. In an exemplary embodiment, the UE may identify a COT structure by determining whether it is included in a DL Tx burst by the afore-described initial signal according to various embodiments of the present disclosure in subclause 3.1 (e.g., it is identified based on information related to the length of a DL Tx burst included in the initial signal and/or when the initial signal is discovered, a DL Tx burst is determined to span a predetermined length) or DCI format 2_0 (e.g., delivered on a GC-PDCCH) and/or a separate DCI format indicating the COT structure (e.g., delivered on a PDCCH and/or a GC-PDCCH).

Alternatively in an exemplary embodiment, a PDCCH monitoring periodicity and/or time instance interval may be controlled implicitly after detection of a predetermined signal (e.g., a DL burst, a DM-RS, a GC-PDCCH and/or a PDCCH) based on information about a COT structure.

For example, it is assumed that PDCCH monitoring is configured at an interval of 2 slots (type A) or 4 slots (type B) in search space set #0, at an interval of 2 symbols (type A) or 1 slot (type B) in search space set #1, and at an interval of 7 symbols (type A) or 1 slot (type B) in search space set #2.

Based on the assumption, for example, type B may be applied until before a COT is discovered (and/or in some starting slot(s) of the DL COT), and type A may be applied inside the COT (and/or in slot(s) after the starting slot(s) of the DL COT).

In another example, it is assumed that PDCCH monitoring is configured at an interval of 2 slots in search space set #0, at an interval of 2 symbols in search space set #1, and at an interval of 7 symbols in search space set #2.

Based on the assumption, for example, search space set #0 may be configured as group A, and search space set #1/2 may be configured as group B. For example, group B may be applied until before a COT is discovered (and/or in some starting slot(s) of the DL COT), and group A may be applied inside the COT (and/or in slot(s) after the starting slot(s) of the DL COT).

Alternatively, for example, it may be understood that group A is applied inside a COT, and group B is applied outside the COT (e.g., before the COT is discovered and/or after the COT ends).

Alternatively, for example, when a COT structure is identified by an initial signal according to various embodiments of the present disclosure, a specific duration including X symbol(s) or slot(s) after the initial signal is discovered may be determined to be DL-directed, as described before in subclause 3.1. Accordingly, it may be understood that group A is applied to the inside of the specific duration including the X symbol(s) or slot(s), and group B is applied to the outside of the specific duration.

Search Space Set Switching Method—Embodiment 1

A description will be given of Embodiment 1 related to search space set switching according to a method of controlling a PDCCH monitoring periodicity and/or time instance interval according to various embodiments of the present disclosure.

For example, switching between groups may amount to changing a group in which PDCCH monitoring is performed.

For example, after one or more of predetermined conditions are satisfied, a UE performing PDCCH monitoring in group B may start PDCCH monitoring in group A, and end the PDCCH monitoring in group B.

For example, the aspect of UE implementation may also be considered as described before in [Method #2-1A] and/or [Method #2-1B]. For example, the UE performing PDCCH monitoring in group B may start PDCCH monitoring in group A and end the PDCCH monitoring in group B, N symbols after one or more of the predetermined conditions are satisfied. For example, the UE may start PDCCH monitoring in group A and end PDCCH monitoring in group B, in the first slot after the N symbols (e.g., the beginning and/or boundary of the first slot), thereby switching the PDCCH monitoring operation.

For example, N may be set to a larger value than a processing time of the UE for switching a PDCCH monitoring operation (e.g., search space set switching corresponding to starting PDCCH monitoring in group A and ending PDCCH monitoring in group B). For example, N may be set to be equal to or larger than a time taken for the UE to switch the PDCCH monitoring operation.

For example, the UE may be provided with two groups or at least two groups of search space sets for a PDCCH (e.g., by higher-layer signalling such as RRC signalling). For example, the UE may be provided with the group index of each search space set for the configured PDCCH monitoring.

For example, the UE may be configured to switch between groups (e.g., by higher-layer signalling such as RRC signalling).

For example, switching between groups may be indicated by at least one of the following options (in other words, when one or more of predetermined conditions are satisfied, switching may occur between groups).

Opt 1: Implicit indication. For example, switching between groups is implicitly indicated after detection of a predetermined signal (e.g., a DL burst, a wideband (WB) DM-RS, a GC-PDCCH, and/or a PDCCH) and/ or based on information about a COT structure.

Opt 2: Explicit indication. For example, switching between groups is explicitly indicated based on a GC-PDCCH and/or a PDCCH.

For example, search space set(s) (e.g., CSS set) other than a part of configured groups may always be monitored by the UE, irrespective of a search space set indication.

For example, a single search space set may be a member of one or more (e.g., two or more) groups. That is, a single search space set may belong to only one group or two or more groups.

<Search Space Set Switching Method—Embodiment 2>

A description will be given of Embodiment 2 related to search space set switching according to a method of controlling a PDCCH monitoring periodicity and/or time instance interval according to various embodiments of the present disclosure.

For example, the UE may be provided with the group index of each configured search space set by a higher-layer parameter (e.g., searchSpaceGroupIdList-r16), for PDCCH monitoring in a serving cell indicated by a higher-layer parameter (e.g., searchSpaceSwitchingGroup-r16).

For example, when the UE is not provided with the higher-layer parameter for search space sets (e.g., searchSpaceGroupIdList-r16) and/or the higher-layer parameter (e.g., searchSpaceSwitchingGroup-r16) for PDCCH monitoring in a serving cell, operations according to various embodiments of the present disclosure as described below may not be applied to PDCCH monitoring in a search space set.

For example, the UE may be provided with a timer value by a higher-layer parameter (e.g., searchSpaceSwitching-Timer-r16). For example, the UE may decrement the timer value by one after each slot within an active DL BWP of a serving cell in which the UE monitors a PDCCH to detect DCI format 2_0.

For example, when the UE is provided with a higher-layer parameter (e.g., SearchSpaceSwitchTrigger-r16) indicating the position of a search space set switching field in DCI format 2_0 for a serving cell and detects DCI format 2_0 in a slot, the UE may operate as follows.

For example, if the UE does not monitor a PDCCH in search space set(s) with group index 0 and the value of the search space set field is 0, the UE may start PDCCH monitoring in the search space set(s) with group index 0 in the serving cell in the first slot after at least P1 symbols from the corresponding slot in the active DL BWP of the serving cell, and stop PDCCH monitoring in search space set(s) with group index 1.

For example, if the UE does not perform PDCCH monitoring in the search space set(s) with group index 1 and the value of the search space set field is 1, the UE may start PDCCH monitoring in the search space set(s) with group index 1 in the serving cell in the first slot after at least P1 symbols from the corresponding slot in the active DL BWP of the serving cell, stop PDCCH monitoring in search space set(s) with group index 0, and set the timer value to a value provided by a higher-layer parameter (e.g., searchSpaceSwitching-Timer-r16).

For example, if the UE performs PDCCH monitoring in the search space set(s) with group index 1, the UE may start PDCCH monitoring in the search space set(s) with group index 0 in the serving cell at the beginning of the first slot after at least P1 symbols from a slot in which the timer expires and/or the last slot of the remaining channel occupancy duration for the serving cell, indicated by DCI format 2_0, and stop PDCCH monitoring in search space set(s) with group index 1.

For example, if the UE is not provided with the higher-layer parameter (e.g., SearchSpaceSwitchTrigger-r16), the UE operates as follows.

For example, when the UE detects a DCI format by PDCCH monitoring in a search space set with group index 0 in a slot and when the UE detects a DCI format by PDCCH monitoring in any search space set, the UE may start PDCCH monitoring in the search space set(s) with group index 1 in the serving cell and stop PDCCH monitoring in search space set(s) with group index 0, in the first slot after at least P2 symbols from the corresponding slot in the active DL BWP of the serving cell.

For example, when the UE performs PDCCH monitoring in the search space set(s) with group index 1, and after a slot in which the timer expires and/or when the UE is provided with a search space set for PDCCH monitoring to detect DCI, the UE may start PDCCH monitoring in the search space set(s) with group index 0 and stop PDCCH monitoring in search space set(s) with group index 1, in the serving cell at the beginning of the first slot after at least P2 symbols from the last slot of the remaining channel occupancy duration for the serving cell, indicated by DCI format 2_0.

For example, the aspect of UE implementation may also be considered for P1/P2 as described before in [Method #2-1A] and/or [Method #2-1B]. For example, P1/P2 may be set to a larger value than a processing time of the UE for switching a PDCCH monitoring operation (e.g., search space set switching corresponding to starting PDCCH monitoring for a group with group index #0/1 and ending PDCCH monitoring for a group with group index #1/0.

3.2.2. Operation of Transmitter Side (Entity B)

3.2.2.1. [Method #2-1B] Method of Controlling PDCCH Monitoring Period and/or Time Instance Interval According to Length of First Slot in DL COT For example, when the first slot of a DL COT is too short, it may be very difficult to control a PDCCH monitoring periodicity and/or time instance interval immediately starting in the following slot (or after K slots), in terms of BS implementation.

In this regard, according to various embodiments of the present disclosure, for example, when the length of the first slot of a DL COT is equal to or less than or less than N symbols (e.g., N=3), the BS may transmit a PDCCH with a (PDCCH monitoring) periodicity applied to the outside of the DL COT in the slot to the next slot (immediately following the slot) (and/or the following K slots).

On the contrary, according to various embodiments of the present disclosure, for example, when the length of the first slot of the DL COT is equal to or larger than or larger than N symbols (e.g., N=3), the BS may transmit a PDCCH with the (PDCCH monitoring) periodicity applied to the outside of the DL COT only in the slot (and/or the slot to the (immediately) following K−1 slots). For example, the UE may perform PDCCH monitoring with a (PDCCH monitoring) periodicity applied to the inside of the DL COT, starting in the slot next to the corresponding slot (and/or the K following slots).

For example, when monitoring occasions of different periodicities are configured for multiple search space sets, the above-described various embodiments of the present disclosure may be applied to specific search space set(s).

For example, the above-described various embodiments of the present disclosure may be applied to all search space set(s) in which PDCCH monitoring occasions are configured at an interval less than a specific threshold (e.g., one slot) among multiple search space sets.

3.2.2.2. [Method #2-2B] Method of Controlling PDCCH Monitoring Periodicity and/or Time Instance Interval According to various embodiments of the present disclosure, a PDCCH monitoring periodicity and/or time instance interval may be controlled explicitly by UE-specific DCI and/or cell-specific DCI (e.g., explicit signaling). According to various embodiments of the present disclosure, a PDCCH monitoring periodicity and/or time instance interval may be controlled implicitly after detection of a predetermined signal (e.g., a DL burst, a DM-RS, a GC-PDCCH and/or a PDCCH) and/or based on information about a COT structure.

For example, multiple PDCCH monitoring intervals may be configured for a specific search space set, and which one of the PDCCH monitoring intervals is to be used may be signaled. For example, when the PDCCH monitoring interval is signaled by UE-specific DCI and/or cell-specific DCI, the UE-specific DCI and/or cell-specific DCI may include information about the PDCCH monitoring interval.

In another example, search space sets may be divided into two or more groups and a group including search space sets in which PDCCH monitoring will be performed may be signaled. For example, each of the groups may include one or more search space sets (one search space set may belong to two or more groups), and which one of the groups is used for PDCCH monitoring may be signaled to the UE. For example, when the group is signaled by UE-specific DCI and/or cell-specific DCI, the UE-specific DCI and/or cell-specific DCI may include information about the group. For example, it may be configured that a different PDCCH monitoring periodicity and/or time instance interval is applied to each group.

The methods of changing a PDCCH monitoring periodicity and/or time instance according to various embodiments of the present disclosure, such as [Method #2-1A], [Method #2-2A], [Method #2-1B], and [Method #2-2B], may be applied to both of self-carrier scheduling (SCS) and cross-carrier scheduling (CCS).

Figure 24:
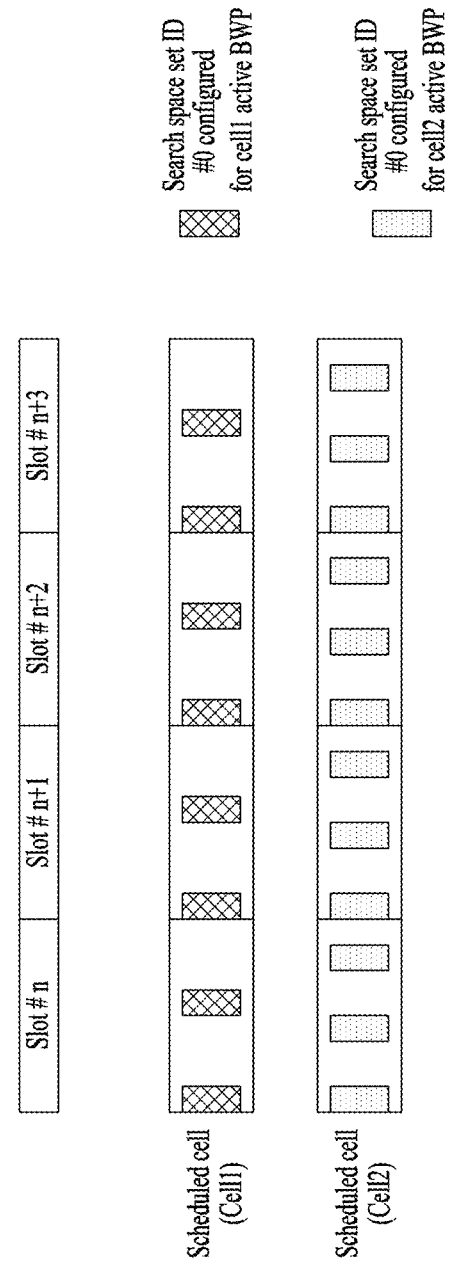
FIG. 24 is a diagram illustrating an exemplary physical downlink control signal (PDCCH) transmission and reception structure according to various embodiments of the present disclosure.
Figure 25:
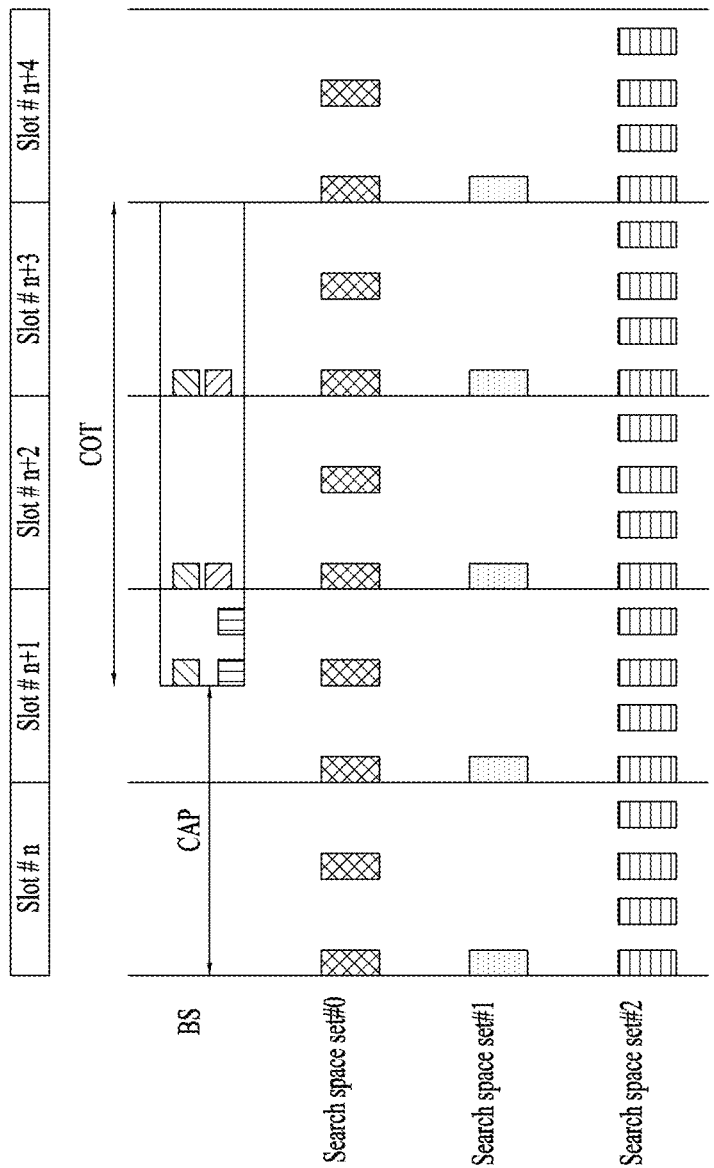
FIG. 25 is a diagram illustrating an exemplary PDCCH transmission and reception structure according to various embodiments of the present disclosure.
Figure 26:
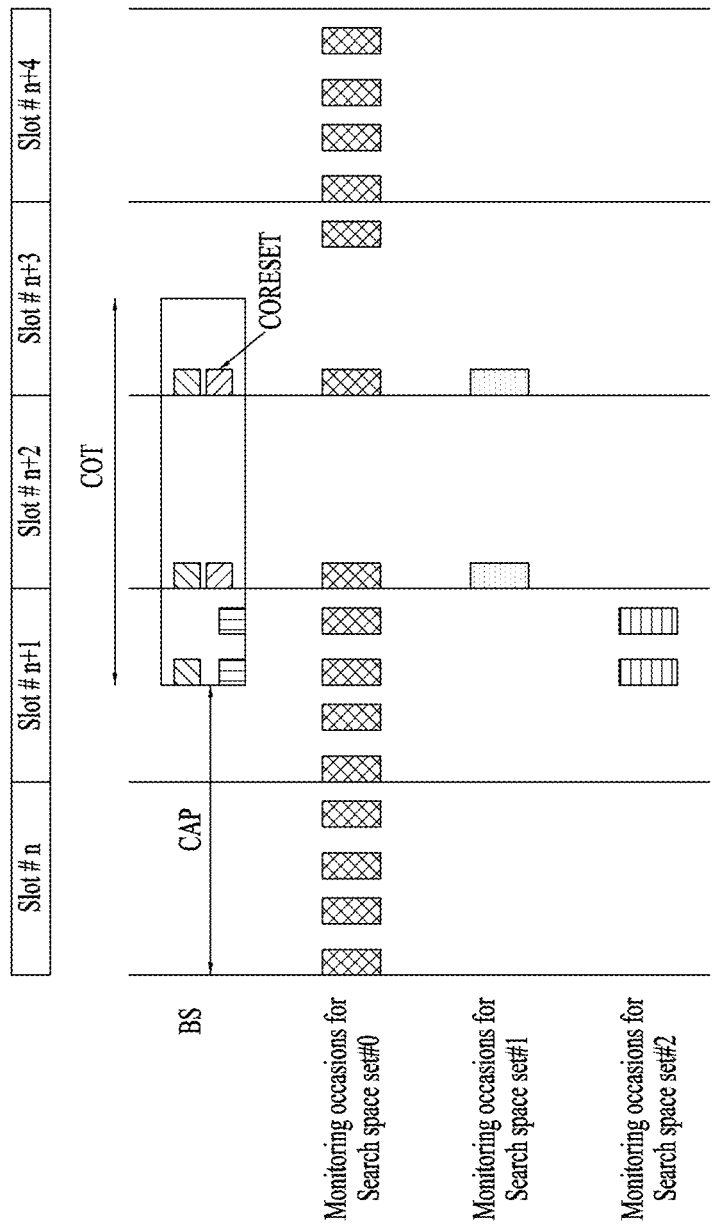
FIG. 26 is a diagram illustrating an exemplary PDCCH transmission and reception structure according to various embodiments of the present disclosure.

With reference to the examples of FIGS. 24, 25 and 26, various embodiments of the present disclosure may be described in greater detail.

FIGS. 24, 25 and 26 are diagrams illustrating PDCCH transmission and reception structures according to various embodiments of the present disclosure.

In the NR system, for example, a PDCCH monitoring occasion in a search space set configured for a scheduled cell (and/or an active BWP in a cell which may be replaced with a BWP and/or active BWP and/or channel and/or CAP subband (in the cell) in the description of this subclause and various embodiments of the present disclosure) is linked to a search space set configured for a scheduling cell with the same index as the search space set, and PDCCH monitoring is performed in the PDCCH monitoring occasion.

Referring to FIG. 24, for example, when a scheduling cell for cell 2 is configured as cell 1, a DCI format linked to search space set ID #0 of cell 2 may be monitored in a PDCCH monitoring occasion configured in search space set ID #0 of cell 1. In the description of this subclause and various embodiments of the present disclosure, the expression search space set ID #X may be understood as identical to search space set #X.

For example, cell 2 may be on an unlicensed spectrum or a shared spectrum.

For example, it is assumed that PDCCH monitoring at an interval of 2 symbols (type A) or 1 slot (type B) is configured in search space set ID #0 for cell 2.

Based on the assumption, for example, it may be configured that type B is applied before a COT is discovered (and/or in some starting slot(s) of the DL COT), and type A is applied inside the COT (and/or in slot(s) after the starting slot(s) of the DL COT).

Herein, for example, when cell 1 is configured as a scheduling cell for cell 2, it may be regulated that DCI monitoring linked to search space set ID #0 of cell 2 is performed twice per slot according to a configuration of search space set ID #0 of cell 1 before a COT is discovered in cell 2 (and/or in some starting slot(s) of the DL COT), and once per slot according to the configuration of search space set ID #0 of cell 2 inside the COT (and/or in slots after the starting slot(s) of the DL COT) (or more sparse PDCCH monitoring time instances between the configuration of search space set ID #0 of cell 1 and the configuration of search space set ID #0 of cell 2).

In another example, it is assumed that group B is set for search space set ID #0 configured for cell 2.

Based on the assumption, for example, it may be configured that only a search space set corresponding to group B is valid before a COT is discovered (and/or in some starting slot(s) of the DL COT), and only a search space set corresponding to group A is valid (i.e., search space sets corresponding to group B are invalid) inside the COT (and/or in slots after the starting slot(s) of the DL COT).

Herein, for example, DCI for cell 2 may be monitored in search space set ID #0 configured in cell 1 before a COT for cell 2 is discovered (and/or in some starting slot(s) of the DL COT), and DCI for cell 2 may not be monitored in search space set ID #0 configured in cell 1 inside the COT (and/or in slot(s) after the starting slot(s) of the DL COT).

Embodiment 1

Referring to FIG. 25, for example, PDCCH monitoring occasions may be configured in search space set #0/1/2 as illustrated in FIG. 25. For example, search space set #1 may be set to group A, and search space set #2 may be set to group B.

For example, it is assumed that a CORESET and/or a PDCCH DM-RS linked to search space set #0 is defined/configured as an initial signal and/or a signal from which transmission of a serving cell is recognized (by the UE).

Based on the assumption, for example, the UE may perform PDCCH monitoring twice per slot according to a configuration of search space set #0.

For example, when the UE discovers a PDCCH and/or a PDCCH DM-RS in search space set #0 in slot #n+1 and acquires information indicating that slots of up to slot #n+3 are DL slots from the PDCCH and/or another PDCCH, the UE may perform PDCCH monitoring (in the earliest time duration among PDCCH monitoring occasions allocated to a slot) once per slot from slot #n+2, when performing PDCCH monitoring for search space set #0.

For example, the UE, which recognizes that the middle of slot #n+1 to slot #n+3 are DL slots, may perform PDCCH monitoring in PDCCH monitoring occasions configured in search space set #2 during the first DL slot (i.e., slot #n+1), and in PDCCH monitoring occasions configured in search space set #1 during the following DL slots (i.e., slot #n+2/3).

For example, when the UE discovers a PDCCH and/or a PDCCH DM-RS in search space set #0 in slot #n+1 and acquires information indicating that slots of up to slot #n+3 are DL slots from the PDCCH and/or another PDCCH, the UE may not perform configured PDCCH monitoring in search space set #0 in slot #n+1 before the discovery of the PDCCH and/or the PDCCH DM-RS and/or in search space set #1 and/or search space set #2 after slot #n+3.

Embodiment 2

According to various embodiments of the present disclosure, when the UE performs PDCCH monitoring, a different PDCCH monitoring time pattern may be configured for each phase as follows.

Phase A: A period after phase C when a DL burst is not discovered (e.g., in a method according to various embodiments of the present disclosure) and/or after the DL burst is discovered.

Phase B: In the case where a DL burst is discovered (e.g., in a method according to various embodiments of the present disclosure), a PDCCH monitoring occasion is included in the starting k slot(s) of the DL burst. Herein, k may be preset to a specific value (e.g., k=1) or configured by higher-layer signaling such as RRC/MAC signaling.

Phase C: In the case a DL burst is discovered (e.g., in a method according to various embodiments of the present disclosure), a PDCCH monitoring occasion is not included in the starting k slot(s) of the DL burst. Herein, k may be preset to a specific value (e.g., k=1) or configured by higher-layer signaling such as RRC/MAC signaling.

For example, switching between phases may be signalled by at least one of the following options.

Opt 1: Explicitly signalled by specific DCI

Opt 2: Implicitly signalled by information indicating time-axis channel occupancy of the BS in DCI For example, in Opt 1, the BS may indicate to the UE whether a slot carrying DCI (and/or the following n slot(s)) belongs to phase B/phase C by using a specific field (e.g., a new field indicating a phase) in the DCI and/or at least some state of an existing field in the DCI.

For example, in Opt 2, when the UE recognizes the corresponding slot as a duration belonging to phase B from the DCI indicating time-axis channel occupancy of the BS, the UE may perform PDCCH monitoring corresponding to phase B in the slot. For example, in Opt 2, when the UE recognizes the corresponding slot as a period belonging to phase C from the DCI indicating time-axis channel occupancy of the BS, the UE may perform PDCCH monitoring corresponding to phase C in the slot.

In an exemplary embodiment, considering that the UE triggers a new PDCCH monitoring behaviour in each switching between phases, a time delay caused by a processing time of the UE may be considered.

For example, it is assumed that a time delay of X symbol(s) is taken for switching from phase A to phase B.

Based on the assumption, for example, it may be regulated that when the UE recognizes that phase B starts from symbol #Y, a PDCCH monitoring behaviour corresponding to phase B is actually applied, starting from symbol #(X+Y).

For example, X may be a UE capability value. For example, X may be set to a different value according to a UE capability.

For example, the UE may report a UE capability value (e.g., information about the UE's capability) to the BS, and the BS may configure an X value for the UE based on the reported capability value by higher-layer signalling such as RRC signalling.

For example, a per-phase monitoring time pattern may be defined for each search space (and/or CORESET and/or DCI format and/or RNTI).

For example, the monitoring time pattern may include all or a part of at least the following parameters.

monitoringSlotPeriodicityAndOffset: This parameter may be related to information about PDCCH monitoring slot(s) configured by a periodicity and an offset. For example, if the value of the parameter is s11, the UE may monitor a search space in each slot. For example, if the value of the parameter is s14, the UE may monitor a search space in every fourth slot.

monitoringSymbolsWithinSlot: This parameter may be related to information about the first symbol(s) for PDCCH monitoring in slot(s) configured for PDCCH monitoring. For example, if the value of the parameter is 1000000000000, the UE may start searching in the first symbol of a slot. For example, if the value of the parameter is 0100000000000, the UE may start searching in the second symbol of the slot.

In another example, a different number of per-AL PDCCH blind decoding (BD) candidates and/or a different search space type and/or a different DCI format may be configured for each search space.

Referring to FIG. 26, a time pattern configuration for each search space set may be given as follows.

Search space set #0
  Phase A/B: PDCCH monitoring in each slot, and a CORESET duration starts in symbol #0/4/7/11
  Phase C: PDCCH monitoring in each slot, and a CORESET duration starts in symbol #0
Search space set #1
  Phase A/B: Monitoring off. That is, monitoring may not be performed.
  Phase C: PDCCH monitoring in each slot, and a CORESET duration starts in symbol #0
Search space set #2
  Phase A/B: Monitoring off. That is, monitoring may not be performed.
  Phase C: PDCCH monitoring in each slot, and a CORESET duration starts in symbol #0/4/7/11

3.3. Cross-Carrier Scheduling (CCS) Method

Figure 28:
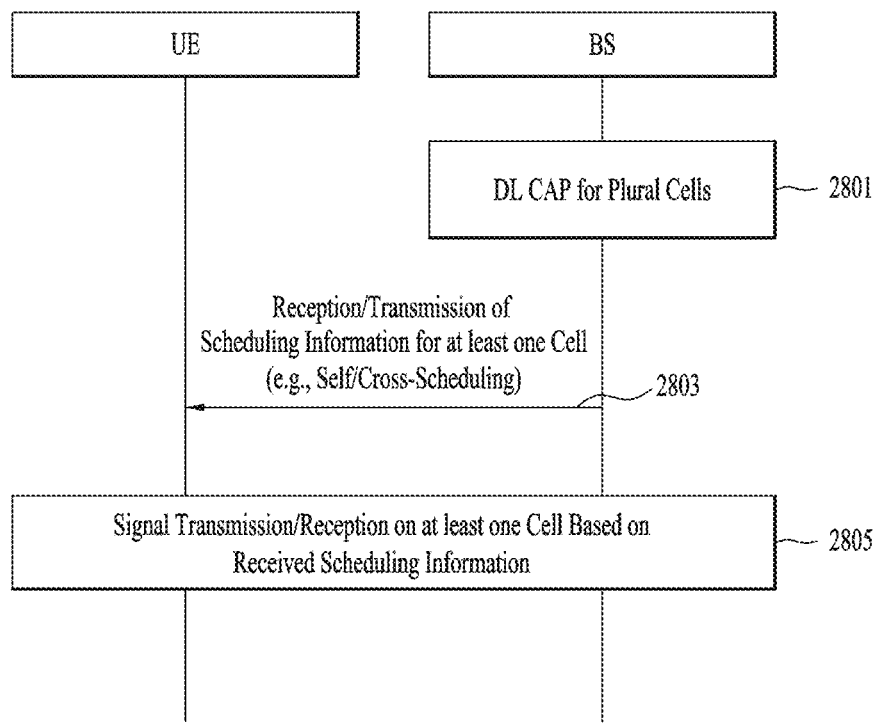
FIG. 28 is a diagram illustrating a signal flow for an exemplary scheduling method according to various embodiments of the present disclosure.

FIG. 28 is a diagram illustrating an exemplary scheduling method according to various embodiments of the present disclosure.

Referring to FIG. 28, in operation 2801 according to an exemplary embodiment, a BS may perform a DL CAP for a plurality of cells (e.g., cells included in a specific cell group) to transmit scheduling information to a UE. For example, the DL CAP for the plurality of cells may be one or more of the afore-described various DL CAPs for DL transmission.

In operation 2803 according to an exemplary embodiment, the BS may transmit scheduling information for one or more cells to the UE according to the result of the DL CAP.

For example, when the BS succeeds in the DL CAP only for some cell(s) of the plurality of cells, the BS may transmit scheduling information for one or more of the plurality of cells (i.e., one or more cells among the plurality of cells) on one or more of the some cell(s) (i.e., on one or more cells among the some cell(s)). For example, in case 1 which will be described later, the BS may transmit scheduling information for a corresponding cell (and/or one or more of cells in which the DL CAP is failed) on a specific cell (in which the DL CAP is successful).

In another example, when the BS succeeds in the DL CAP for all of the plurality of cells, the BS may transmit scheduling information for one or more of the plurality of cells to the UE on the one or more of the plurality of cells. For example, as in case 2 which will be described later, the BS may transmit scheduling information for each cell on the cell to the UE (SCS) or scheduling information for a corresponding cell (and one or more other cells than the corresponding cell) on a specific one of the plurality of cells.

In operation 2805 according to an exemplary embodiment, the UE may perform a signal transmission/reception scheduled for one or more cells based on scheduling information (e.g., DCI) for the one or more cells, received from the BS. For example, when the UE is to transmit a specific signal on a specific cell (and/or a plurality of cells including the specific cell) to the BS, the UE may transmit the signal to the BS based on the result of a UL CAP for the specific cell (and/or the plurality of cells including the specific cell). For example, the UL CAP for the specific cell (and/or the plurality of cells including the specific cell) may be one or more of the afore-described UL CAPs for UL transmission.

Now, a description will be given of a specific operation of a UE and/or a BS in a scheduling method according to various embodiments of the present disclosure.

In the LTE and NR systems, for example, CCS may be configured, in which a scheduling cell and a scheduled cell are different. The motivation of introducing CCS is that the probability of succeeding in DCI reception may be higher on a scheduling cell than on a scheduled cell.

In addition, for example, since a scheduling cell in which the BS will succeed in a CAP may not be predicted, a plurality of scheduling cells may be configured for a single scheduled cell in the NR system using an unlicensed band.

Hereinbelow, various embodiments of the present disclosure may be related to a CCS method for increasing the CAP success probability of a scheduling cell. In this subclause and various embodiments of the present disclosure, a cell may be replaced with a BWP and/or an active BWP and/or a channel and/or a CAP (LBT) subband (in the cell).

3.3.1. Operation of Receiver Side (Entity A)
3.3.1.1. [Method #3-1A] any-to-any CCS Method According to various embodiments of the present disclosure, a specific cell group may be defined and any of the cells of the cell group is allowed to be scheduled.

For example, it is assumed that cell #1 and cell #2 are grouped into the above-described (CCS) cell group.

Based on the assumption, for example:
  Case 1: When a CAP (LBT) is successful only in one of the two cells, the cell may schedule one and/or both of the cells. For example, when the CAP is successful in cell #1, cell #1 may schedule both cell #1 and cell #2 or only one of cell #1 and cell #2.
  Case 2: When the CAP (LBT) is successful in both cells, each cell may schedule itself or a specific one of the two cells may schedule both of the cells and/or a specific one of the cells. For example, when the CAP is successful in both of cell #1 and cell #2, cell #1 and/or cell #2 may schedule itself (SCS), or cell #1 may schedule both or one of cell #1 and cell #2.

In another example, it is assumed that cell #1, cell #2 and cell #3 are grouped into a cell group.

Based on the assumption, for example:
  Case 1: When a CAP (LBT) is successful only in one of the three cells, the cell may schedule one or more and/or all of the cells. For example, when the CAP is successful only in cell #1, cell #1 may schedule all of cell #1, cell #2, and cell #3 or one or more of cell #1, cell #2, and cell #3.

Case 2: When the CAP (LBT) is successful in all of the three cells, each cell may schedule itself or a specific one of the three cells may schedule two cells and/or specific one or more of the cells. For example, when the CAP is successful in all of cell #1, cell #2, and cell #3, cell #1 and/or cell #2 and/or cell #3 may schedule itself (SCS), or cell #1 may schedule all of cell #1, cell #2, and cell #3 or one or more of cell #1, cell #2, and cell #3.

In an exemplary embodiment, the same CORESET configuration and/or the same search space set configuration may be set for the cells of a cell group.

For example, (an index is assigned to each cell of the cell group), a CORESET configuration and/or a search space set configuration set for the cell with the lowest index (or the highest index) may be applied to all cells of the group.

In an exemplary embodiment, to match a DCI size for CCS to a DCI size for SCS, a CIF may also be present in DCI in the case of SCS (like CCS).

For example, it is assumed that five cells belong to a cell group and unique cell indexes are assigned to the cells. Based on the assumption, for example, a 3-bit CIF may always exist in DCI irrespective of which cell of the cell group is scheduled. For example, the cell group may be applied only for UL scheduling. For example, while DL scheduling DCI may configure SCS and/or CCS, UL grant DCI may always support CCS.

The above-described various embodiments of the present disclosure may be applied in the same manner to a DCI format (referred to as DCI format 3, for the convenience of description) carrying COT information (e.g., time-axis and/or frequency-axis information about a corresponding COT) as well as scheduling DCI.

For example, a cell group sharing COT information may be defined. For example, COT information about all carriers (cells) of the group may be delivered in DCI format 3 transmitted on any cell (or a specific predefined cell) of the cell group.

For example, DCI format 3 may be transmitted on a GC-PDCCH. That is, DCI format 3 may include group-common information.

For example, one DCI format 3 may deliver COT information about a plurality of UEs and/or cells. In this case, for example, a cell carrying the COT information may be pre-signaled in some field for each UE.

In another example, it may be regulated that COT information corresponding to a specific field of DCI format 3 corresponds to information about a cell spaced from a common reference point by a specific offset on the frequency axis.

For example, COT information corresponding to a cell starting at an offset of 10 RBs from the common reference point may be set in field A, and COT information corresponding to a cell starting at an offset of {10 RBs+20 MHz} from the common reference point may be set in field B. For example, each UE may acquire COT information in a corresponding field based on frequency-axis resources of each cell configured for the UE.

In the above-described various embodiments of the present disclosure, a cell may be replaced with a BWP and/or an active BWP and/or a cell and/or a CAP (LBT) subband. For example, the CAP subband is a basic unit for a CAP, which may have a size of, for example, 20 MHz.

The above-described various embodiments of the present disclosure may be applied irrespective of whether CCS is configured for a specific unlicensed-band cell. For example, UL grant DCI may always support CCS. For example, whether DL scheduling DCI is SCS and/or CCS may be configured by RRC signaling or the like.

3.3.1.2. [Method #3-2A] Configuration of PDCCH Monitoring Occasion for DCI Format Carrying COT Information Referring to FIG. 24 again, for example, in the NR system, a PDCCH monitoring occasion for a search space set configured for a scheduled cell (and/or an active BWP in the cell, which may be replaced with a BWP and/or an active BWP and/or a cell and/or a CAP (LBT) subband in this subclause and various embodiments of the present disclosure) may be linked to a search space set for a scheduling cell with the same index as the search space cell of the scheduled cell, and PDCCH monitoring is performed in the PDCCH monitoring occasion.

However, a search space set associated with a DCI format (referred to as DCI format 3, for the convenience) carrying COT information (e.g., time-axis and/or frequency-axis information about a corresponding COT) may need separate handling. For example, because the UE may determine whether a DL Tx burst starts in an unlicensed band based on the corresponding DCI format 3, it may be favorable to separately handle the corresponding DCI format 3.

For example, for a search space set associated with DCI format, CI format 3 may be monitored in a PDCCH monitoring occasion configured in a (still) scheduled cell, not a scheduling cell.

For example, when multiple DCI formats including DCI format 3 are linked to a corresponding search space set, at least one of the following options may be performed.

Opt 1: It is regulated that monitoring for all DCI formats linked to the search space set is based on a configuration on the scheduled cell, or Opt 2: It is regulated that monitoring of DCI format 3 among the DCI formats linked to the search space set is based on a configuration on the scheduled cell and the other DCI format(s) is monitored based on a configuration on the scheduling cell.

3.3.1.3. [Method #3-3A] Scheduling Restriction for CCS Configuration

For example, if the BS is to transmit a signal on a scheduled cell after transmitting DCI (a scheduling DL signal/channel) on a scheduling cell and fails in a CAP for the scheduled cell, the UE which has received the transmitted DCI may unnecessarily attempt to receive a DL signal/channel. According to various embodiments of the present disclosure, at least one of the following options may be performed to prevent this unnecessary UE operation.

Opt 1: The UE may not receive DCI scheduling a scheduled cell or may not expect the DCI before a PDCCH monitoring occasion in a search space set configured in the scheduling cell starting (or ending) earlier than a DL COT starting time on the scheduled cell.

Opt 2: The UE may not receive, on a scheduling cell, DCI scheduling a DL signal/channel starting (or ending) earlier than a DL COT starting time on a scheduled cell, or may not expect to receive the DCI on the scheduling cell.

3.3.2. Operation of Transmitter Side (Entity B)

3.3.2.1. [Method #3-1B] any-to-any CCS Method

According to various embodiments of the present disclosure, a specific cell group may be defined and any of the cells of the cell group is allowed to be scheduled.

For example, it is assumed that cell #1 and cell #2 are grouped into the above-described (CCS) cell group.

Based on the assumption, for example:

Case 1: When a CAP (LBT) is successful only in one of the two cells, the cell may schedule one and/or both of the cells. For example, when the CAP is successful only in cell #1, cell #1 may schedule both cell #1 and cell #2 or only one of cell #1 and cell #2.

Case 2: When the CAP (LBT) is successful in both cells, each cell may schedule itself or a specific one of the two cells may schedule both of the cells and/or a specific one of the cells. For example, when the CAP is successful in both of cell #1 and cell #2, cell #1 and/or cell #2 may schedule itself (SCS), or cell #1 may schedule both or one of cell #1 and cell #2.

In another example, it is assumed that cell #1, cell #2 and cell #3 are grouped into a cell group.

On the assumption, for example:

Case 1: When a CAP (LBT) is successful only in one of the three cells, the cell may schedule one or more and/or all of the cells. For example, when the CAP is successful only in cell #1, cell #1 may schedule all of cell #1, cell #2, and cell #3 or one or more of cell #1, cell #2, and cell #3.

Case 2: When the CAP (LBT) is successful in all of the three cells, each cell may schedule itself or a specific one of the three cells may schedule two cells and/or specific one or more of the cells. For example, when the CAP is successful in all of cell #1, cell #2, and cell #3, cell #1 and/or cell #2 and/or cell #3 may schedule itself (SCS), or cell #1 may schedule all of cell #1, cell #2, and cell #3 or one or more of cell #1, cell #2, and cell #3.

In an exemplary embodiment, the same CORESET configuration and/or the same search space set configuration may be set for the cells of a cell group.

For example, (an index is assigned to each cell of the cell group), a CORESET configuration and/or a search space set configuration set for the cell with the lowest index (or the highest index) may be applied to all cells of the group.

In an exemplary embodiment, to match a DCI size for CCS to a DCI size for SCS, a CIF may also be present in DCI in the case of SCS (like CCS).

For example, it is assumed that five cells belong to a cell group and unique cell indexes are assigned to the respective cells. Based on the assumption, for example, a 3-bit CIF may always exist in DCI irrespective of which cell of the cell group is scheduled. For example, the cell group may be applied only for UL scheduling. For example, while DL scheduling DCI may configure SCS and/or CCS, UL grant DCI may always support CCS.

The above-described various embodiments of the present disclosure may be applied in the same manner to a DCI format (referred to as DCI format 3, for the convenience of description) carrying COT information (e.g., time-axis and/or frequency-axis information about a corresponding COT) as well as scheduling DCI.

For example, a cell group sharing COT information may be defined. For example, COT information about all carriers (cells) of the group may be delivered in DCI format 3 transmitted on any cell (or a specific predefined cell) of the cell group.

For example, DCI format 3 may be transmitted on a GC-PDCCH. That is, DCI format 3 may include group-common information.

For example, one DCI format 3 may deliver COT information about a plurality of UEs and/or cells. In this case, for example, which field carries COT information about which cell may be pre-signaled for each UE.

In another example, it may be regulated that COT information corresponding to a specific field of DCI format 3 corresponds to information about a cell spaced from a common reference point by a specific offset on the frequency axis.

For example, COT information corresponding to a cell starting at an offset of 10 RBs from the common reference point may be set in field A, and COT information corresponding to a cell starting at an offset of {10 RBs+20 MHz} from the common reference point may be set in field B. For example, each UE may acquire COT information in a corresponding field based on frequency-axis resources of the cell configured for the UE.

In the above-described various embodiments of the present disclosure, a cell may be replaced with a BWP and/or an active BWP and/or a cell and/or a CAP (LBT) subband. For example, the CAP subband is a basic unit for a CAP, which may have a size of, for example, 20 MHz.

The above-described various embodiments of the present disclosure may be applied irrespective of whether CCS is configured for a specific unlicensed-band cell. For example, UL grant DCI may always support CCS. For example, whether DL scheduling DCI is SCS and/or CCS may be configured by RRC signaling or the like.

3.3.2.2. [Method #3-2B] Configuration of PDCCH Monitoring Occasion for DCI Format Carrying COT Information Referring to FIG. 24 again, for example, in the NR system, a PDCCH monitoring occasion for a search space set configured for a scheduled cell (and/or an active BWP in the cell, which may be replaced with a BWP and/or an active BWP and/or a cell and/or a CAP (LBT) subband (in the cell) in this subclause and various embodiments of the present disclosure) may be linked to a search space set for a scheduling cell, with the same index as the search space set of the scheduled cell, and PDCCH monitoring is performed in the PDCCH monitoring occasion.

However, a search space set associated with DCI format (referred to as DCI format 3, for the convenience) carrying COT information (e.g., time-axis and/or frequency-axis information about a corresponding COT) may need separate handling. For example, because the UE may determine whether a DL Tx burst starts in an unlicensed band based on the corresponding DCI format 3, it may be favorable to separately handle the corresponding DCI format 3.

For example, for a search space set associated with DCI format 3, DCI format 3 may be monitored in a PDCCH monitoring occasion configured in a (still) scheduled cell, not a scheduling cell.

For example, when multiple DCI formats including DCI format 3 are linked to a corresponding search space set, at least one of the following options may be performed.

Opt 1: It is regulated that monitoring for all DCI formats linked to the search space set is based on a configuration on a scheduled cell, or Opt 2: It is regulated that monitoring of DCI format 3 among the DCI formats linked to the search space set is based on a configuration on the scheduled cell and the other DCI format(s) are monitored based on a configuration on a scheduling cell.

3.3.2.3. [Method #3-3B] Scheduling Restriction when CCS is Configured

For example, if the BS is to transmit a signal on a scheduled cell after transmitting DCI (a scheduling DL signal/channel) on a scheduling cell and fails in a CAP for the scheduled cell, unnecessary resources may be consumed for the DCI transmission. According to various embodiments of the present disclosure, at least one of the following options may be performed to prevent this unnecessary resource waste.

Opt 1: The BS may not transmit DCI that schedules a scheduled cell before a PDCCH monitoring occasion in a search space set configured in the scheduling cell starting (or ending) earlier than a DL COT starting time on the scheduled cell.

Opt 2: The BS may not transmit, (on a scheduling cell), DCI that schedules a DL signal/channel starting (or ending) earlier than a DL COT starting time on a scheduled cell.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB, or is requested to a receiving UE or a transmitting UE by the transmitting UE or the receiving UE.

3.4. Initial Network Access and Communication Process

According to various embodiments of the present disclosure, a UE may perform a network access process to perform the above-described/proposed procedures and/or methods. For example, the UE may receive system information and configuration information required to perform the above-described/proposed procedures and/or methods and store the received information in a memory. The configuration information required for various embodiments of the present disclosure may be received by higher-layer signaling (e.g., RRC signaling or MAC signaling).

Figure 29:
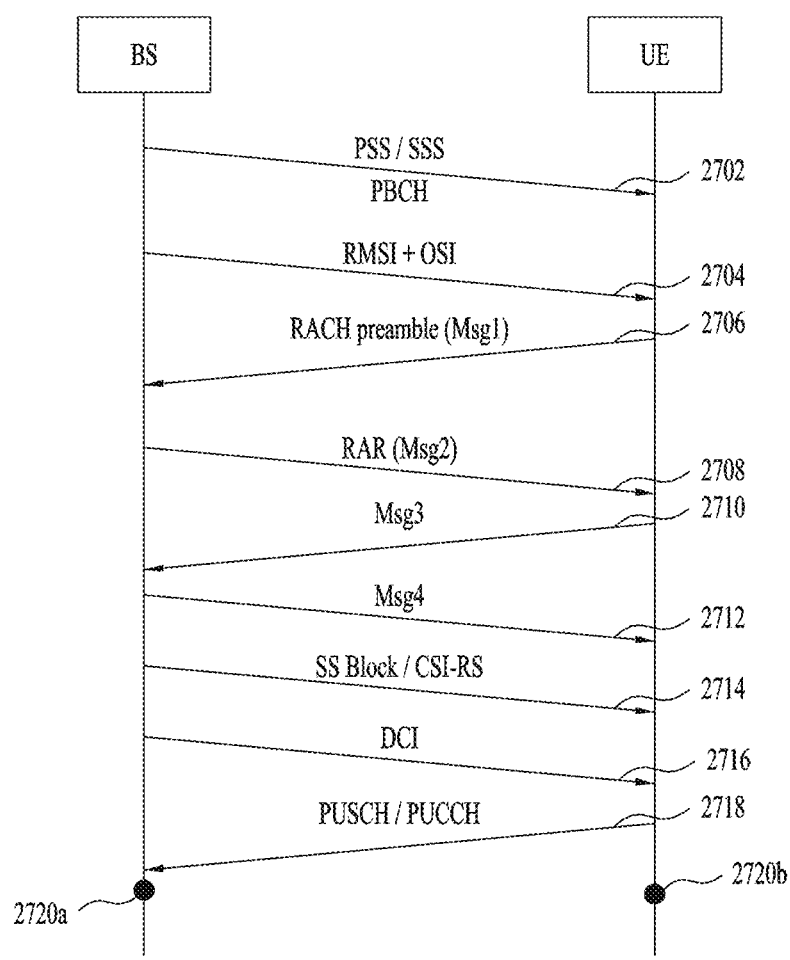
FIG. 29 is a simplified diagram illustrating an initial network access and subsequent communication procedure according to various embodiments of the present disclosure.

FIG. 29 is a diagram illustrating an initial network access and subsequent communication process. In an NR system to which various embodiments of the present disclosure are applicable, a physical channel and an RS may be transmitted by beamforming. When beamforming-based signal transmission is supported, beam management may be performed for beam alignment between a BS and a UE. Further, a signal proposed in various embodiments of the present disclosure may be transmitted/received by beamforming. In RRC_IDLE mode, beam alignment may be performed based on a synchronization signal block (SSB or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 29, a BS (e.g., eNB) may periodically transmit an SSB (S2702). The SSB includes a PSS/SSS/PBCH. The SSB may be transmitted by beam sweeping. The BS may then transmit remaining minimum system information (RMSI) and other system information (OSI) (S2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (S2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (S2708), the UE may transmit Msg3 (e.g., RRC Connection Request) based on a UL grant included in the RAR (S2710), and the BS may transmit a contention resolution message (Msg4) (S2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S2714). The SSB/CSI-RS may be used for the UE to generate a beam/CSI report. The BS may request the UE to transmit a beam/CSI report, by DCI (S2716). In this case, the UE may generate a beam/CSI report based on the SSB/CSI-RS and transmit the generated beam/CSI report to the BS on a PUSCH/PUCCH (S2718). The beam/CSI report may include a beam measurement result, information about a preferred beam, and so on. The BS and the UE may switch beams based on the beam/CSI report (S2720a and S2720b).

Subsequently, the UE and the BS may perform the above-described/proposed procedures and/or methods. For example, the UE and the BS may transmit a wireless signal by processing information stored in a memory or may process received wireless signal and store the processed signal in the memory according to various embodiments of the present disclosure, based on configuration information obtained in the network access process (e.g., the system information acquisition process, the RRC connection process through an RACH, and so on). The wireless signal may include at least one of a PDCCH, a PDSCH, or an RS on DL and at least one of a PUCCH, a PUSCH, or an SRS on UL.

3.5. DRX (Discontinuous Reception)

FIG. 30 is an exemplary DRX operation according to various embodiments of the present disclosure.

According to various embodiments of the present disclosure, the UE may perform a DRX operation in the afore-described/proposed procedures and/or methods. When the UE is configured with DRX, the UE may reduce power consumption by receiving a DL signal discontinuously. DRX may be performed in an RRC_IDLE state, an RRC_INACTIVE state, and an RRC_CONNECTED state. In the RRC_IDLE state and the RRC_INACTIVE state, DRX is used to receive a paging signal discontinuously.

3.5.1. RRC_CONNECTED DRX

In in the RRC_CONNECTED state, DRX is used to receive a PDCCH discontinuously. DRX in the RRC_CONNECTED state is referred to as RRC_CONNECTED DRX).

Referring to FIG. 30(a), a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 19 describes a DRX operation of a UE (in the RRC_CONNECTED state). Referring to Table 19, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to various embodiments of the present disclosure.

TABLE 19

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.
  Value of drx-OnDurationTimer: defines the duration of the starting period of the DRX cycle.
  Value of drx-InactivityTimer: defines the duration of a time period during which the UE is awake after a PDCCH occasion in which a PDCCH indicating initial UL or DL data has been detected.
  Value of drx-HARQ-RTT-TimerDL: defines the duration of a maximum time period until a DL retransmission is received after reception of a DL initial transmission.
  Value of drx-HARQ-RTT-TimerDL: defines the duration of a maximum time period until a grant for a UL retransmission is received after reception of a grant for a UL initial transmission.
  drx-LongCycleStartOffset: defines the duration and starting time of a DRX cycle.
  drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

3.5.2. RRC_IDLE DRX

In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX.

Therefore, when DRX is configured, PDCCH monitoring/reception may be performed discontinuously in the time domain in the afore-described/proposed procedures and/or methods.

Referring to FIG. 30(b), DRX may be configured for discontinuous reception of a paging signal. The UE may receive DRX configuration information from the BS by higher-layer (e.g., RRC) signaling. The DRX configuration information may include a DRX cycle, a DRX offset, configuration information for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

Those skilled in the art will understand clearly that above-described initial access process and/or DRX operation may be combined with the contents of clause 1 to clause 3 described before to constitute other various embodiments of the present disclosure.

Figure 31:
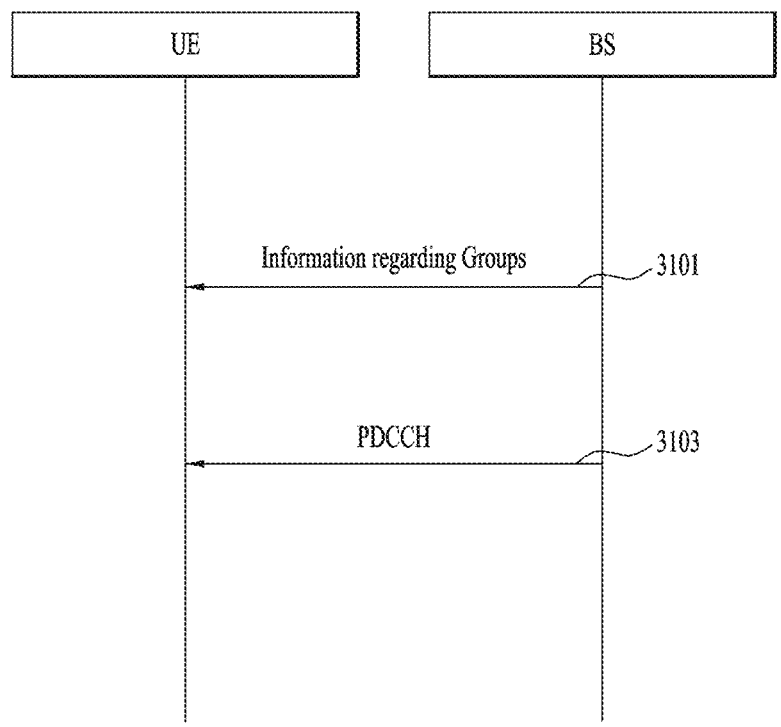
FIG. 31 is a simplified diagram illustrating a signal flow for an exemplary method of operating a user equipment (UE) and a base station (BS) according to various embodiments of the present disclosure.

FIG. 31 is a simplified diagram illustrating a signal flow for a method of operating a UE and a BS according to various embodiments of the present disclosure.

Figure 32:
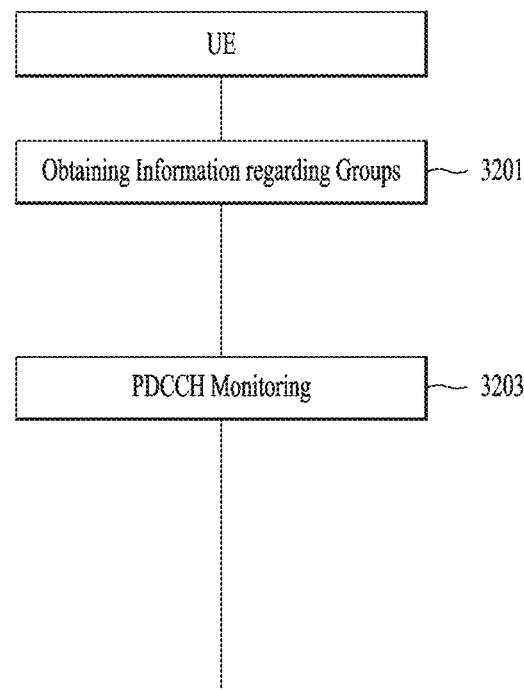
FIG. 32 is a flowchart illustrating a method of operating a UE according to various embodiments of the present disclosure.

FIG. 32 is a flowchart illustrating a method of operating a UE according to various embodiments of the present disclosure.

Figure 33:
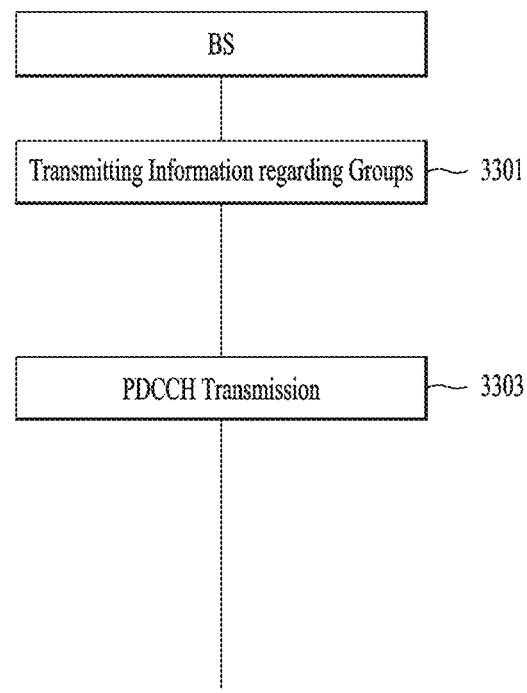
FIG. 33 is a flowchart illustrating a method of operating a BS according to various embodiments of the present disclosure.

FIG. 33 is a flowchart illustrating a method of operating a BS according to various embodiments of the present disclosure.

Referring to FIGS. 31 to 33, the BS may transmit information about groups of one or more search space sets related to PDCCH monitoring, and the UE may obtain the information about the groups in operations 3101, 3201, and 3301 according to an exemplary embodiment. For example, the groups may include a first group and a second group.

The UE may perform PDCCH monitoring based on the information about the groups, and the BS may transmit a PDCCH related to the information about the groups in operations 3103, 3203, and 3303 according to an exemplary embodiment.

A more specific operation of a BS and/or a UE according to various embodiments of the present disclosure may be described and performed based on the afore-described clause 1 to clause 3.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments of the Present Disclosure

4.1. Exemplary Configurations of Devices to which Various Embodiments of the Present Disclosure are Applied FIG. 34 is a diagram illustrating devices that implement various embodiments of the present disclosure.

Figure 34:
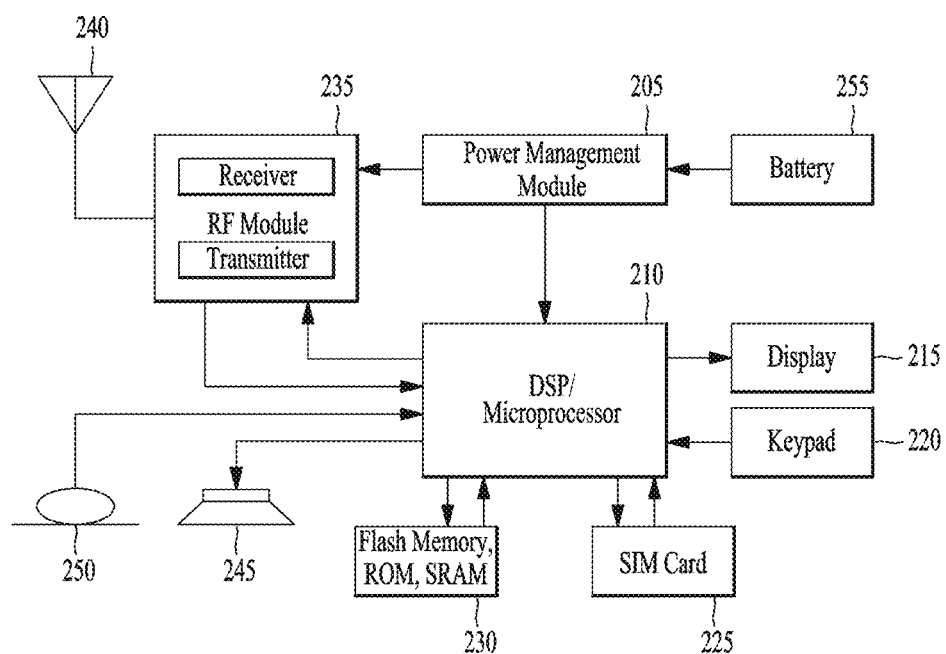
FIG. 34 is a block diagram illustrating an apparatus for implementing various embodiments of the present disclosure.

The devices illustrated in FIG. 34 may be a UE and/or a BS (e.g., eNB or gNB) adapted to perform the afore-described mechanisms, or any devices performing the same operation.

Referring to FIG. 34, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 34 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 34 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, at least one processor included in a UE (or at least one processor of a communication device in the UE) may acquire information about groups for one or more search space sets related to physical downlink control channel (PDCCH) monitoring. According to various embodiments of the present disclosure, the at least one processor included in the UE may perform the PDCCH monitoring according to a search space set related to a second group among the groups, based on the information about the groups. For example, after one or more of predetermined conditions are satisfied: (i) after a first predetermined time, PDCCH monitoring may start according to a search space set related to a first group different from the second group among the groups, and (ii) the PDCCH monitoring may end according to the search space set related to the second group.

According to various embodiments of the present disclosure, at least one processor included in a BS (or at least one processor of a communication device in the BS) may transmit information about groups for one or more search space sets related to PDCCH monitoring. According to various embodiments of the present disclosure, the at least one processor included in the BS may transmit a PDCCH according to a search space set related to a second group among the groups. According to various embodiments of the present disclosure, after one or more of predetermined conditions are satisfied: (i) after a first predetermined time, PDCCH transmission may start according to a search space set related to a first group different from the second group among the groups, and (ii) the PDCCH transmission may end according to the search space set related to the second group.

A more specific operation of a processor included in a BS and/or a UE according to various embodiments of the present disclosure may be described and performed based on the afore-described clause 1 to clause 3.

Unless contradicting with each other, various embodiments of the present disclosure may be implemented in combination. For example, the BS and/or the UE according to various embodiments of the present disclosure may perform operations in combination of the embodiments of the afore-described clause 1 to clause 3, unless contradicting with each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 35:
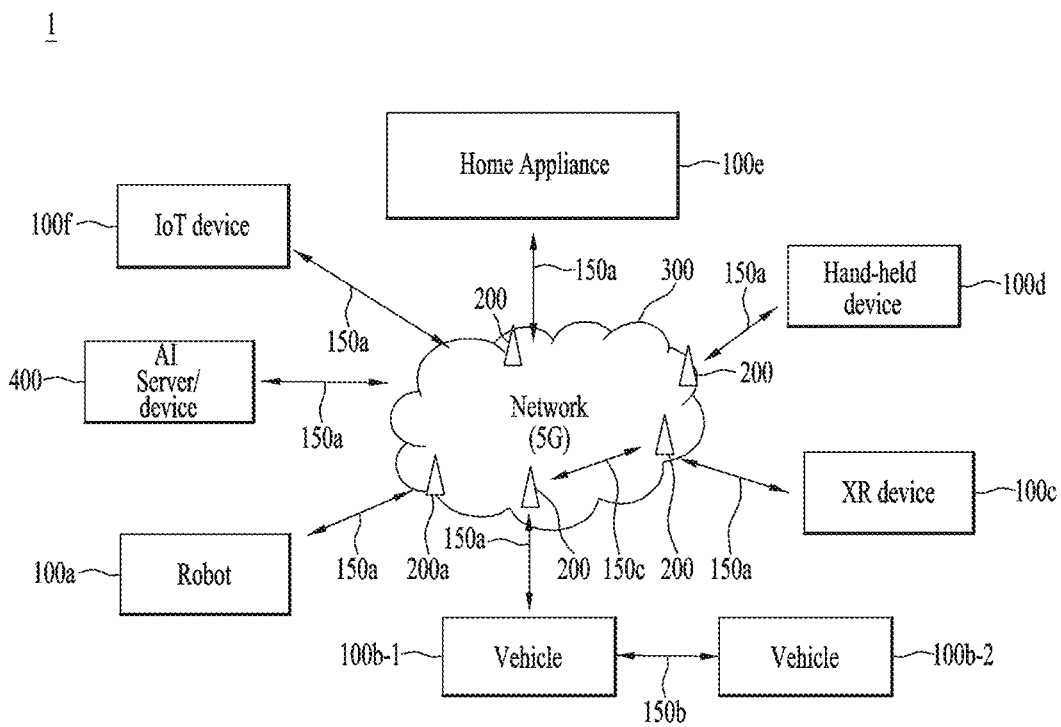
FIG. 35 is a diagram illustrating a communication system to which various embodiments of the present disclosure are applicable.

FIG. 35 illustrates an exemplary communication system to which various embodiments of the present disclosure are applied.

Referring to FIG. 35, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 36:
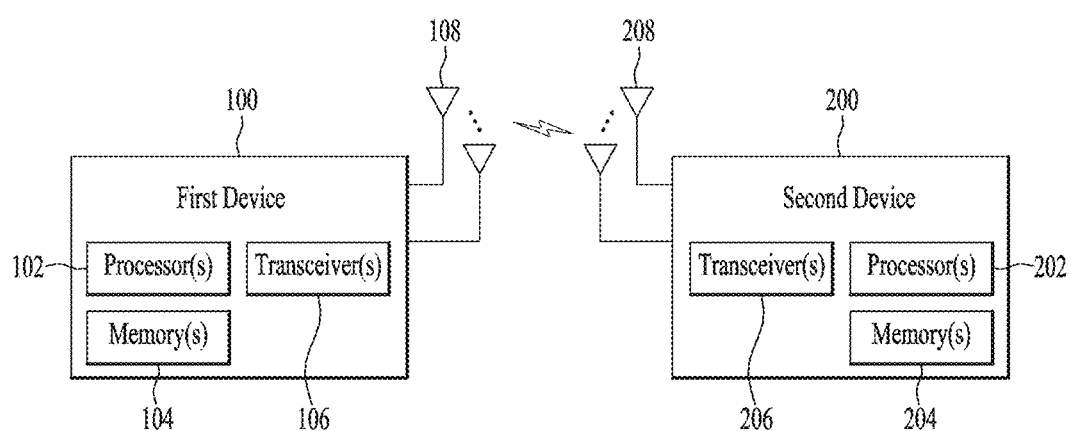
FIG. 36 is a block diagram illustrating wireless devices to which various embodiments of the present disclosure are applicable.

4.2.1 Example of Wireless Devices to which Various Embodiments of the Present Disclosure are Applied FIG. 36 illustrates exemplary wireless devices to which various embodiments of the present disclosure are applicable.

Referring to FIG. 36, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 37:
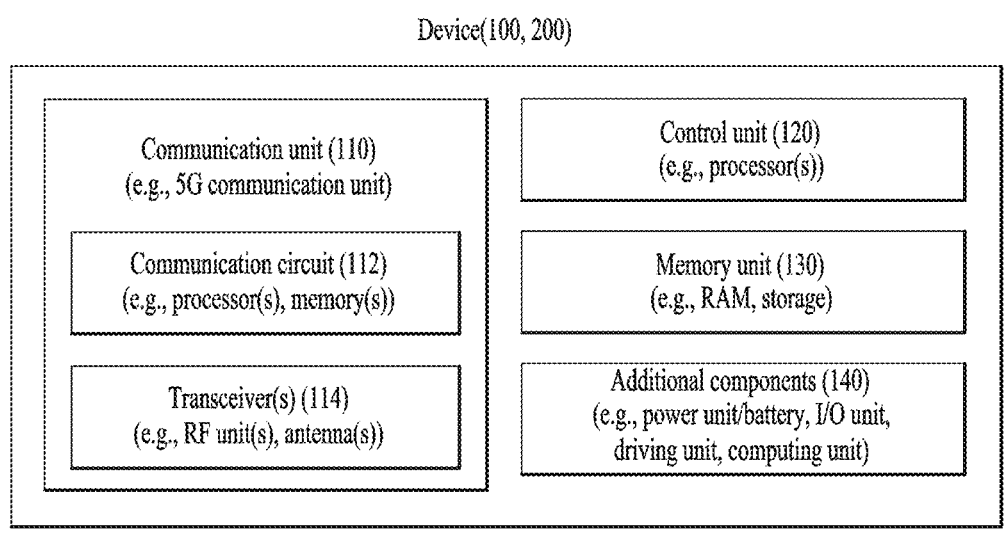
FIG. 37 is a block diagram illustrating another example of wireless devices to which various embodiments of the present disclosure are applicable.

4.2.2. Example of Using Wireless Devices to which Various Embodiments of the Present Disclosure are Applied FIG. 37 illustrates other exemplary wireless devices to which various embodiments of the present disclosure are applied. The wireless devices may be implemented in various forms according to a use case/service (see FIG. 35).

Referring to FIG. 37, wireless devices 100 and 200 may correspond to the wireless devices 100 and 200 of FIG. 35 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 35. For example, the transceiver(s) 114 may include the one or more transceivers 106 and 206 and/or the one or more antennas 108 and 208 of FIG. 35. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 37, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 37 will be described in detail with reference to the drawings.

Figure 38:
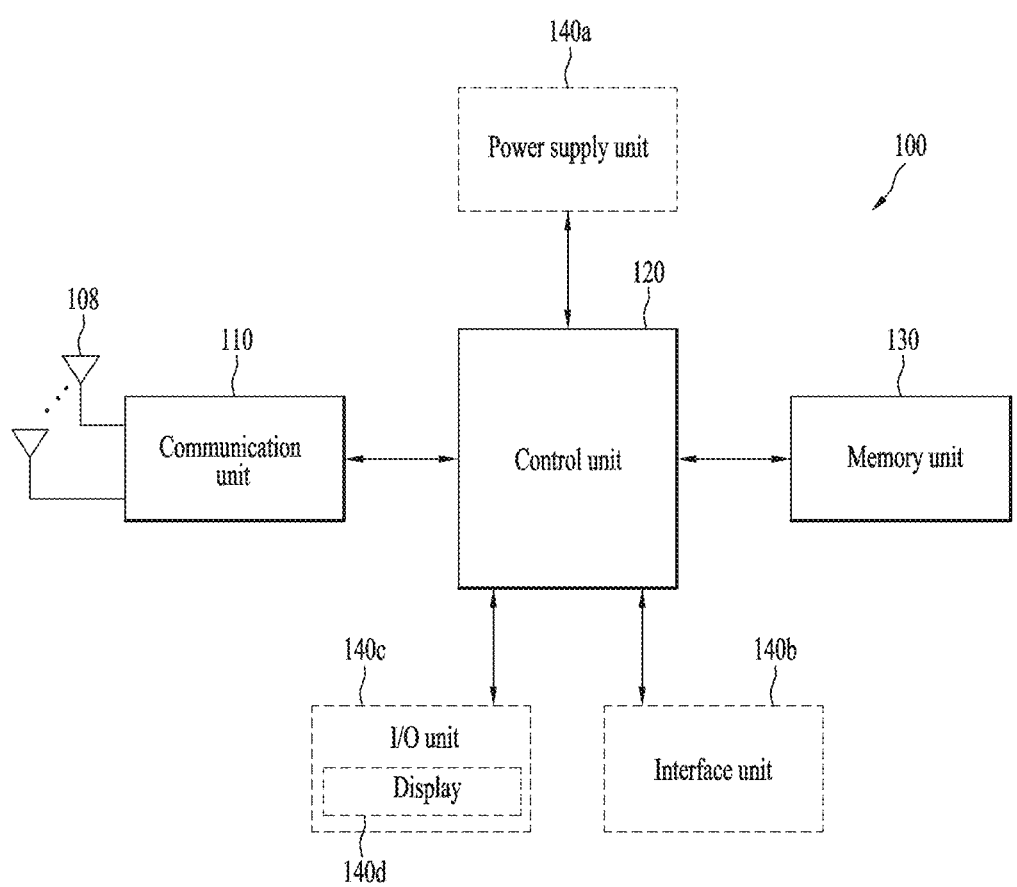
FIG. 38 is a block diagram illustrating a portable device applied to various embodiments of the present disclosure.

4.2.3. Example of Portable Device to which Various Embodiments of the Present Disclosure are Applied FIG. 38 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 38, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure.

Figure 39:
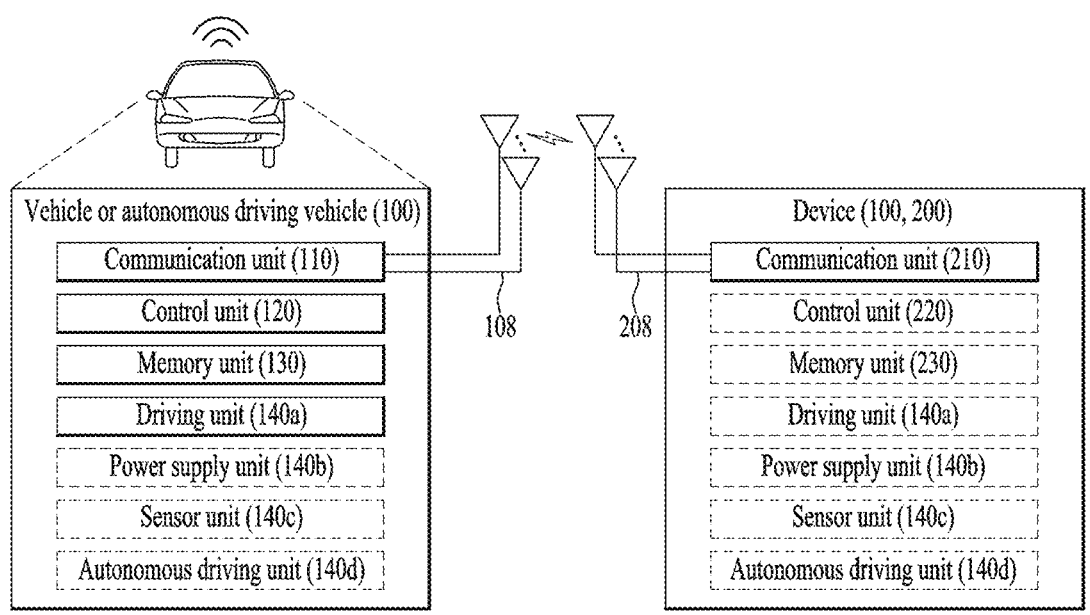
FIG. 39 is a block diagram illustrating a vehicle or an autonomous driving vehicle, which is applied to various embodiments of the present disclosure.

FIG. 39 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 39, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 40:
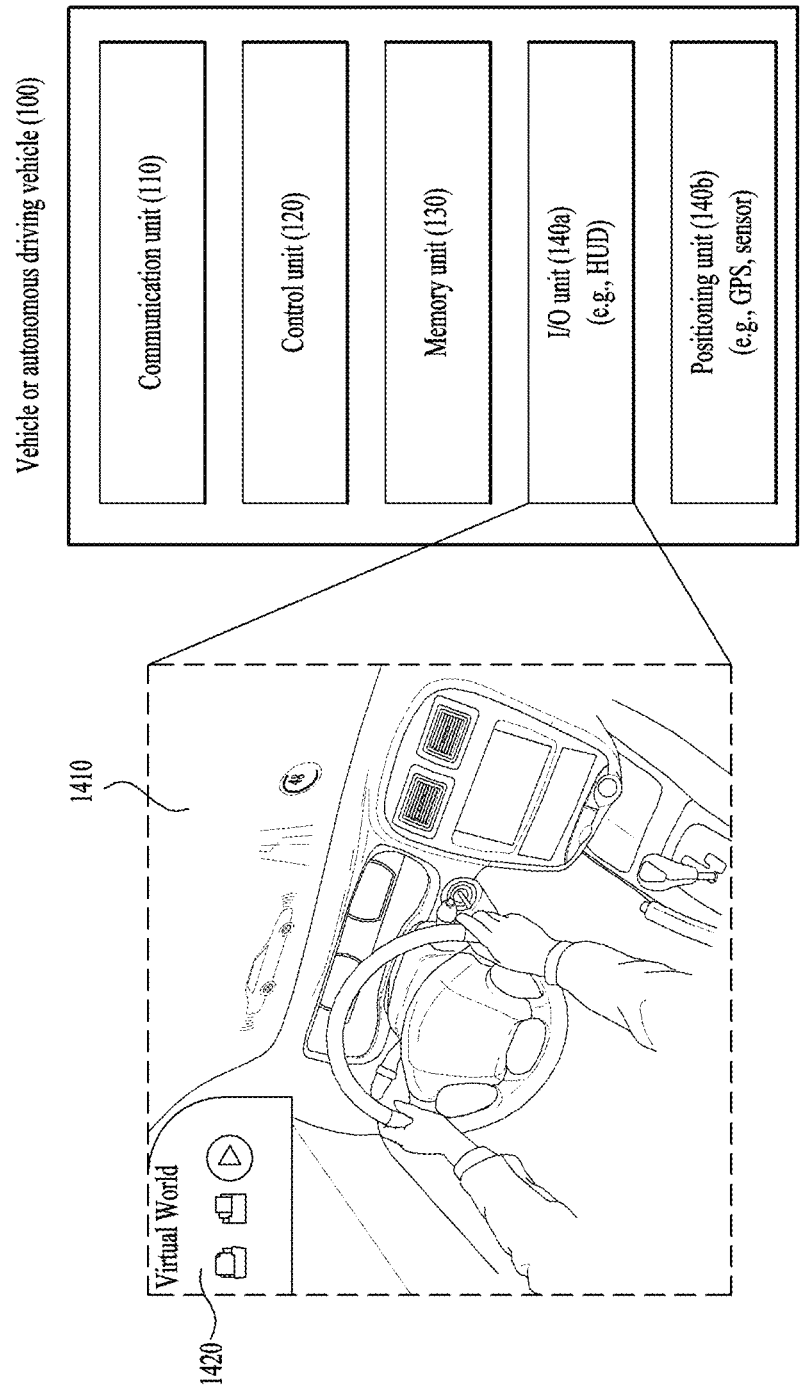
FIG. 40 is a block diagram illustrating a vehicle applied to various embodiments of the present disclosure.

4.2.5. Example of AR/VR and Vehicle to which Various Embodiments of the Present Disclosure FIG. 40 illustrates an exemplary vehicle to which various embodiments of the present disclosure are applied. The vehicle may be implemented as a transportation means, a train, an aircraft, a ship, or the like.

Referring to FIG. 40, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 37.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

What is claimed is:

1. A method performed by a user equipment (UE) configured to operate in a wireless communication system, the method comprising:
receiving first information regarding a plurality of groups, wherein the plurality of groups are respectively related to at least one search space set;
monitoring, based on the first information, a physical downlink control channel (PDCCH) according to at least one search space set related to one of the plurality of groups; and
based on first downlink control information (DCI) scheduling uplink transmission in an shared spectrum being obtained by monitoring the PDCCH:
(i) performing a channel access procedure (CAP) for the uplink transmission to access the shared spectrum, and
(ii) performing the uplink transmission based on the CAP;
wherein, based on second information related to a channel occupancy time (COT) being indicated by second DCI which is obtained by monitoring the PDCCH:
(i) monitoring the PDCCH according to at least one search space set related to a first group of the plurality of groups is started after the COT, and
(ii) monitoring the PDCCH according to the at least one search space set related to a second group of the plurality of groups is ended after the COT,
wherein the second DCI further indicates information related to at least one available frequency resource in the shared spectrum, and
wherein a total size of the at least one available frequency resource is based on a field related to the at least one available frequency resource included in the second DCI.

2. The method according to claim 1, wherein the PDCCH is monitored according to the at least one search space set related to the second group, and wherein based on at least one predetermined condition being satisfied:
(i) monitoring the PDCCH according to at least one search space set related to the first group is started, and
(ii) monitoring the PDCCH according to the at least one search space set related to the second group is ended.

3. The method according to claim 1, wherein the at least one search space set related to the first group is located outside the COT in a time domain, and
wherein the at least one search space set related to the second group is located inside the COT in the time domain.

4. The method according to claim 3, wherein the at least one search space set related to the first group is configured periodically based on a first periodicity in the time domain, and
wherein the at least one search space set related to the second group is configured periodically based on a second periodicity different from the first periodicity in the time domain.

5. The method according to claim 1, wherein the first information is received based on a higher-layer signaling.

6. The method according to claim 1, wherein based on discontinuous reception (DRX) being configured for the UE, monitoring the PDCCH is performed in an on duration of the DRX.

7. A user equipment (UE) configured to operate in a wireless communication system, the UE comprising:
a transceiver; and
at least one processor coupled with the transceiver,
wherein the at least one processor is configured to:
receive first information regarding a plurality of groups, wherein the plurality of groups are respectively related to at least one search space set;

monitor, based on the first information, a physical downlink control channel (PDCCH) according to at least one search space set related to one of the plurality of groups;

based on first downlink control information (DCI) scheduling uplink transmission in an shared spectrum being obtained by monitoring the PDCCH:
  (i) perform a channel access procedure (CAP) for the uplink transmission to access the shared spectrum, and
  (ii) perform the uplink transmission based on the CAP;

wherein, based on second information related to a channel occupancy time (COT) being indicated by second DCI which is obtained by monitoring the PDCCH:
  (i) monitor the PDCCH according to at least one search space set related to a first group of the plurality of groups is started after the COT, and
  (ii) monitor the PDCCH according to the at least one search space set related to a second group of the plurality of groups is ended after the COT, wherein the second DCI further indicates information related to at least one available frequency resource in the shared spectrum, and wherein a total size of the at least one available frequency resource is based on a field related to the at least one available frequency resource included in the second DCI.

8. The UE according to claim 7, wherein the at least one processor is further configured to communicate with at least one of a mobile terminal, a network, or an autonomous driving vehicle other than a vehicle comprising the UE.

9. A method performed by a base station (BS) configured to operate in a wireless communication system, the method comprising:

transmitting first information regarding a plurality of groups, wherein the plurality of groups are respectively related to at least one search space set;

transmitting, based on the first information, a physical downlink control channel (PDCCH) according to at least one search space set related to one of the plurality of groups; and based on first downlink control information (DCI) scheduling downlink transmission in an shared spectrum being transmitted through the PDCCH:
  (i) performing a channel access procedure (CAP) for the downlink transmission to access the shared spectrum, and
  (ii) performing the downlink transmission based on the CAP;

wherein, based on second information related to a channel occupancy time (COT) being indicated by second DCI which is transmitted through the PDCCH:
  (i) transmitting the PDCCH according to at least one search space set related to a first group of the plurality of groups is started after the COT, and
  (ii) transmitting the PDCCH according to the at least one search space set related to a second group of the plurality of groups is ended after the COT, wherein the second DCI further indicates information related to at least one available frequency resource in the shared spectrum, and wherein a total size of the at least one available frequency resource is based on a field related to the at least one available frequency resource included in the second DCI.

10. A base station (BS) configured to operate in a wireless communication system, the BS comprising:

a transceiver; and at least one processor coupled with the transceiver, wherein the at least one processor is configured to:
  transmit first information regarding a plurality of groups, wherein the plurality of groups are respectively related to at least one search space set;
  transmit, based on the first information, a physical downlink control channel (PDCCH) according to at least one search space set related to one of the plurality of groups;
  based on first downlink control information (DCI) scheduling downlink transmission in an shared spectrum being transmitted through the PDCCH:
    (i) perform a channel access procedure (CAP) for the downlink transmission to access the shared spectrum, and
    (ii) perform the downlink transmission based on the CAP;

wherein, based on second information related to a channel occupancy time (COT) being indicated by second DCI which is transmitted through the PDCCH:
  (i) transmit the PDCCH according to at least one search space set related to a first group of the plurality of groups is started after the COT, and
  (ii) transmit the PDCCH according to the at least one search space set related to a second group of the plurality of groups is ended after the COT, wherein the second DCI further indicates information related to at least one available frequency resource in the shared spectrum, and wherein a total size of the at least one available frequency resource is based on a field related to the at least one available frequency resource included in the second DCI.

* * * * *